US009262455B2

(12) United States Patent
Palay

(10) Patent No.: US 9,262,455 B2
(45) Date of Patent: *Feb. 16, 2016

(54) INDEXING QUOTED TEXT IN MESSAGES IN CONVERSATIONS TO SUPPORT ADVANCED CONVERSATION-BASED SEARCHING

(71) Applicant: Google Inc., Mountain View, CA (US)

(72) Inventor: Andrew J. Palay, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,855

(22) Filed: Oct. 30, 2013

(65) Prior Publication Data

US 2014/0089280 A1 Mar. 27, 2014

Related U.S. Application Data

(63) Continuation of application No. 13/220,666, filed on Aug. 29, 2011, now Pat. No. 8,583,654.

(60) Provisional application No. 61/512,364, filed on Jul. 27, 2011.

(51) Int. Cl.
*G06F 7/00* (2006.01)
*G06F 17/30* (2006.01)
*H04L 12/58* (2006.01)

(52) U.S. Cl.
CPC .... *G06F 17/30312* (2013.01); *G06F 17/30613* (2013.01); *G06F 17/30663* (2013.01); *G06F 17/30684* (2013.01); *H04L 51/16* (2013.01)

(58) Field of Classification Search
CPC .................... G06F 17/30312; G06F 17/30663; G06F 17/30684; G06F 17/30613; G06F 17/3002; G06F 17/3005; G06F 17/3087; G06F 17/30946
USPC ........................... 707/741, 673, 696, 999.101
See application file for complete search history.

(56) References Cited

U.S. PATENT DOCUMENTS 5,208,748 A 5/1993 Flores et al.
5,216,603 A 6/1993 Flores et al.

(Continued)

FOREIGN PATENT DOCUMENTS

CN 1347530 A 5/2002
CN 1360782 A 7/2002

(Continued)

OTHER PUBLICATIONS

Google Inc., Notice of Reasons for Rejection, JP 2013-113280, Mar. 5, 2014, 3 pgs.

(Continued)

*Primary Examiner* — Mohammed R Uddin
(74) *Attorney, Agent, or Firm* — Morgan, Lewis & Bockius LLP

(57) ABSTRACT

A method for indexing quoted text includes, obtaining a plurality of index entries in an index. A respective index entry corresponds to a respective term in one or more messages, and has a plurality of index components; a respective index component identifies a message associated with the respective term. The method further includes, responsive to receiving a first message; updating the index by: associating the first message with a conversation having one or more other messages; identifying text in the first message as quoted text based on text that occurs in one or more of the other messages; and updating, in the index, first-message index components that each includes an identifier of the first message, which includes original text index components and quoted text index components. The quoted text index components include information indicating that the corresponding terms are terms in the quoted text of the first message.

19 Claims, 41 Drawing Sheets

(56) References Cited

U.S. PATENT DOCUMENTS 5,479,408 A * 12/1995 Will .............................. 370/313
5,613,108 A 3/1997 Morikawa
5,724,571 A 3/1998 Woods
5,734,837 A 3/1998 Flores et al.
5,740,549 A 4/1998 Reilly et al.
5,761,689 A 6/1998 Rayson et al.
5,832,502 A 11/1998 Durham et al.
5,872,925 A 2/1999 Han
5,905,863 A * 5/1999 Knowles et al. .............. 709/206
5,913,040 A 6/1999 Rakavy et al.
5,948,058 A 9/1999 Kudoh et al.
5,959,621 A 9/1999 Nawaz et al.
6,021,427 A 2/2000 Spagna et al.
6,029,164 A 2/2000 Birrell et al.
6,029,195 A 2/2000 Herz
6,085,206 A 7/2000 Domini et al.
6,151,596 A 11/2000 Hosomi
6,182,063 B1 1/2001 Woods
6,182,098 B1 1/2001 Selker
6,185,551 B1 2/2001 Birrell et al.
6,330,589 B1 12/2001 Kennedy
6,350,066 B1 2/2002 Bobo, II
6,396,513 B1 5/2002 Helfman et al.
6,408,297 B1 6/2002 Ohashi
6,421,694 B1 7/2002 Nawaz et al.
6,438,564 B1 8/2002 Morton et al.
6,493,702 B1 12/2002 Adar et al.
6,493,703 B1 12/2002 Knight et al.
6,507,351 B1 1/2003 Bixler
6,549,957 B1 4/2003 Hanson et al.
6,594,658 B2 7/2003 Woods
6,594,693 B1 7/2003 Borwankar
6,606,644 B1 8/2003 Ford et al.
6,640,239 B1 10/2003 Gidwani
6,665,668 B1 12/2003 Sugaya et al.
6,683,627 B1 1/2004 Ullmann et al.
6,708,205 B2 3/2004 Sheldon et al.
6,725,228 B1 4/2004 Clark et al.
6,742,042 B1 5/2004 Holden et al.
6,745,197 B2 6/2004 McDonald
6,757,889 B1 6/2004 Ito
6,771,291 B1 8/2004 DiStefano, III
6,785,869 B1 8/2004 Berstis
6,820,081 B1 11/2004 Kawai et al.
6,826,596 B1 11/2004 Suzuki
6,834,276 B1 12/2004 Jensen et al.
6,889,361 B1 5/2005 Bates et al.
6,892,196 B1 5/2005 Hughes
6,973,481 B2 12/2005 MacIntosh et al.
7,010,616 B2 3/2006 Carlson et al.
7,017,173 B1 3/2006 Armstrong et al.
7,035,903 B1 4/2006 Baldonado
7,043,690 B1 5/2006 Bates et al.
7,069,300 B2 6/2006 Toyota et al.
7,089,278 B1 8/2006 Churchill et al.
7,107,544 B1 9/2006 Luke
7,120,668 B2 10/2006 Manber et al.
7,139,850 B2 11/2006 Amemiya et al.
7,143,135 B2 11/2006 Smith et al.
7,171,429 B2 1/2007 Frieden et al.
7,206,388 B2 4/2007 Diacakis
7,213,210 B2 5/2007 Reysa
7,222,299 B1 * 5/2007 Lim et al. ...................... 715/273
7,328,242 B1 2/2008 McCarthy et al.
7,340,674 B2 * 3/2008 Newman ....................... 715/234
7,356,772 B2 4/2008 Brownholtz et al.
7,359,936 B2 * 4/2008 Gruen et al. .................. 709/203
7,383,250 B2 6/2008 Scian et al.
7,383,307 B2 6/2008 Kirkland et al.
7,386,439 B1 6/2008 Charnock et al.
7,412,437 B2 8/2008 Moody et al.
7,421,690 B2 9/2008 Forstall et al.
7,433,920 B2 10/2008 Blagsvedt et al.
7,472,357 B1 12/2008 Satterfield et al.
7,484,175 B2 1/2009 Kirkland
7,523,222 B2 4/2009 Carlson
7,565,347 B2 7/2009 Broder et al.
7,565,534 B2 7/2009 Starbuck et al.
7,593,995 B1 9/2009 He et al.
7,596,594 B2 9/2009 Karp
7,599,852 B2 10/2009 Bosarge et al.
7,693,866 B1 4/2010 Weaver et al.
7,716,593 B2 5/2010 Durazo et al.
7,730,113 B1 6/2010 Payette et al.
7,788,326 B2 8/2010 Buchheit et al.
7,814,155 B2 10/2010 Buchheit et al.
7,818,378 B2 10/2010 Buchheit et al.
7,899,871 B1 3/2011 Kumar et al.
7,904,510 B2 3/2011 Anderson et al.
7,912,904 B2 3/2011 Buchheit et al.
7,962,508 B2 6/2011 Moody et al.
8,265,670 B2 * 9/2012 Yasuda et al. ................. 455/466
8,601,062 B2 12/2013 Buchheit et al.
2001/0016845 A1 8/2001 Tribbensee
2001/0042100 A1 11/2001 Guedalia et al.
2001/0047294 A1 11/2001 Rothschild
2002/0010775 A1 1/2002 Rakavy et al.
2002/0049610 A1 4/2002 Gropper
2002/0073156 A1 6/2002 Newman
2002/0087649 A1 7/2002 Horvitz
2002/0093527 A1 7/2002 Sherlock et al.
2002/0108125 A1 8/2002 Joao
2002/0169841 A1 11/2002 Carlson et al.
2002/0188683 A1 12/2002 Lytle et al.
2002/0194229 A1 12/2002 Decime et al.
2003/0009385 A1 1/2003 Tucciarone et al.
2003/0020749 A1 1/2003 Abu-Hakima et al.
2003/0055711 A1 3/2003 Doherty
2003/0093315 A1 5/2003 Sato
2003/0101065 A1 5/2003 Rohall et al.
2003/0110227 A1 6/2003 O'Hagan
2003/0120737 A1 6/2003 Lytle et al.
2003/0135555 A1 7/2003 Birrel et al.
2003/0145285 A1 7/2003 Miyahira et al.
2003/0158903 A1 * 8/2003 Rohall et al. .................. 709/206
2003/0163537 A1 8/2003 Rohall et al.
2003/0167310 A1 9/2003 Moody et al.
2003/0177190 A1 9/2003 Moody et al.
2003/0229607 A1 12/2003 Zellweger et al.
2003/0233419 A1 12/2003 Beringer
2004/0015553 A1 1/2004 Griffin et al.
2004/0044735 A1 3/2004 Hoblit
2004/0054737 A1 3/2004 Daniell
2004/0059712 A1 3/2004 Dean et al.
2004/0078432 A1 4/2004 Manber et al.
2004/0083265 A1 4/2004 Beringer
2004/0098488 A1 5/2004 Mayers
2004/0117448 A1 6/2004 Newman et al.
2004/0133564 A1 7/2004 Gross et al.
2004/0153509 A1 8/2004 Alcorn et al.
2004/0186766 A1 9/2004 Fellenstein et al.
2004/0199589 A1 10/2004 Keohane et al.
2004/0205141 A1 10/2004 Goland
2004/0210587 A1 10/2004 Reysa
2004/0260710 A1 12/2004 Marston et al.
2004/0260756 A1 12/2004 Forstall et al.
2004/0267700 A1 12/2004 Dumais et al.
2005/0004990 A1 1/2005 Durazo et al.
2005/0060643 A1 3/2005 Glass et al.
2005/0080859 A1 4/2005 Lake
2005/0086096 A1 4/2005 Bryant
2005/0086598 A1 4/2005 Marshall, III et al.
2005/0091318 A1 4/2005 Keohane et al.
2005/0091320 A1 4/2005 Kirsch et al.
2005/0108345 A1 5/2005 Suzuki
2005/0114781 A1 5/2005 Brownholtz et al.
2005/0138002 A1 6/2005 Giacobbe et al.
2005/0138552 A1 6/2005 Venolia
2005/0144157 A1 6/2005 Moody et al.
2005/0144241 A1 6/2005 Stata et al.
2005/0198172 A1 9/2005 Appelman et al.
2005/0198173 A1 9/2005 Evans
2005/0198256 A1 9/2005 Moody et al.
2005/0204009 A1 9/2005 Hazarika et al.

(56) References Cited

U.S. PATENT DOCUMENTS

| | | | | |
|---|---|---|---|---|
| 2005/0222985 | A1* | 10/2005 | Buchheit et al. | 707/3 |
| 2005/0223057 | A1 | 10/2005 | Buchheit et al. | |
| 2005/0223061 | A1* | 10/2005 | Auerbach et al. | 709/206 |
| 2005/0223066 | A1 | 10/2005 | Buchheit et al. | |
| 2005/0223067 | A1 | 10/2005 | Buchheit et al. | |
| 2005/0223072 | A1 | 10/2005 | Greve et al. | |
| 2005/0234848 | A1 | 10/2005 | Lawrence et al. | |
| 2005/0289468 | A1 | 12/2005 | Kahn et al. | |
| 2006/0026593 | A1 | 2/2006 | Canning et al. | |
| 2006/0031304 | A1 | 2/2006 | Bagga et al. | |
| 2006/0085502 | A1* | 4/2006 | Sundararajan et al. | 709/204 |
| 2006/0123091 | A1 | 6/2006 | Ho | |
| 2006/0128404 | A1 | 6/2006 | Klassen et al. | |
| 2006/0168067 | A1 | 7/2006 | Carlson et al. | |
| 2006/0248209 | A1 | 11/2006 | Chiu et al. | |
| 2006/0271630 | A1 | 11/2006 | Bensky et al. | |
| 2007/0038707 | A1 | 2/2007 | Broder et al. | |
| 2007/0047697 | A1 | 3/2007 | Drewry et al. | |
| 2007/0060206 | A1 | 3/2007 | Dam Nielsen et al. | |
| 2007/0067404 | A1 | 3/2007 | Brown et al. | |
| 2007/0143411 | A1 | 6/2007 | Costea et al. | |
| 2007/0143428 | A1 | 6/2007 | Kumar et al. | |
| 2007/0198639 | A1 | 8/2007 | Litwin et al. | |
| 2007/0255791 | A1 | 11/2007 | Bodlaender et al. | |
| 2007/0300153 | A1 | 12/2007 | Newman et al. | |
| 2008/0091656 | A1* | 4/2008 | Charnock et al. | 707/3 |
| 2008/0147815 | A1 | 6/2008 | Damm et al. | |
| 2008/0281813 | A1 | 11/2008 | Moody et al. | |
| 2008/0313292 | A1 | 12/2008 | Forstall et al. | |
| 2009/0030774 | A1 | 1/2009 | Rothschild et al. | |
| 2009/0089292 | A1 | 4/2009 | Cheah | |
| 2010/0030798 | A1* | 2/2010 | Kumar et al. | 707/102 |
| 2010/0064017 | A1 | 3/2010 | Buchheit et al. | |
| 2010/0070584 | A1 | 3/2010 | Chen et al. | |
| 2010/0241700 | A1 | 9/2010 | Rasmussen et al. | |
| 2010/0241749 | A1 | 9/2010 | Rasmussen et al. | |
| 2010/0318555 | A1 | 12/2010 | Broder et al. | |
| 2011/0035681 | A1 | 2/2011 | Mandel et al. | |
| 2011/0153585 | A1 | 6/2011 | Ramamurthi | |
| 2011/0161270 | A1 | 6/2011 | Arnett et al. | |
| 2011/0225249 | A1 | 9/2011 | Forstall et al. | |
| 2011/0264750 | A1 | 10/2011 | Fabre et al. | |
| 2012/0185797 | A1* | 7/2012 | Thorsen et al. | 715/784 |
| 2012/0209853 | A1* | 8/2012 | Desai et al. | 707/741 |
| 2012/0296891 | A1* | 11/2012 | Rangan | 707/722 |

FOREIGN PATENT DOCUMENTS

| | | | |
|---|---|---|---|
| CN | 1402159 | A | 3/2003 |
| CN | 1429376 | A | 7/2003 |
| CN | 1438595 | A | 8/2003 |
| CN | 1464458 | A | 12/2003 |
| EP | 0886228 | A2 | 12/1998 |
| GB | 2369218 | A | 5/2002 |
| JP | 09-128407 | A | 5/1997 |
| JP | 11-015763 | | 1/1999 |
| JP | 2000-187631 | | 7/2000 |
| JP | 2000-276474 | | 10/2000 |
| JP | 2001-222477 | A | 8/2001 |
| JP | 2002-014903 | | 1/2002 |
| JP | 2002-359667 | A | 12/2002 |
| JP | 2003-030216 | A | 1/2003 |
| JP | 2003-067306 | | 3/2003 |
| JP | 2003-108278 | A | 4/2003 |
| JP | 2004-054614 | | 2/2004 |
| JP | 2004-173124 | | 6/2004 |
| JP | 2005-536790 | A | 12/2005 |
| WO | WO 00/23931 | A2 | 4/2000 |
| WO | WO 01/61551 | A1 | 8/2001 |
| WO | WO 03/058519 | A2 | 7/2003 |
| WO | WO 03/067497 | A1 | 8/2003 |

OTHER PUBLICATIONS

Teraguchi, Customizing to the limit for an easy to use personal computer, Windows 2000/XP Environment Improving Committee 29th e-mail software part (1), Fully utilizing "Outlook Express", Windows 2000 World, K. K. IDG Japan, Jan. 1, 2013, vol. 8, No. 1, 11 pgs.

Anupam, Personalizing the Web using site descriptions, Proc. 10th Int'l Workshop on Database and Expert Systems Applications, 1999, pp. 732, 738.

Google Inc., Communication pursuant to Article 94(3) EPC, EP 12183097.0, Nov. 11, 2013, 7 pgs.

Google Inc., Communication pursuant to Article 94(3) EPC, EP 12183103.6, Nov. 11, 2013, 7 pgs.

Haas, Personalized news through content augmentation and profiling, Int'l Conf. on Image Processing 2002, vol. 2, pp. II-9, II-12.

Giacoletto, Automatic Expansion of Manual Email Classifications Based on Text Analysis, Lecture Notes in Computer Science, Springer, vol. 2888, 2003, pp. 785-802.

Google Inc., Communication pursuant to Article 94(3) EPC, EP 05730150.9, Nov. 4, 2010, 6 pgs.

Google Inc., International Preliminary Report on Patentability, PCT/US2012/046872, Feb. 6, 2014, 8 pgs.

Google Inc., International Preliminary Report on Patentability, PCT/US2012/046876, Feb. 6, 2014, 9 pgs.

Google Inc., Notice of Acceptance, AU 2011201992, Oct. 31, 2012, 3 pgs.

Google Inc., Requisition by the Examiner, CA 2,561,580, Jul. 12, 2013, 4 pgs.

Google Inc., Requisition by the Examiner, CA 2,561,580, Oct. 12, 2010, 1 pg.

Gruen, Lessons from the reMail prototypes, CSCW '04, ACM, New York, NY, 2004, pp. 152-161.

Kerr, Designing remail: reinventing the email client through innovation and integration, CHI '04, ACM, New York, NY, 2004, pp. 837-852.

McWherter, Software architecture to facilitate automated message recording and context annotation, SPIE 4208, Dec. 29, 2000, pp. 122.

Quan, A Unified Abstraction for Messaging on the Semantic Web, WWW 2003, 2003, pp. 231.

Samiel, EzMail: using informmation visualization techniques to help manage email, IV 2004, Jul. 14-16, 2004, pp. 477-482.

Shrestha, Detection of question-answer pairs in email conversations, COLING '04, Stroudsburg, PA, 2004, Article 889.

About Microsoft Word screen shot, May 28, 2007, 1 pg.

Apple Computer Inc, Mail 1.3.3 Help: Checking Spelling in Email, Aug. 31, 2004, 1 pg.

Apple Computer Inc., Mac mail utility screenshot, Aug. 18, 2004, 1 pg.

Autonomy webpage, http://autonomy.com, 2004, 1 pg.

Bellotti, Taking Email to Task; the design and evaluation of a task management centered email tool, Apr. 5-10, 2003, 8 pgs.

Bellotti, Taskmaster: recasting email as task management, Feb. 2, 2009, 5 pgs.

Bitmap Index, Internet Citation, en.wikipedia.org/wiki/Bitmap_index, Oct. 5, 2010, 5 pgs.

Comer, Conversation-Based Mail, ACM Transactions on Computer System, V. 4, Iss. 4, Nov. 30, 1986, pp. 299-319.

Cordess, Taking a Look at Zoe, Google Your Email, Apr. 26, 2004, 1 pg.

Courter, Mastering Microsoft Office 2000—Professional Edition, p. 5.

Courter, Mastering Microsoft Office 2000—Professional Edition, pp. 36-37 and 92-94.

DolphinSearch webpage, www.dolphinsearch.com, 2004, 1 pg.

eCommerce Customer Service: Email Management Systems that Work, eGain Corporation White Paper, 1998, 9 pgs.

Electronic Discovery Solutions from DolphinSearch, www.dolphinsearch.com, 2003, 1 pg.

Elsas, Retrieval and Feedback Models for Blog Feed Search, SIGIR '08, Jan. 1, 2008, 8 pgs.

Enfish webpage, www.enfish.com, 2004, 1 pg.

Flenner, Replace Those Shared Drives With Space Drives, O'Reilly on Java.com, Aug. 28, 2002, 7 pgs.

(56) References Cited

OTHER PUBLICATIONS

Flores, Computer Systems and the Design of Organizational Interaction, Apr. 1988, 20 pgs.
Friedman, The Dashboard, 2003, 2 pgs.
Gelernter, Expert Voice: David Gelernter on Knowledge Management, Cioinsight, Oct. 10, 2002, 6 pgs.
Google Inc., Decision to Grant a Patent, JP 2011-181202, Mar. 7, 2013, 1 pg.
Google Inc., Decision to Grant a Patent, JP 2011-181203, Mar. 11, 2013, 1 pg.
Google Inc., Decision to Grant a Patent, JP 2011-181204, Mar. 11, 2013, 1 pg.
Google Inc., Decision to Grant a Patent, JP 2011-181205, Sep. 6, 2013, 1 pg.
Google Inc., European Search Report, EP 11172427.4, Dec. 21, 2011, 6 pgs.
Google Inc., European Search Report, EP 12183097.0, Nov. 5, 2012, 7 pgs.
Google Inc., European Search Report, EP 12183103.6, Nov. 5, 2012, 7 pgs.
Google Inc., Extended European Search Report, EP 12192299.1, Mar. 6, 2013, 7 pgs.
Google Inc., IPRP, PCT/US2005/006826, Oct. 4, 2006, 4 pgs.
Google Inc., ISR/WO, PCT/US2005/006826, Jun. 26, 2006, 7 pgs.
Google Inc., ISR/WO, PCT/US2005/010137, Jun. 3, 2005, 12 pgs.
Google Inc., ISR/WO, PCT/US2005/031920, May 3, 2006, 3 pgs.
Google Inc., ISR/WO, PCT/US2012/046872, Sep. 28, 2012, 11 pgs.
Google Inc., ISR/WO, PCT/US2012/046876, Feb. 22, 2013, 12 pgs.
Google Inc., Notice of Acceptance, AU 2011201989, Oct. 27, 2012, 3 pgs.
Google Inc., Notice of Acceptance, AU 2011201993, Mar. 21, 2013, 3 pgs.
Google Inc., Notice of Acceptance, AU 2011203058, Jan. 6, 2012, 3 pgs.
Google Inc., Office Action, AU 2011201989, Apr. 12, 2012, 3 pgs.
Google Inc., Office Action, AU 2011201991, Mar. 8, 2012, 2 pgs.
Google Inc., Office Action, AU 2011201992, Aug. 16, 2012, 3 pgs.
Google Inc., Office Action, AU 2011201993, Oct. 11, 2012, 3 pgs.
Google Inc., Office Action, AU 2011201993, Feb. 28, 2012, 2 pgs.
Google Inc., Office Action, AU 2011201994, Mar. 8, 2012, 2 pgs.
Google Inc., Office Action, AU 2011203058, Oct. 31, 2011, 1 pg.
Google Inc., Office Action, CA 2,561,580, Jul. 12, 2013, 4 pgs.
Google Inc., Office Action, CN 200580016413.8, Jul. 2, 2012, 3 pgs.
Google Inc., Office Action, CN 200580016413.8, Dec. 4, 2012, 6 pgs.
Google Inc., Office Action, CN 200580016413.8, Dec. 19, 2011, 3 pgs.
Google Inc., Office Action, EP 05724384.2, Nov. 23, 2012, 7 pgs.
Google Inc., Office Action, IN 1262/MUMNP/2006, Sep. 27, 2011, 4 pgs.
Google Inc., Office Action, JP 2010-275595, Jul. 6, 2012, 4 pgs.
Google Inc., Office Action, JP 2011-181202, Aug. 29, 2012, 3 pgs.
Google Inc., Office Action, JP 2011-181203, Aug. 27, 2012, 3 pgs.
Google Inc., Office Action, JP 2011-181204, Aug. 27, 2012, 3 pgs.
Google Inc., Office Action, JP 2011-181205, Mar. 11, 2013, 4 pgs.
Google Inc., Office Action, JP 2011-181205, Aug. 29, 2012, 4 pgs.
Google Inc., Office Action, KR 2006-7022840, Jan. 26, 2012, 4 pgs.
Google Inc., Office Action, KR 2011-7017094, Sep. 26, 2011, 5 pgs.
Google Inc., Office Action, KR 2011-7017095, Sep. 29, 2011, 5 pgs.
Google Inc., Office Action, KR 2011-7017096, Oct. 4, 2011, 4 pgs.
Google Inc., Office Action, KR 2011-7017098, Oct. 4, 2011, 3 pgs.
Google Inc., Office Action, KR 2011-7017102, Oct. 4, 2011, 4 pgs.
Google Inc., Supplemental ESR, EP 05724384.2, Mar. 16, 2009, 5 pgs.
Kanellos, Microsoft Aims for Search on Its Own Terms, c/net News.com, Nov. 24, 2002, 4 pgs.
Lawrence, Context and page analysis for improved web search, Oct. 31, 1998, 9 pgs.
Lin, Modeling Semantics and Structure of Discussion Threads, WWW'09, Jan. 1, 2009, 1 pg.
Lotus Discovery Server webpage, lotus.com/product/disccserver.nsf, 2004, 1 pg.
Microsoft Corp., Microsoft Outlook 2003, Released Nov. 20, 2003, 4 pgs.
Miura, Rapid Search for a Target Webpage, to Master a New-Standard Search Engine "Google", Nikkei PC 21, V8, N11, Jun. 1, 2003, 9 pgs.
My Take on Dashboard: Multiple Desktops Done Differently, engadgeted.net, Jul. 23, 2004, 2 pgs.
Navarro, Indexing and Searching, Modern Information Retrieval, Ch. 8, Jan. 1, 1999, pp. 191-228.
Ogilvie, Experiments with Language Models for Known-Item Finding of Email Messages, TREC 2005, Nov. 15-18, 2005, 10 pgs.
O'Hara, Easy Microsoft Office Outlook 2003, Sep. 18, 2003, 44 pgs.
Opera Mail Client, Opera M2 webpage, www.opera.com/products/desktop/m2, Jun. 2004, 3 pgs.
Placeless Documents, Xerox Corporation, www2.parc.com/csl/projects/placeless, 1999, 2 pgs.
Reaction, Improving Search Technique for the Internet, Ultimate Search Technique, PC Japan, V8, N5, May 1, 2003, 7 pgs.
Resnick, Network Working Group, RFC 2822, Apr. 2011, 65 pgs.
Rohall, Email Visualizations to Aid Communications, IEEE Symposium on Information Visualization (InfoVis), 2001, p. 1-4.
Russel, Special Edition Using Microsoft Office Outlook 2003, Sep. 25, 2003, 102 pgs.
Screenshot of reply to message in Lotus Notes 6.5, Aug. 6, 2007, 1 pg.
Searching ZoeDocs, zoe.omara.ca/index.ph?page=searching, Dec. 2003, 3 pgs.
Seo, Online Community Search Using Conversational Structures, V14, N6, Apr. 23, 2011, 25 pgs.
Shepherd, Strudel—an extensible electronic conversation toolkit, Oct. 1990, 12 pgs.
Sudarsky, Visualizing Electronic Mail, Proc. 6th Int'l Conference on Information Visualisation, 2002, pp. 3, 9.
Syroid, Outlook 2000 in a Nutshell, O'Reilly, May 2, 2000, pp. 1-66.
The Apache Jakarta Project, jakarta.apache.org/lucene/docs/indes.htlm, 2004, 1 pg.
Tobias, Dan's Mail Format Site, Aug. 3, 2003, 6 pgs.
Tyson, Sams Teach Yourself Microsoft Outlook 2000 in 24 Hours, 1999, pp. 237.
Udell, Googling Your Email, O'Reilly Network, Oct. 7, 2002.
Venolia, Supporting Email Workflow, Sep. 2001, 11 pgs.
Venolia, Understanding Sequence and Replay Relationships within Email Conversations: A Mixed-Model Visualization, CHI 2003, Ft. Lauderdale FL, Apr. 5-10, 2003, pp. 361-368.
What Does Autonomy Do?, http://www.autonomy.com/content/home, 2003, 1 pg.
Winograd, A Language/Action Perspective on the Design of Cooperative Work, 1987-1988, pp. 3-30.
Winograd, Where the Action is, Dec. 1998, 5 pgs.
X1 About Us, www.x1.com/abou_us/, 2004, 2 pgs.
X1 Enterprise Edition product page, www.x1.com/?PROGOOG, 2004, 2 pgs.
Zawinski, Message Threading, Jul. 22, 2004, 9 pgs http://www.jwz.org/doc/threading.html.
Zelman, Threaded Email Messages in Self-Organization and Science & Technology Studies Oriented Mailing Lists, Kluwer Academic Publishers—Scientometrics, Jul. 1, 2000, vol. 48, Iss. 3, pp. 361-380.
ZoeDocs, http://zoe.omara.ca/LikeZoe, Nov. 2003, 1 pg.
Chan, Co-training with a Single Natural Feature Set Applied to Email Classification, IEEE/WIC/ACM International Conference on Web Intelligence 2004, Sep. 20-24, 2004, pp. 586-589.
Crespo, Language model adaptation for conversational speech recognition using automatically tagged pseudo-morphological classes, IEEE International Conference on Acoustics, Speech, and Signal Processing, 1997, pp. 823-826.
Henry, Off-the-record email system, 20th Annual Joint Conference of the IEEE Computer and Communications Societies, vol. 2, 2001, pp. 869-877.
Kaushik, A policy driven approach to email services, 5th IEEE International Workshop on Policies for Distributed Systems and Networks, POLICY 2004, Jun. 7-9, 2004, pp. 169-178.

(56) References Cited

OTHER PUBLICATIONS

Kerr, Thread Arcs: an email thread visualization, IEEE Symposium on Information Visualization 2003, Oct. 21, 2003, pp. 211-218.

Liu, Keyword fusion to support efficient keyword-based search in peer-to-peer file sharing, Cluster Computing and the Grid, 2004, CCGrid 2004, Apr. 19-22, 2004, pp. 269-276.

Liu, Supporting efficient keyword-based file search in peer-to-peer file sharing systems, Global Telecommunications Conference, 2004, GLOBECOM '04, Nov. 29-Dec. 3, 2004, pp. 1259-1265.

Google Inc., First Office Action, CN 201110416435.0, Jun. 19, 2014, 5 pgs.

Google Inc., First Office Action, CN 201110416439.9, Jul. 9, 2014, 6 pgs.

Google Inc., First Office Action, CN 201110416451.X, Jun. 24, 2014, 4 pgs.

Google Inc., First Office Action, CN 201110416455.8, Jul. 1, 2014, 5 pgs.

Google Inc., First Office Action, CN 201110416787.6, Jun. 19, 2014, 5 pgs.

Google Inc., Office Action, CA 2,561,580, Jul. 29, 2014, 4 pgs.

Donath, Visualizing Conversation, J. Computer-Mediated Communication, vol. 4, Iss. 4, Blackwell Publishing, Jun. 1999, 18 pgs.

Google Inc., Notice of Reasons for Rejection, JP 2014-112132, Apr. 28, 2015, 3 pgs.

Google Inc., Office Action, CN 201110416439.9, May 29, 2015, 6 pgs.

Google Inc., Patent Examination Report No. 1, AU 2013205898, Jun. 26, 2015, 3 pgs.

Google Inc., Second Office Action, CN 201110416451.X, May 14, 2015, 3 pgs.

Google Inc., Second Office Action, CN 201110416455.8, May 7, 2015, 4 pgs.

Google Inc., Second Office Action, CN 201110416787.6, May 7, 2015, 4 pgs.

Shigckazu, Practice Course of E-mail (4) Managing received mails, Touch PC, Japan, Mainichi Communications Inc., Mar. 24, 1999, vol. 4, No. 4, pp. 96-98 <<No English version available>>.

* cited by examiner

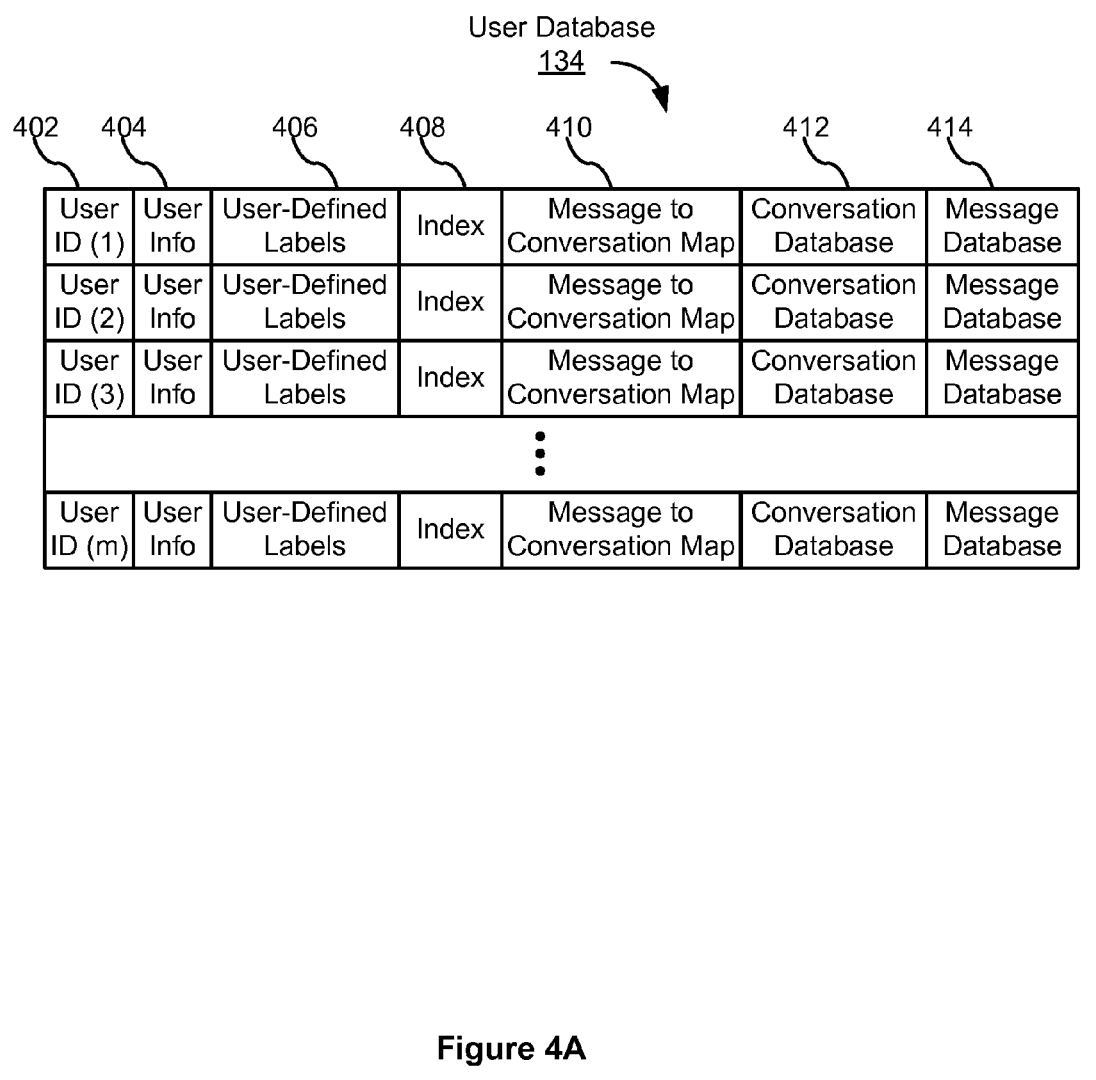

User Database
134

| 402 | 404 | 406 | 408 | 410 | 412 | 414 |
|---|---|---|---|---|---|---|
| User ID (1) | User Info | User-Defined Labels | Index | Message to Conversation Map | Conversation Database | Message Database |
| User ID (2) | User Info | User-Defined Labels | Index | Message to Conversation Map | Conversation Database | Message Database |
| User ID (3) | User Info | User-Defined Labels | Index | Message to Conversation Map | Conversation Database | Message Database |
| ⋮ | | | | | | |
| User ID (m) | User Info | User-Defined Labels | Index | Message to Conversation Map | Conversation Database | Message Database |

Figure 4A

Index
142

| Term ID (1) | Message ID (4):<br>**00**000001 | Message ID(7):<br>**00**000001 | ... | Message ID (W):<br>**00**xxxxxx |
|---|---|---|---|---|
| Term ID (2) | Message ID (1):<br>**01**000011 | Message ID(4):<br>**00**001001<br>**00**010001<br>**01**001100<br>...<br>**11**000011 | ... | Message ID (X):<br>**00**xxxxxx<br>**01**xxxxxx<br>**11**xxxxxx |
| Term ID (3) | Message ID (5):<br>**00**000101<br>**01**000111<br>**01**001101<br>**11**000000<br>... | Message ID (9):<br>**00**000001<br>**00**000101<br>**00**001001 | ... | Message ID (Y):<br>**00**xxxxxx<br>**01**xxxxxx<br>**11**xxxxxx |
| ⋮ | | | | |
| Term ID (n) | Message ID (6):<br>**00**000011<br>**01**001011 | Message ID (8):<br>**00**000011<br>**01**000101<br>**01**001101<br>**01**001110<br>... | ... | Message ID (Z):<br>**00**xxxxxx<br>**01**xxxxxx<br>**11**xxxxxx |

432 — Term ID column
434 — Message ID columns
430

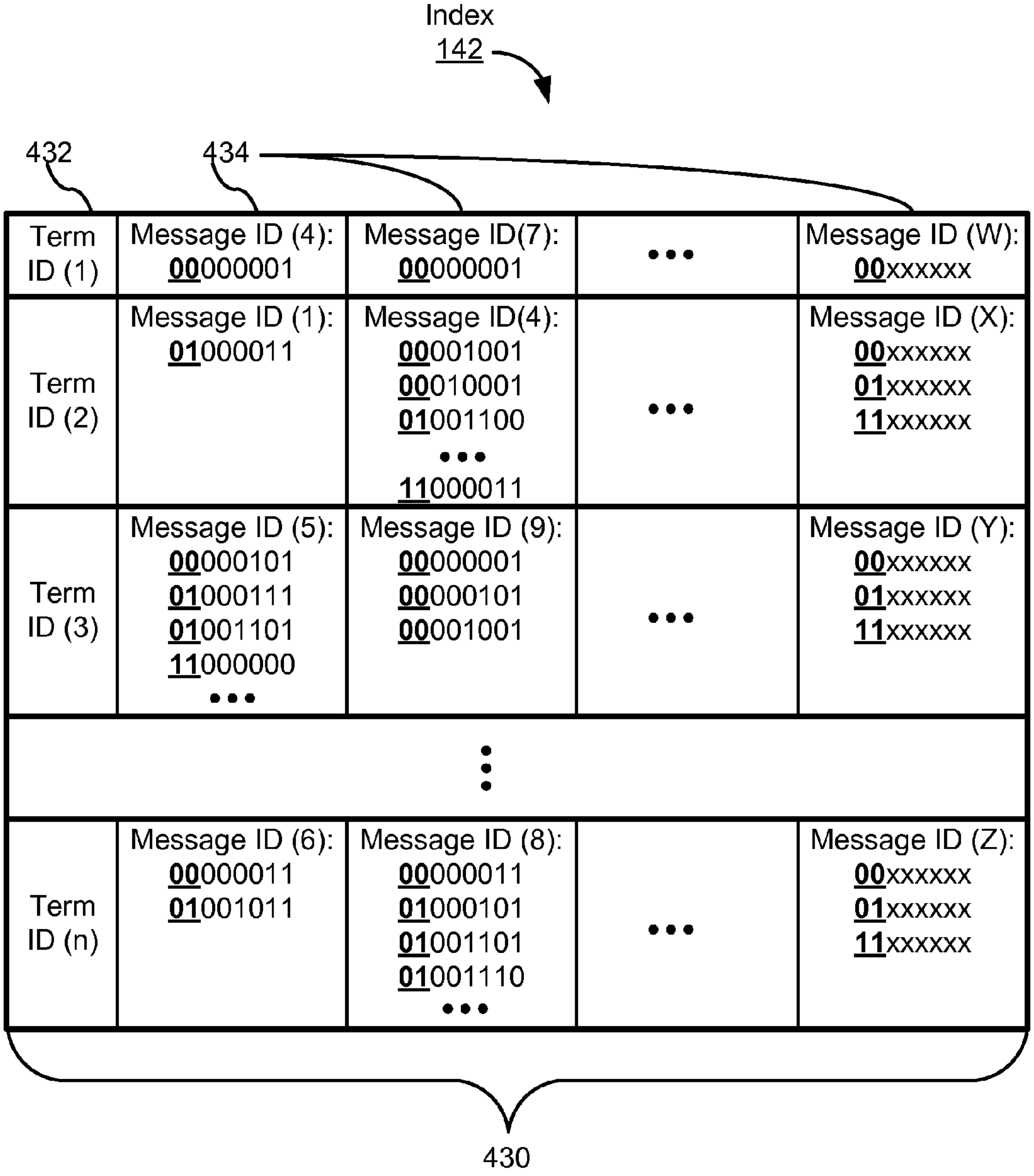

Figure 10A:
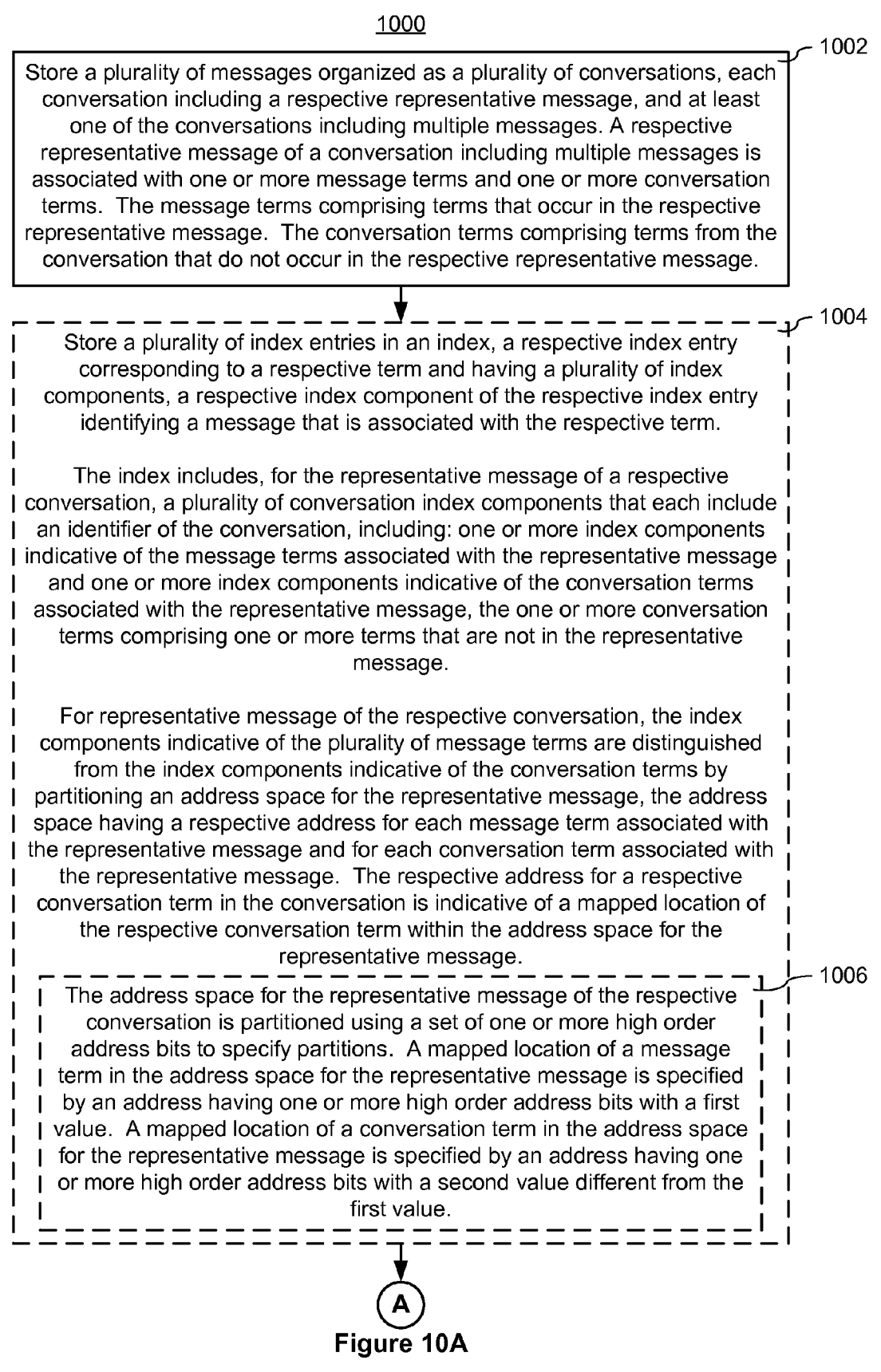

Store a plurality of messages organized as a plurality of conversations, each conversation including a respective representative message, and at least one of the conversations including multiple messages. A respective representative message of a conversation including multiple messages is associated with one or more message terms and one or more conversation terms. The message terms comprising terms that occur in the respective representative message. The conversation terms comprising terms from the conversation that do not occur in the respective representative message.

1004

Store a plurality of index entries in an index, a respective index entry corresponding to a respective term and having a plurality of index components, a respective index component of the respective index entry identifying a message that is associated with the respective term.

The index includes, for the representative message of a respective conversation, a plurality of conversation index components that each include an identifier of the conversation, including: one or more index components indicative of the message terms associated with the representative message and one or more index components indicative of the conversation terms associated with the representative message, the one or more conversation terms comprising one or more terms that are not in the representative message.

For representative message of the respective conversation, the index components indicative of the plurality of message terms are distinguished from the index components indicative of the conversation terms by partitioning an address space for the representative message, the address space having a respective address for each message term associated with the representative message and for each conversation term associated with the representative message. The respective address for a respective conversation term in the conversation is indicative of a mapped location of the respective conversation term within the address space for the representative message.

1006

The address space for the representative message of the respective conversation is partitioned using a set of one or more high order address bits to specify partitions. A mapped location of a message term in the address space for the representative message is specified by an address having one or more high order address bits with a first value. A mapped location of a conversation term in the address space for the representative message is specified by an address having one or more high order address bits with a second value different from the first value.

INDEXING QUOTED TEXT IN MESSAGES IN CONVERSATIONS TO SUPPORT ADVANCED CONVERSATION-BASED SEARCHING

RELATED APPLICATIONS

This application is a continuation of U.S. patent application Ser. No. 13/220,666, filed Aug. 29, 2011, entitled "Index Entries Configured to Support Both Conversation and Message Based Searching," which claimed priority to U.S. Provisional Patent Application No. 61/512,364, filed Jul. 27, 2011, both of which are hereby incorporated by reference in their entirety.

TECHNICAL FIELD

The present disclosure relates generally to the field of computer systems, and in particular, to a system and method for managing a large number of electronic communications in an efficient and user-friendly manner.

BACKGROUND

Every day, people send and receive millions of email (also written as "e-mail") messages over computer networks for business and leisure. Email, being convenient, easy to use and close to instantaneous in many cases, has become an extremely popular communication channel for people to exchange information.

Traditionally, email messages arriving at a user's email account are displayed by a dedicated email client or in web browser window individually, in a chronological order, e.g., the most recent message appears at top of the browser window while the oldest one appears at the bottom of the browser window. However, it is common that multiple messages sent by two or more people at different times may cover a same topic. Viewing the messages together would assist the user in understanding the individual messages in the proper context.

Thus, in some conventional email messaging programs, email messages may be organized into conversations. However, even where email messages are organized into conversations, the messages are still searched as individual entities rather than searching conversations as a whole. This is partially because conventional approaches to indexing typically do not simultaneously enable both message based and conversation based searching due to the prohibitive cost of maintaining data structures enabling message based searching concurrently with data structures enabling conversation based searching. As more users begin to use messaging programs where emails are organized into conversations, the lack of full conversation-based searching for messaging systems becomes increasingly problematic as users are unable to perform simple conversation-based searches.

SUMMARY

Therefore, it would be advantageous to provide a system and method to generate and maintain data structures enabling support conversation-based searching. Moreover, users may switch between conversation-based searching and message-based searching and may desire to perform some searches that employ either conversation-based searching or message-based searching or a combination of both without unnecessarily duplicating data structures such as indexes. These and other problems with conventional electronic communication systems described above are reduced or eliminated by the systems and methods described below.

Systems, methods, and non-transitory computer readable storage mediums for indexing quoted text in messages in conversations to support advanced conversation-based search are provided.

In some implementations, a method includes: at a computer having one or more processors and memory storing one or more programs for execution by the one or more processors so as to perform the method: obtaining a plurality of index entries in an index. A respective index entry corresponding to a respective term in one or more messages, and has a plurality of index components; a respective index component of the respective index entry identifying a message that is associated with the respective term. The method further includes, responsive to receiving a first message; updating the index by: associating the first message with a conversation having one or more other messages; identifying text in the first message as quoted text based on text that occurs in one or more of the other messages of the conversation; and updating, in the index, a plurality of first-message index components that each includes an identifier of the first message, which includes; one or more original text index components that correspond to terms that occur in original text of the first message; and one or more quoted text index components that correspond to terms in the first message that occur in the quoted text of the first message. The one or more quoted text index components include information indicating that the corresponding terms are terms in the quoted text of the first message.

In some implementations, the method further comprises, responsive to a search query having one or more query terms; identifying messages including at least one query term in the one or more query terms by searching the index. The searching distinguishes between (A) matches of a query term with original text index components and (B) matches of a query term with quoted text index components.

In some implementations, a respective index component for a particular term in the quoted text includes a mapped location that corresponds to an original location of the particular term in the quoted text.

In some implementations, the mapped location of the particular term is in a predefined range of locations associated only with terms in the quoted text.

In some implementations, identifying quoted text in the first message includes: comparing text in the first message to text from a prior message in the conversation; identifying matching text in the prior message; and identifying the matching text as quoted text.

In some implementations, the method further comprises, after identifying quoted text in the first message: receiving a second message that is a prior message in the conversation; associating the second message with the conversation; and updating the quoted text in the first message based on the text that occurs in the second message.

In some implementations, the method further comprises, deleting a respective message that is a prior message in the conversation; and updating the quoted text in the first message based on the text that occurred in the respective message.

In some implementations, the method further comprises, receiving a request for the first message; and in response to the request, formatting for display a portion of the first message that excludes at least a portion of the quoted text.

In some implementations, the method further comprises, receiving a request for the conversation including the first message; and in response to the request, formatting for display a portion of the first message that excludes the quoted text and at least a portion of a second message in the conversation that includes the quoted text.

In some implementations, the method further comprises, obtaining a search query having one or more query terms; and performing a search of the index to identify messages including one or more of the query terms. Index components corresponding to terms in the quoted text are ignored while performing the search.

In some implementations, the method further comprises, obtaining a search query having one or more query terms; identifying the conversation including the first message as matching the search query. The original text of the first message includes a first set of one or more terms that match one or more of the query terms and the quoted text of the first message includes a second set of one or more terms that match one or more of the query terms. The method also comprises, highlighting terms in the first set of terms; and forgoing highlighting terms in the second set of terms.

In some implementations, the method further comprises, identifying a third set of one or more terms in a second message of the conversation that match one or more of the query terms; and highlighting terms in the third set of terms.

In some implementations, the address space for the first message is partitioned using a set of one or more high order address bits to specify partitions; a mapped location of a term that occurs in original text of the first message in the address space for the first message is specified by an address having one or more high order address bits with a first value; and a mapped location of a term that occurs in quoted text of the first message in the address space for the first message is specified by an address having one or more high order address bits with a second value different from the first value.

Systems and non-transitory computer readable storage medium having instructions for executing one or more steps of the above-described methods are also provided.

In some implementations, computer systems (e.g., a conversation client system or conversation server system) including one or more processors, memory, and one or more programs configured to be executed by the one or more processors and including instructions for performing the operations of the methods described above are provided.

In some implementations, non-transitory computer readable storage mediums storing therein instructions which when executed by one or more processors, cause a computer system (e.g., conversation client system or conversation server system, etc.) to perform the operations of the methods described above are also provided.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIGS. 4A-4E are block diagrams illustrating data structures for storing data associated with users, messages and conversations for use by a conversation server system, in accordance with some embodiments.

FIGS. 10A-10E include a flow chart illustrating a method for performing both conversation based queries and message based queries, in accordance with some embodiments.

DESCRIPTION OF EMBODIMENTS

The present disclosure is directed to a system and corresponding method of organizing, storing, indexing and displaying messages sent to and by a user, such as in a client-server system (e.g., a web email system) or a computer system configured to enable local searching of electronic communications. In some embodiments, messages are organized and indexed as conversations. A conversation includes one or more relevant messages covering a conversation topic. As will be described below, additional criteria, beyond the conversation topic, may be used to determine which messages are associated with each distinct conversation. The senders and recipients of the messages associated with a conversation are participants of the conversation. In some embodiments, all the messages directed to a user are grouped into a plurality of conversations and presented to the user in a conversation-based format, individually or jointly. In other embodiments, the messages are each treated as individual entities in a message-based format which can be separately stored, displayed, and retrieved in response to search queries. Optionally, a user may be provided with the ability to switch between the conversation-based format and the message-based format.

Figure 1:
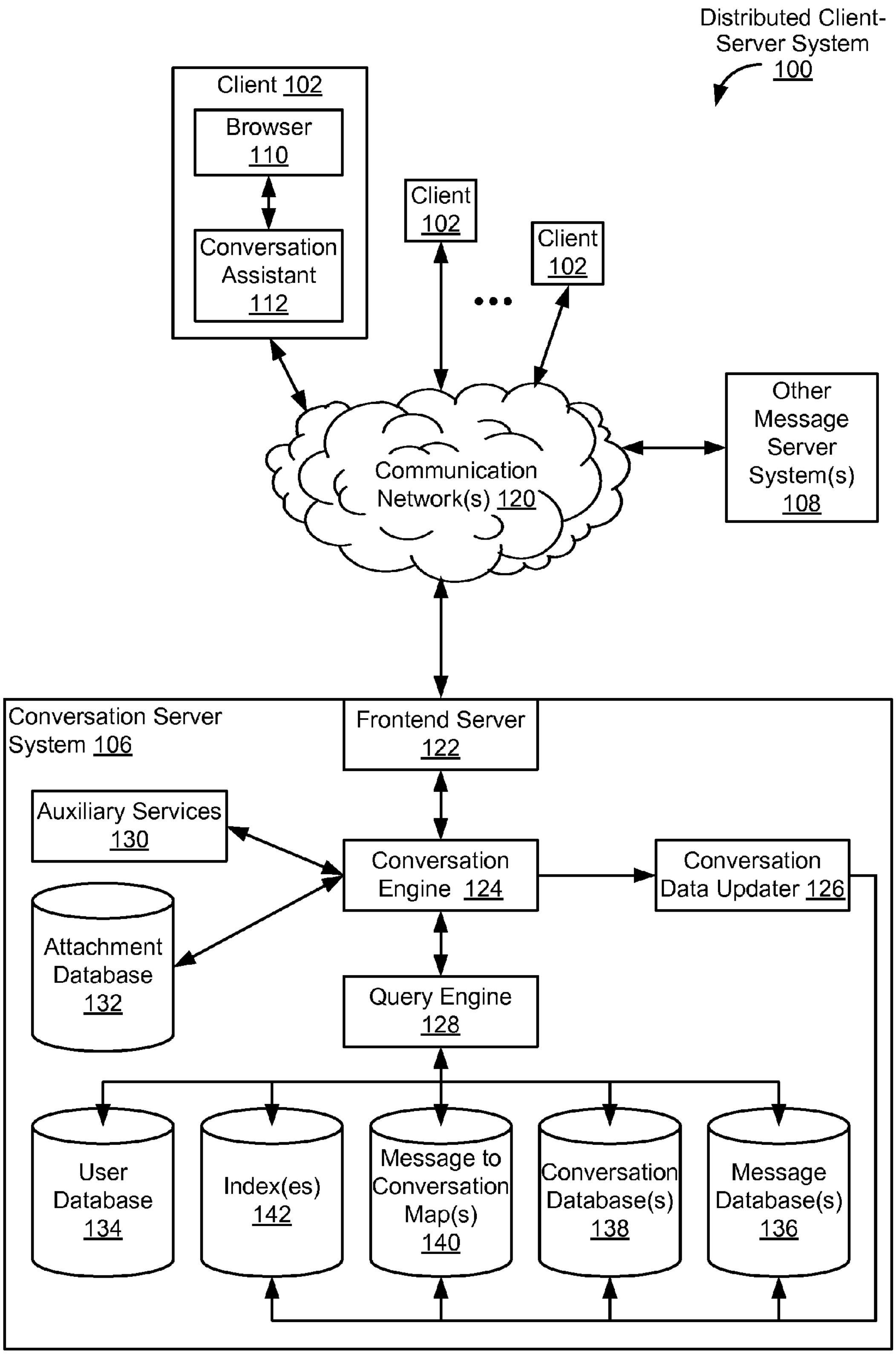
FIG. 1 is a block diagram illustrating a distributed client-server system, in accordance with some embodiments.

FIG. 1 a block diagram illustrating an exemplary distributed client-server system 100 (e.g., a web email system) for managing conversation data. System 100 includes one or more Conversation Client System(s) 102 (also referred to herein as "Client 102"), a Conversation Server System 106 (also referred to herein as "Server 106") and a Communication Network 120 for connecting Clients 102 to Conversation Server System 106 and, optionally one or more Other Message Server Systems 108 (e.g., other servers hosting different communication services such as email providers, instant messenger providers, and the like). Communication Network 120 may include the Internet, one or more local area networks (LANs), one or more wide area networks (WANs), other types of networks, or a combination of such networks.

A Client 102 may include a Browser 110 and a Conversation Assistant 112. Browser 110 can be a general purpose Internet browser (sometimes called a Web browser) having a browser window used for displaying the conversations, or it can be a dedicated browser application having a window for displaying conversations. The conversations and messages in the conversations may be rendered by Browser 110 using hypertext markup language (HTML) or any other appropriate rendering methodology. After a user submits a request through Browser 110 or a stand-alone Conversation Assistant 112 to Server 106 to access messages and/or conversations stored in the user's account, Server 106 identifies a plurality of messages and/or conversations in the user's account according to the user's request and transfers the messages and/or conversations and, optionally, a set of display information back to Client 102. Conversation Assistant 112 uses the messages and/or conversations and display information to render the messages and/or conversations at Client 102. Alternatively, Conversation Assistant 112 may exist and operate at Server 106 and may send information to Browser 110 for display at Client 102.

Conversation Server System 106 includes Frontend Server 122, Conversation Engine 124, Conversation Data Updater 126, Query Engine 128, Auxiliary Services 130, Attachment Database 132, User Database 134, one or more Message Databases 136, one or more Conversation Databases 138, one or more Message to Conversation Maps 140, and one or more Indexes 142.

Frontend Server 122 relays requests from Clients 102 and other Message Server Systems 108 via Communications Network 120 and to Conversation Engine 124 and transmits responses from Conversation Engine 124 to Clients 102 and Other Message Server Systems 108. Conversation Engine 124 processes requests and input from Clients 102 to update conversation data stored in Conversation Server System 106 and is also connected to various Auxiliary Services 130, such as spell checkers, advertising services, appointment scheduling services, attachment management, spam detection, etc. When conversation data is updated, Conversation Engine 124 passes instructions to Conversation Data Updater 126 to update conversation data for a user such as Message Database 136, Conversation Database 138, Message to Conversation Map 140, and Index 142. Additionally, Conversation Engine 124 may store attachments associated with messages and/or conversations in Attachment Database 132. Query Engine 128 is connected to User Database 134, Message Database(s) 136, Conversation Database(s) 138, Message to Conversation Map(s) 140, and Index(es) 142 and receives queries from Conversation Engine 124 and passes results retrieved from the conversation data structures to Conversation Engine 128 for use in responding to requests from Clients 102 and/or Other Message Server Systems 108.

Conversation Engine 124 responds to a variety of requests from Client 102 (e.g., from requests issued on behalf of a user by Conversation Assistant 112 or Browser 110) related to messages and returns conversation-based responses via its connection with Communication Network 120. In some embodiments, Frontend Server 122 includes a Mail Transfer Protocol Gateway (e.g., a Simple Mail Transfer Protocol Gateway or SMTP Gateway), which receives and sends messages. In some embodiments, Frontend Server 122 (e.g., SMTP Gateway), for example, transmits and receives messages using the Simple Mail Transfer Protocol (SMTP). Frontend Server 122 (e.g., SMTP Gateway) may receive a new message from Communication Network 120 and send the new message to Conversation Engine 124 for additional processing. Additionally, Frontend Server 122 (e.g., SMTP Gateway) receives messages from Conversation Engine 124 and then transmits (via Communication Network 120) those messages to the recipient addresses specified in the messages.

Figure 2:
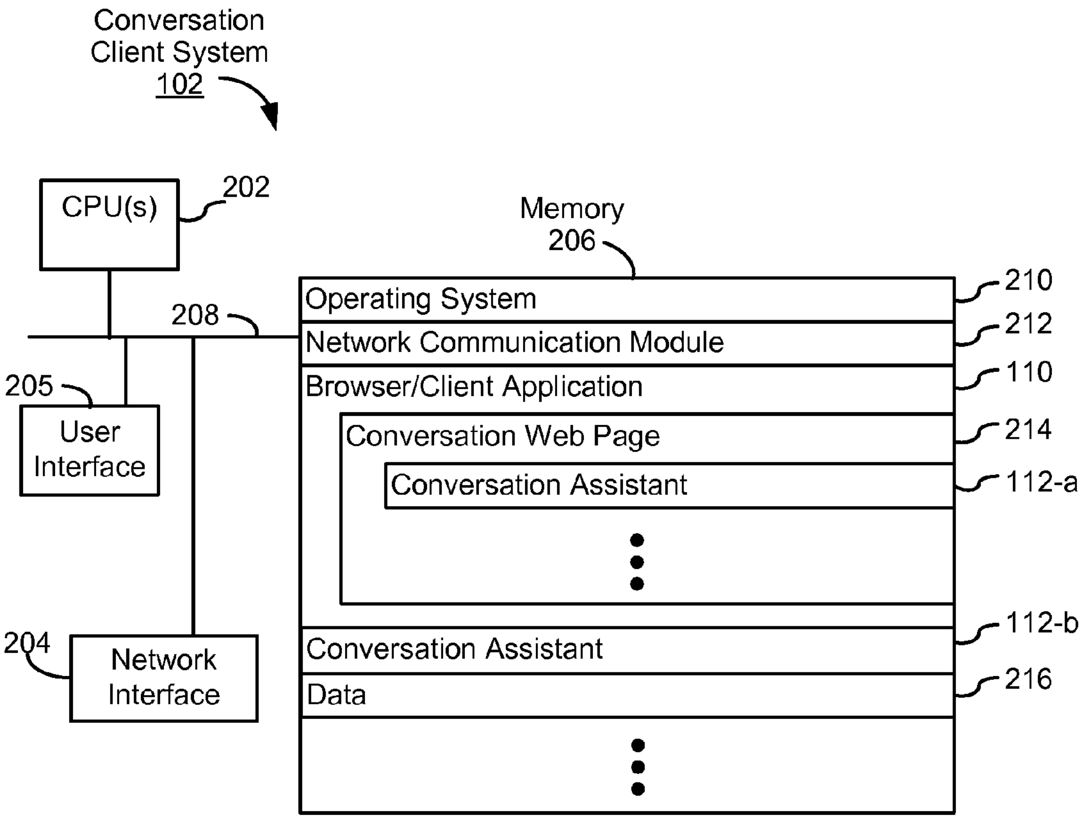
FIG. 2 is a block diagram illustrating a conversation client system, in accordance with some embodiments.

FIG. 2 is a block diagram illustrating a Conversation Client System 102 in accordance with some embodiments. Client 102 typically includes one or more processing units CPU(s) 202, one or more network or other Communication Interfaces 204, Memory 206, a User Interface 205 (e.g., comprising a display device and a keyboard, mouse, touchpad, touchscreen or other input device), and one or more Communication Buses 208 for interconnecting these components. Memory 206 typically includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- an Operating System 210 that includes procedures for handling various basic system services and for performing hardware dependent tasks;
- a Network Communication Module (or instructions) 212 that is used for connecting Conversation Server System 102 to other computers (e.g., Conversation Server System 106 or Other Message Server Systems 108) via one or more Network Interfaces 204 (wired or wireless) and one or more Communication Networks 120 (FIG. 1), such as the Internet, other wide area networks, local area networks, metropolitan area networks, and so on;
- a Web Browser 110 for loading web pages such as a Conversation Web Page 214, which optionally includes code for executing a Conversation Assistant 112-*a* as an embedded application in Conversation Web Page 214, where Conversation Assistant 112-*a* sends requests to Server 106 and displays data received from Server 106;
- optionally, a dedicated Conversation Assistant 112-*b* (e.g., a stand-alone email client) for sending requests to Server 106 and displaying data received from Server 106; and
- optionally, Data 216 such as cached conversation data (e.g., recently accessed messages, attachments, etc.).

Each of the above identified modules, applications or programs corresponds to a set of instructions, executable by the one or more processors of Client 102, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, Memory 206 stores a subset of the modules and data structures identified above. Furthermore, Memory 206 may store additional modules and data structures not described above.

Figure 3:
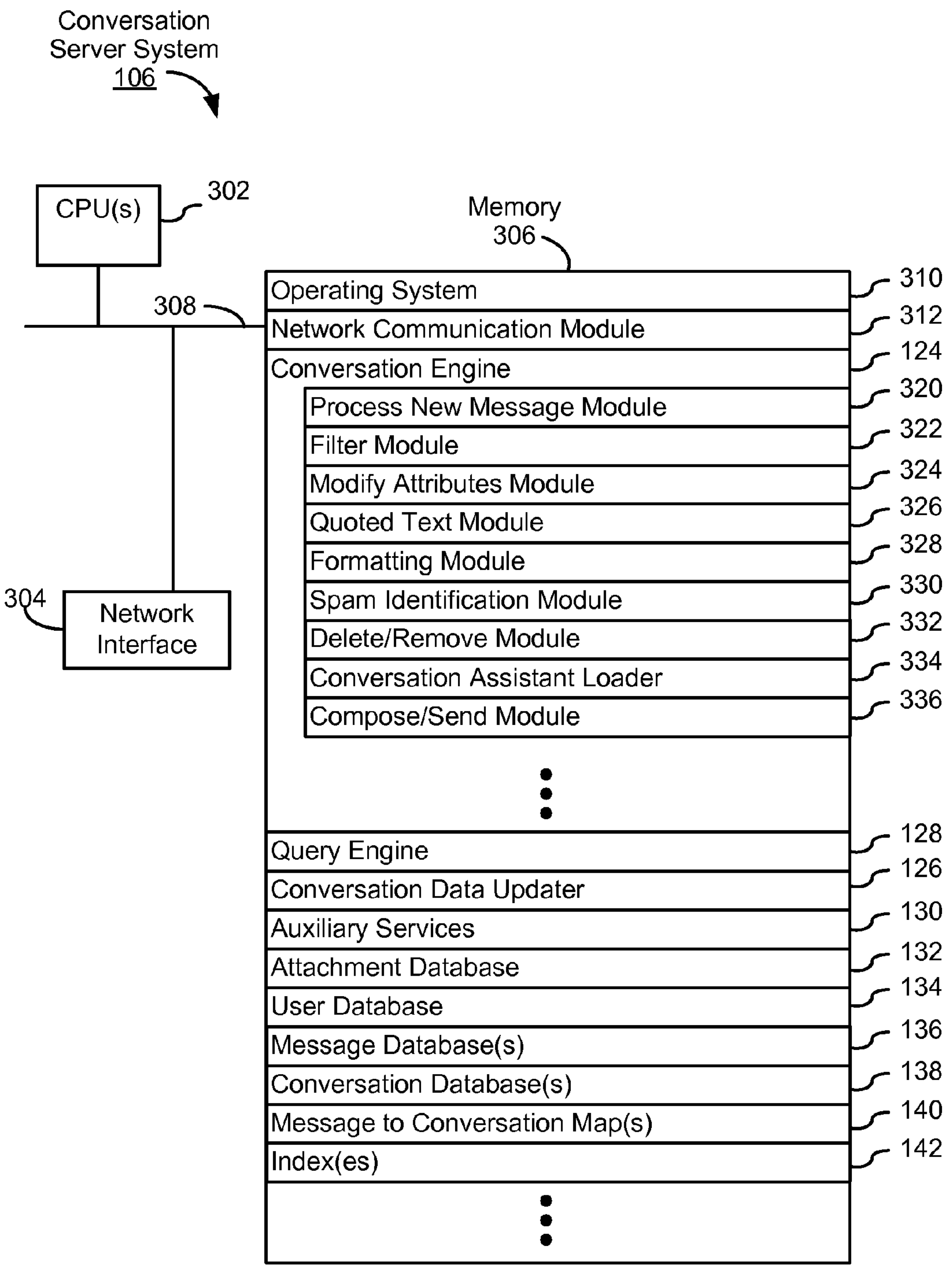
FIG. 3 is a block diagram illustrating a conversation server system, in accordance with some embodiments.

FIG. 3 is a block diagram illustrating a Conversation Server System 106 in accordance with some embodiments. Conversation Server System 106 typically includes one or more processing units CPU(s) 302, one or more network or other Communications Interfaces 308, Memory 306, and one or more Communication Buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- an Operating System 310 that includes procedures for handling various basic system services and for performing hardware dependent tasks;
- a Network Communication Module (or instructions) 312 that is used for connecting Server 106 to other computers (e.g., Client 102) via one or more Network Interfaces 304 (wired or wireless) and one or more Communication Networks 102 (FIG. 1), such as the Internet, other wide area networks, local area networks, metropolitan area networks, and so on;
- a Conversation Engine 124 module for responding to requests from, and providing responses to, Conversation Assistant 112 as described earlier, Conversation Engine 124 may include:
  - a Process New Message Module 320 for processing new messages;
  - Filter Module 622 for creating, monitoring, and carrying out filters (e.g., user-defined rules for managing incoming and/or outgoing messages);
  - a Modify Attributes Module 324 for modifying attributes such as labels associated with conversations and messages;
  - a Quoted Text Module 326 for identifying quoted text in new messages as they are received and identifying changes in quoted text when messages and/or conversations are modified (e.g., by adding or deleting messages);
  - a Formatting Module 328 for providing formatting information to be supplied to Conversation Assistant 112 at Client 102 (FIG. 1) for displaying conversation lists (including one or more concise message headers), message lists, conversations views (including one or more messages) and/or message views;
  - a Spam Identification Module 330 for identifying messages as spam based on predefined criteria (e.g., system-defined criteria or user-defined criteria);
  - a Delete/Remove Module 332 for marking messages and/or conversations for deletion and subsequently removing them;
  - a Conversation Assistant Loader 334 for providing to Conversation Assistant 112 at Client 102 (FIG. 1) information that allows Conversation Assistant 112 to process information supplied to it from Server 106. In some embodiments, when Client 102 is first connected to Server 106 (e.g., when a user loads a web page for access to a messaging account), Conversation Assistant Loader 334 is invoked to load a conversation assistant to Client 102. In some embodiments, Conversation Assistant Loader 334 loads Conversation Assistant 112 onto Client 102 each time that a messaging session is initiated at Client 102, while in other embodiments Conversation Assistant 112 is retained by Client 102 from one messaging session to another;
  - a Compose/Send Module 336 for transmitting messages composed by a user of Client 102 to Frontend Server 122 (FIG. 1) for delivery to other users (e.g., users of messaging accounts associated with Other Messaging Server Systems 108).
- a Query Engine 128 for processing search queries including user-generated search queries and system-generated search queries;
- a Conversation Data Updater 126 for updating conversation data (e.g., indexes, tables, databases, etc.) at Server 106 to reflect changes in messages and/or conversations;
- Auxiliary Services 130 such as procedures for spelling correction, attachment management, advertising services, appointment scheduling services, attachment management, etc;
- an Attachment Database 132 for storing attachments associated with messages and/or conversations, Attachment Database 132 may segregate attachments for individual users or may store attachments in a shared repository so that if multiple users have access to a single respective attachment, only one copy of the respective attachment is stored in Attachment Database 132;
- a User Database 134 storing information about users of Server 106, as described in greater detail below with reference to FIG. 4A;
- a Message Database 136 storing information about messages for Server 106, as described in greater detail below with reference to FIG. 4D; in some embodiments, Server 106 stores a separate Message Database 136 for each user;
- a Conversation Database 138 storing information relating messages in Message Database 136 together as conversations, as described in greater detail below with reference to FIGS. 4D-4E; in some embodiments, Server 106 stores a separate Conversation Database 138 for each user;
- a Message to Conversation Map 140 storing information enabling conversations to be identified based on message identifiers, as described in greater detail below with reference to FIG. 4D; in some embodiments, Server 106 stores a separate Message to Conversation Map 140 for each user; and
- an Index 142 storing information enabling messages and/or conversations matching a search query to be identified, as described in greater detail below with reference to FIGS. 4B-4C; in some embodiments, Server 106 stores a separate Index 142 for each user.

Each of the above identified modules, applications or programs corresponds to a set of instructions, executable by the one or more processors of Server 106, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, Memory 306 stores a subset of the modules and data structures identified above. Furthermore, Memory 306 may store additional modules and data structures not described above.

Although FIG. 3 shows a "Conversation Server System" 106 FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Conversation Server System 106 and how features are allocated among them will vary from one implementation to another, and may depend in part on the amount of data traffic that the system must handle during peak usage periods as well as during average usage periods.

User, Message and Conversation Data Structures

FIG. 4A illustrates a User Database 134 according to some embodiments. User Database 134 stores information pertaining to users of Conversation Server System 106. The information stored includes a User Identifier 402 (e.g., a globally unique identifier that is associated with a particular user account such as an N-bit binary number). This User Identifier 402 can be used to identify conversation data structures (e.g., databases tables, maps, indexes, etc.) that are associated with the user. The information stored in User Database 134 may also include User Information 404 relating to user preferences, security information, recently submitted queries, user-defined filters, address and other information for contacts of the user, calendar information, a user profile including contacts, etc. The user-defined filters are used by Server 106 to perform operations on messages and/or conversations upon detection of predefined events (e.g., during the processing of each new message as it is being added to the user's mail account). User Database 134 may also include information representing user-defined labels, which can be applied to messages at the request of the user. In embodiments where conversation data structures are stored on a per-user basis, User Database 134 relates a respective User Identifier 402 to the Index, Message to Conversation Map, Conversation Database and Message Database for the user via Index Pointer 408, Message to Conversation Map Pointer 410, Conversation Database Pointer 412 and Message Database Pointer 414, respectively. In other words, an index for a particular user may be associated with the particular user so that a search query from the particular user is performed over the index for the particular user and thus returns a first set of results, while a search query from a different user is performed over the index for the different user and thus returns a second set of results that is different from the first set of results.

As described above, the Index(es) 142 are used to generate results in response to search queries. In conventional indexes, terms in a message are associated only with the message. Thus, when a search is performed over a conventional index (e.g., "Tahoe AND dinner"), the results include only messages that match the query (e.g., messages that include both the terms "Tahoe" and "dinner"). This approach works for many applications where messages are the primary unit of information. However, when messages are organized as conversations and the conversations are used as the primary unit of information, users will expect that a search query will be performed over the conversation as a whole. For example, a user would expect a search query for a conversation that includes one message with the term "Tahoe" and another message with the term "dinner" to be returned in response to the search query "Tahoe" and "dinner" even if none of the individual messages in the conversation include both the terms "Tahoe" and "dinner." However, a purely message-based index will not return conversations including query terms divided over different messages.

One possible solution is to create two separate indexes, one that indexes messages and another separate index that indexes conversations. However, this approach is inefficient because it dramatically increases the processing and storage cost of indexing and retrieving the messages and conversations, because multiple separate indexes (e.g., a message index and a conversation index) need to be created and updated and subsequently searched when a search query is received. The embodiments of an index described below refer to an index that enables both message-based and conversation-based queries, thereby providing predictable results to users while dramatically reducing the processing and storage cost of indexing and retrieving messages and conversations.

Figure 4B:
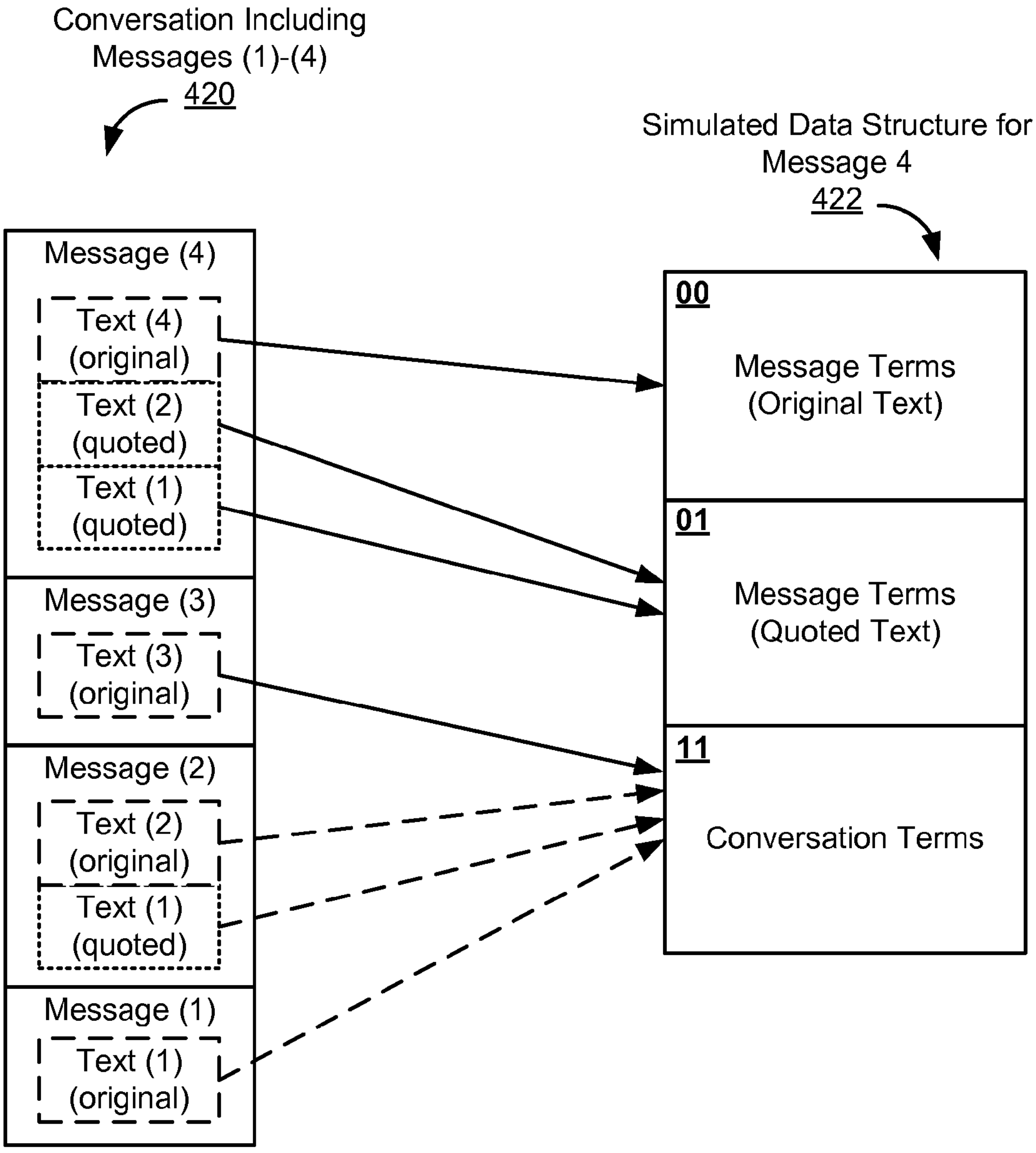

FIG. 4B illustrates a schematic illustration of an exemplary conversation 420 including four messages and an exemplary Simulated (e.g., virtual) Data Structure 422 for the fourth message (e.g., the most recent message in the conversation). The Simulated Data Structure 422 indicates "mapped" locations of terms in the conversation that correspond to original locations of the terms in the conversation that includes the four messages. As used herein, the terms may include any combination of text content terms (e.g., text from the message body of a message in the conversation), labels, tags, and/or header information from the messages and the conversation. In the conversation an earliest message (Message 1) includes original text (Text 1); a reply (Message 2) to the earliest message (Message 1) includes original text (Text 2) and quoted text (Text 1) from the first message; another message (Message 3) includes original text (Text 3) that is not in any of the other messages; and a most recent message (Message 4) to the second message (Message 2) includes original text (Text 4) and quoted text (Text 1 and Text 2) from multiple previous messages. The terms in the most recent message (Message 4) are identified as "Message Terms" and in some embodiments are divided between "original text" and "quoted text" terms. The terms in the other messages are all identified as "conversation terms." It should be noted that the exemplary conversation described with reference to FIG. 4B corresponds in structure to the conversation illustrated in the exemplary user interfaces illustrated in FIG. 11C (where message 1 corresponds to the chronologically first message in the conversation and message 2 corresponds to the next message in chronological order, etc.).

In this example, Message 4 is selected as a "representative message" for the conversation, and a Simulated Data Structure 422 for Message 4 includes three partitions, where original terms in the conversation have original locations within the conversation that correspond to mapped locations within the simulated data structure. In some embodiments the locations are specified by N+M bit binary numbers, wherein the N highest order bits are selected in accordance with the partition to which the term is assigned and the M other bits are used to specify the location of the terms within the partition. In the example shown in FIG. 4B, there are two high order bits, and all of the terms identified as message terms in the original text have the high order bits "00" in the simulated data structure for Message 4, while all of the terms identified as message terms in the quoted text have high order bits "01" in the simulated data structure for Message 4, and all of the terms identified as conversation terms have high order bits "11" in the simulated data structure for Message 4. Alternatively the partitions for the message terms could be merged and a single set of high order bits (e.g., "00") could be used for all message terms without regard to whether the terms occur in original text or quoted text of the message.

The M lower order bits are typically used to specify locations within each of the partitions that correspond to the order in which the terms occur in the conversation itself. In other words, in some implementations, consecutive words in a sentence or paragraph are given mapped locations with consecutive mapped locations within a partition. Preserving the relative locations and order of terms within the partitions is advantageous, because it enables conversation-based searches that include location and/or order constraints (e.g., “Term X within 3 words for Term Y” or “Term X followed by Term Y”) to retrieve conversations that include conversation terms matching the location and/or order constraints. For example, a text string such as “Lake Tahoe” could be identified in the conversation index components for a representative message, because location and order of terms from messages in the conversation is preserved for conversation terms in Simulated Data Structure 422. Additionally, labels, tags and other items of header information that do not have specific locations in the text content of a message may be assigned a set of one or more predefined locations within the message or conversation. In one example, for one predefined location, such as location 0, is assigned to all message metadata (e.g., labels, tags, header information and any other information that does not have a location in the body of a message). Furthermore, for representative messages, a second predefined location, such as location $2^{20}$ (e.g., a first position in the partition of the simulated data structure for conversation terms) is assigned to message metadata of messages in the conversation, but not in the representative message, also herein called conversation metadata.

In some embodiments, different types of metadata are indexed differently. For example, labels may be assigned a predefined location, such as location 0, while terms in the header information are assigned locations corresponding to the location of the header information terms in the message (e.g., if the header has five terms, the first header term is assigned location 1, the second header term is assigned location 2, etc. and the first body text term is assigned location 6). In addition, in some implementations, the header information terms are indexed differently from the body text terms. For instance header information terms may have a custom format. In one exemplary implementation of a system using a custom format for header information, when a message is sent to a user with an identifier “UserName@email.com,” the term corresponding to the header information indicating that the email was sent to UserName@email.com is indexed as “TO_UserName” rather than “UserName@email.com.” Alternatively, header information terms are indexed using both a custom format (e.g., “TO_UserName”) as well as a standard format (e.g., “UserName@email.com”). Thus, a single term in the header text may be represented by multiple index components in different index entries in the index (e.g., an index entry for “TO_UserName” and an index entry for “UserName@email.com”).

In some embodiments, Simulated Data Structure 422 is created for a representative message in each conversation and is either temporarily or permanently stored in Message Database 136 and is used to generate Index 142. In other embodiments, Simulated Data Structure 422 is not actually created but is merely an implicit data structure that corresponds to Index 142. In other words, Index 142 is created and updated so as to associate message terms and conversation terms with each conversation's representative message as though the message terms and conversations were stored in a Simulated Data Structure 422, without actually creating the corresponding Simulated Data Structure 422. However, when a query is performed on Index 142, respective representative messages are returned in accordance with the message terms and conversation terms that appear to occur in corresponding simulated data structures, without regard to whether the simulated data structures exist or have ever existed. Thus, Simulated Data Structure 422 described above with reference to FIG. 4B can be understood to be a theoretical construct that helps to understand the indexing scheme described below with reference to FIG. 4C without regard to whether or not data is actually stored in a data structure that is organized like Simulated Data Structure 422.

FIG. 4C illustrates an exemplary Index 142. Index 142 includes a plurality of Index Entries 430, each index entry including a respective Term Identifier 432 and one or more Index Components 434. In the exemplary Index 142 illustrated in FIG. 4C, each respective index component of the respective index entry identifies a message (e.g., by a Message ID) that is associated with a respective term and a mapped location of the term within the simulated data structure for the message. For example, Term 2 occurs in Message 1 as a message term in quoted text at location 01000011, while Term 2 occurs in Message 4 as a message term in original text at locations 00001001, 00010001, as a message term in quoted text at location 010001100 and as a conversation term at location 11000011. In some embodiments, an index component corresponds to a message ID and corresponding mapped location. Thus, in the example above, the index entry for Term 2 includes at least four index components for Message 4: {Message ID (4), 00001001}, {Message ID (4), 00010001}, {Message ID (4), 010001100}, and {Message ID (4), 11000011}. It should be noted that, in this example, Message 4 is a representative message for a conversation and thus has conversation terms in addition to having message terms. In some embodiments, one of the terms is a representative-message label that identifies messages as representative messages. For example, if Term 1 is the representative-message label, then Message 4, Message 7 and Message W would each be identified in Index 142 as being representative messages for the respective conversations with which they are associated.

It should be understood that when generating the index, there is a tradeoff between the size of the index and the speed with which complex queries can be performed. In some index-size-reducing implementations which emphasize reducing the size of the index over the speed of performing complex queries quickly, repeated terms in a conversation can be represented by a reduced set of representative-message index components or even a single representative-message index component. In these index-size-reducing implementations, the size of the index is reduced by storing fewer index components than search-speed-increasing implementations, but more complex queries (e.g., queries that include location constrained terms in the conversation terms such as a search for the string “TermA TermB TermC” are performed by a multi-stage query where the first stage of the query identifies the messages in the conversation and the second stage of the query checks to see if the messages are associated with index components that satisfy the location constraints). An exemplary method for performing such location-constrained queries is described in greater detail below with reference to operations 784-786.

In contrast, in some search-speed-increasing implementations which emphasize increasing the speed of performing complex queries instead of focusing on reducing the size of the index, repeated terms in a conversation are represented by multiple different representative-message index components in an order based on a relative location of the terms corresponding to the index components in the conversation. In a simple search-speed-increasing implementation, a representative-message index component is stored for each occurrence of a term in the conversation. However, when each term in a conversation is indexed each time it occurs, there is the possibility that the index space will be used up or the index will grow very large (e.g., if users are repeatedly forwarding messages that quote the entire text of previous messages).

Thus, in a partial optimization, large blocks of repeated text (typically quoted text from a previous message) are not re-indexed (e.g., "logically complete text strings as discussed below with reference to operation 722). In either case, a complex query (e.g., a query that includes location constrained terms in the conversation terms such as a search for the string "TermA TermB TermC") can typically be performed in a single stage, thereby reducing the search time as compared with the index-size-reducing implementations. Thus, while FIG. 4C illustrates an index for an exemplary search-speed-increasing implementation, other implementations including index-size-reducing implementations and hybrid implementations are contemplated and described below.

Optionally, Term Identifier 432 for a respective term is a fixed length token value for a token representing the respective term. For example, in some implementations, the Term Identifier 432 for each distinct term in Index 142 is a 32 bit value. The terms "tokens" and "token values" are sometimes synonymous, both meaning a set of a fixed length values used the represent terms having a variety of lengths (also called text lengths).

More generally, in some embodiments, an index component includes a mapped location of a term, plus its associated Message ID which may be shared with N−1 other locations in the same data structure when there are N copies of the same term (e.g., the word "Monday") in the same conversation. In other words, index components for a single message may be organized as a set of components (also called a meta-component or component set) for a single message, where a meta-component or component set for a particular term that occurs multiple times in a message includes a single instance of a Message ID for a respective message and multiple mapped locations that correspond to original locations of occurrences of the particular term in the respective message and/or conversation with which the message is associated (if the respective message is a representative message for the conversation). Thus, in the example above, the index entry for Term 2 includes a single set of components (e.g., meta-component or component set) for Message 4, which includes Message ID (4) and at least four mapped locations that correspond to occurrences of Term 2 in the message and conversation associated with Message 4: 00001001, 00010001, 010001100 and 11000011.

It should be understood that in some embodiments only two partitions are used (e.g., a "message term" partition and a "conversation term" partition or an "original text" partition and a "quoted text" partition). In embodiments where only a "message term" partition and a "conversation term" partition are used, a single high order bit may be used (e.g., "0" for message terms and "1" for conversation terms) to identify the partition associated with each instance of a term. Similarly in embodiments where only an "original text" partition and a "quoted text" partition are used, a single high order bit may be used (e.g., "0" for message terms in the original text and "1" for message terms in the quoted text). While exemplary simulated data structures are not described for these embodiments, one having ordinary skill in the art would readily understand how the index and simulated data structures described herein could be adapted for use with more or fewer partitions by using as many high order bits as necessary to uniquely identify partitions (e.g., two high order bits could be used to identify up to four distinct partitions, three high order bits could be used to identify up to eight distinct partitions, etc.).

In some embodiments, the mapped locations of the respective index components indicative of conversation terms are in a predefined range of locations associated only with conversation terms (e.g., all locations between 11000000 and 11111111). Similarly, the mapped locations of the respective index components indicative of message terms are in a predefined range of locations associated only with message terms (e.g., all locations between 00000000 and 00111111). In some embodiments the mapped locations of the respective index components indicative of message terms in original text are in a predefined range of locations associated only with message terms in original text (e.g., all locations between 00000000 and 00111111), while the mapped locations of the respective index components indicative of message terms in quoted text are in a predefined range of locations associated only with message terms in quoted text (e.g., all locations between 01000000 and 01111111).

In some embodiments that focus on differentiating message terms from conversation terms, for a respective message of a conversation (e.g., a representative message for the conversation), index components indicative of the plurality of message terms and index components indicative of the plurality of conversation terms are stored in Index 142. In these embodiments, the one or more index components indicative of the plurality of message terms are distinguished from the one or more index components indicative of conversation terms by partitioning an address space for the respective message (e.g., the address space in a Simulated Data Structure 422, as illustrated in FIG. 4B for Message 4), the address space having a respective address for each message term and for each conversation term. In these embodiments, the respective address for a respective conversation term in the conversation including the respective message is indicative of a mapped location of the respective conversation term within the address space for the respective message.

In some of these embodiments, the address space for the respective message is partitioned using a set of one or more high order address bits (e.g., the N highest order bits, as discussed above with reference to FIG. 4B) to specify partitions. In these embodiments, a mapped location of a message term in the address space for the respective message is specified by an address having one or more high order address bits with a first value (e.g., "00" or "01"), and a mapped location of a conversation term in the address space for the respective message is specified by an address having one or more high order address bits with a second value (e.g., "11") different from the first value. In other words, for all conversation terms (e.g., terms that are in the conversation but not in the respective message) a mapped location is specified by an address having a set of high order address bits having a value that is different from the value of a set of high order address bits that are used in an address specifying a mapped location of any of the message terms (e.g., terms that are in the respective message). Additionally, in these embodiments, quoted text in the message terms may be differentiated from original text in the message terms in Index 142 by high order bits in mapped locations of the message terms, as discussed in greater detail below.

In some embodiments that focus on differentiating terms in original text from terms in quoted text in a respective message, index components indicative of terms that occur in the original text of the respective message and index components indicative of terms that occur in the quoted text of the respective message are stored in Index 142. In these embodiments, the one or more index components indicative of the terms that occur in original text of the respective message are distinguished from the one or more index components indicative of terms in the respective message that occur in the quoted text of the respective message and not in the original text of the respective message (although these terms typically appear elsewhere in the conversation, such as in the message from which the quoted text originated) by partitioning an address space for the respective message (e.g., as illustrated in FIG. 4B for Message 3), the address space having a respective address for each term that occurs in original text of the respective message and each term that occurs in quoted text of the respective message. In these embodiments, the respective address for a respective term in the quoted text of the respective message is indicative of a mapped location of the respective term within the address space for the respective message.

In some of these embodiments, the address space for the respective message is using a set of one or more high order address bits (e.g., the set of N highest order bits, as discussed above with reference to FIG. 4B) to specify partitions. In these embodiments, a mapped location of a term that occurs in original text of the respective message in the address space for the respective message is specified by an address having one or more high order address bits with a first value (e.g., "00"); and a mapped location of a term that occurs in quoted text of the respective message in the address space for the respective message is specified by an address having one or more high order address bits with a second value (e.g., "01") different from the first value. In other words, in these embodiments, for all terms for original text of the respective message a mapped location is specified by an address including a set of high order address bits having a value that is different from the value of a set of high order address bits of addresses that specify mapped locations of any of the terms for quoted text in the respective message. Additionally, in these embodiments, the index may also include high order bits that differentiate between message terms and conversation terms, as described in greater detail above. For example, the set of high order address bits (e.g., "00" or "01") of addresses that specify respective mapped locations of the message terms (e.g., terms for original or quoted text in the respective message) may have a different value than the set of high order address bits (e.g., "11") of addresses that specify respective mapped locations of the conversation terms (e.g., terms that appear in a conversation that includes the respective message but do not appear in the respective message).

A search query is processed using Index 142 by identifying one or more matching terms that match query terms from the search query. Index entries 430 for the one or more matching terms are compared (e.g., logically combined using Boolean operators) to identify Message IDs for messages matching the search query. For example, when the search includes a plurality of terms which must all be present (e.g., "Term X AND Term Y"), the Message IDs that are identified as matching the search query are Message IDs that are associated with at least one index component from the index entry for each of the query terms. In some circumstances, index components corresponding to message terms in quoted text (e.g., index components for locations including high order bits "01") can be ignored while processing the search query so as to produce search results only for terms in original text of messages. In some circumstances, index components corresponding to conversation terms (e.g., index components for locations including high order bits "11") can be ignored while processing the search query so as to produce message-based search results.

Figure 4D:
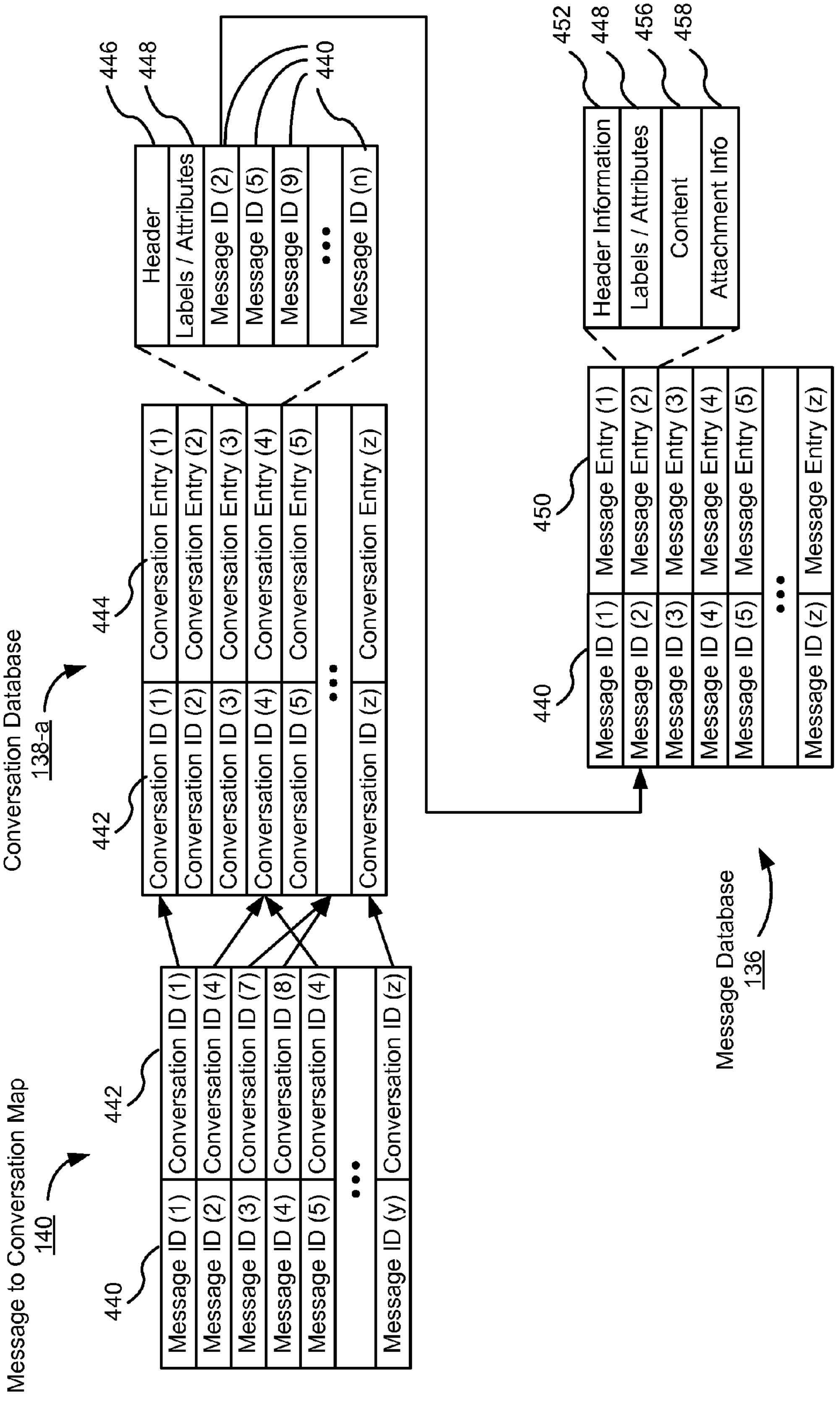
Figure 4E:
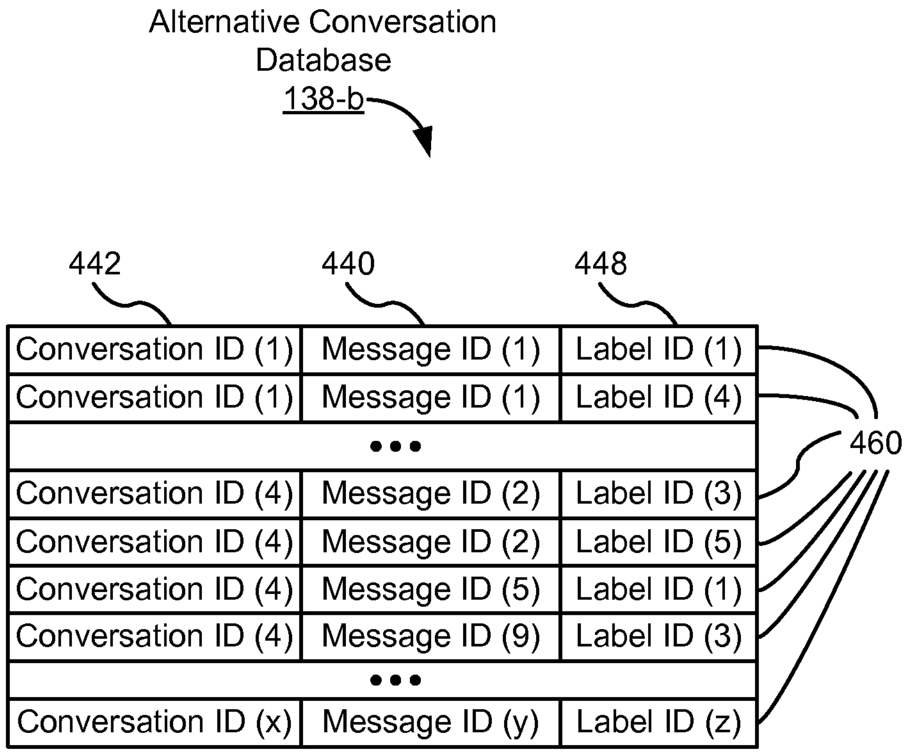

FIG. 4D illustrates an exemplary Message to Conversation Map 140, Conversation Database 138 and Message Database 136. Message to Conversation Map 140 correlates Message IDs 440 with corresponding Conversation IDs 442. Thus, when a respective message with a respective Message ID 440 is identified as matching a search query, the respective Message ID 440 can be used to identify a Conversation ID 442 for the conversation that includes the message associated with the respective Message ID. A Message ID 440 is a unique identifier for a message (i.e., unique with respect to all other messages stored for the same user). Message ID 440 may be an N-bit number that is used to reference a particular message stored in Message Database 136. In one embodiment, Message ID 440 is a 64-bit number. Optionally, message ID 440 is composed of date/time stamp information and information relating to the content of the message to which Message ID 440 refers. The date/time stamp information is optionally a Y-bit (e.g., 32-bit or 48-bit) date/time stamp provided by the system indicating when a message is received by Conversation Server System 106.

Conversation Database 138, in turn relates Conversation IDs 442 to corresponding information associated with Conversations, which may be included in corresponding Conversation Entries 444. A Conversation Entry 444 may include one or more of Header 446 information (e.g., participant information, date/time information, message subject line information, or other information specified by various standard electronic messaging formats such as the Header Information described in "Internet Message Format" Request for Comment 2822 of The Internet Society, 2001, hereinafter RFC 2822), which may be aggregated from messages associated with a conversation. The Conversation Entry 444 may also include Labels/Attributes 448, which may include conversation-specific labels and/or message labels that are aggregated from messages associated with a conversation; and Message IDs 440 for messages that are associated with a conversation (sometimes referred to as messages in the conversation, or messages in the conversation thread). Thus, when a respective conversation with a Conversation ID is identified as matching a search query, the respective Conversation ID can be used to identify a variety of conversation information including a list of Message IDs 440 for messages associated with the respective conversation.

Message Database 136, in turn, provides access to information about messages. In the embodiment shown in FIG. 4D, Message Database 136 is organized as Message Entries 450, and the information it stores about messages is typically retrieved using Message IDs 440 (e.g., the Message IDs identified via Conversation Database 138 as being associated with the respective conversation). Message Entry 450 may include, for a respective message, one or more of Header 452 information (e.g., senders/recipients, date/time information or other Header Information such as that described in RFC 2822); Labels/Attributes 448, which may include user-defined labels and/or system-defined labels; Content 456 of the respective message; and Attachment Info 458 (if any) for the respective message. Attachment Info 458 may include attachments and/or pointers to attachments in a single-user or multi-user attachment database (e.g., Attachment Database 132 in FIG. 1).

It should be understood that the data structures (e.g., databases tables, maps, indexes, etc.) described herein are merely exemplary and alternative data structures could be used in analogous manners without departing from the scope of the disclosed embodiments. For example, the conversation database may not be arranged as shown in FIG. 4D as Conversation Database 138-*a*. Rather the conversation database may have an alternative structure such as Alternative Conversation Database 138-*b* shown in FIG. 4E. Alternative Conversation Database 138-*b* also relates Conversation IDs 442 and Message IDs 440 to Label IDs 448, but unlike Conversation Database 138-*a* in FIG. 4D, these components are arranged in triplets in Alternative Conversation Database 138-*b*, where there is a separate entry 460 for each unique set of Conversation ID, Message ID and Label ID. Thus, in these embodiments, if there are multiple messages in a respective conversation, there will be multiple entries 460 for the respective conversation, at least one for each message in the respective conversation. In some of these embodiments, there are multiple entries 460 for a message with multiple labels (e.g., one entry for each label associated with the message), while in other embodiments, each entry for a conversation having a respective message includes a Conversation ID 442 for the conversation, a Message ID 440 for the respective message, and variable length component including a list of all Label IDs 448 associated with the respective message. Additional alternative data structures are not described herein so as not to unnecessarily obscure relevant aspects of the disclosed embodiments.

Figure 5A:
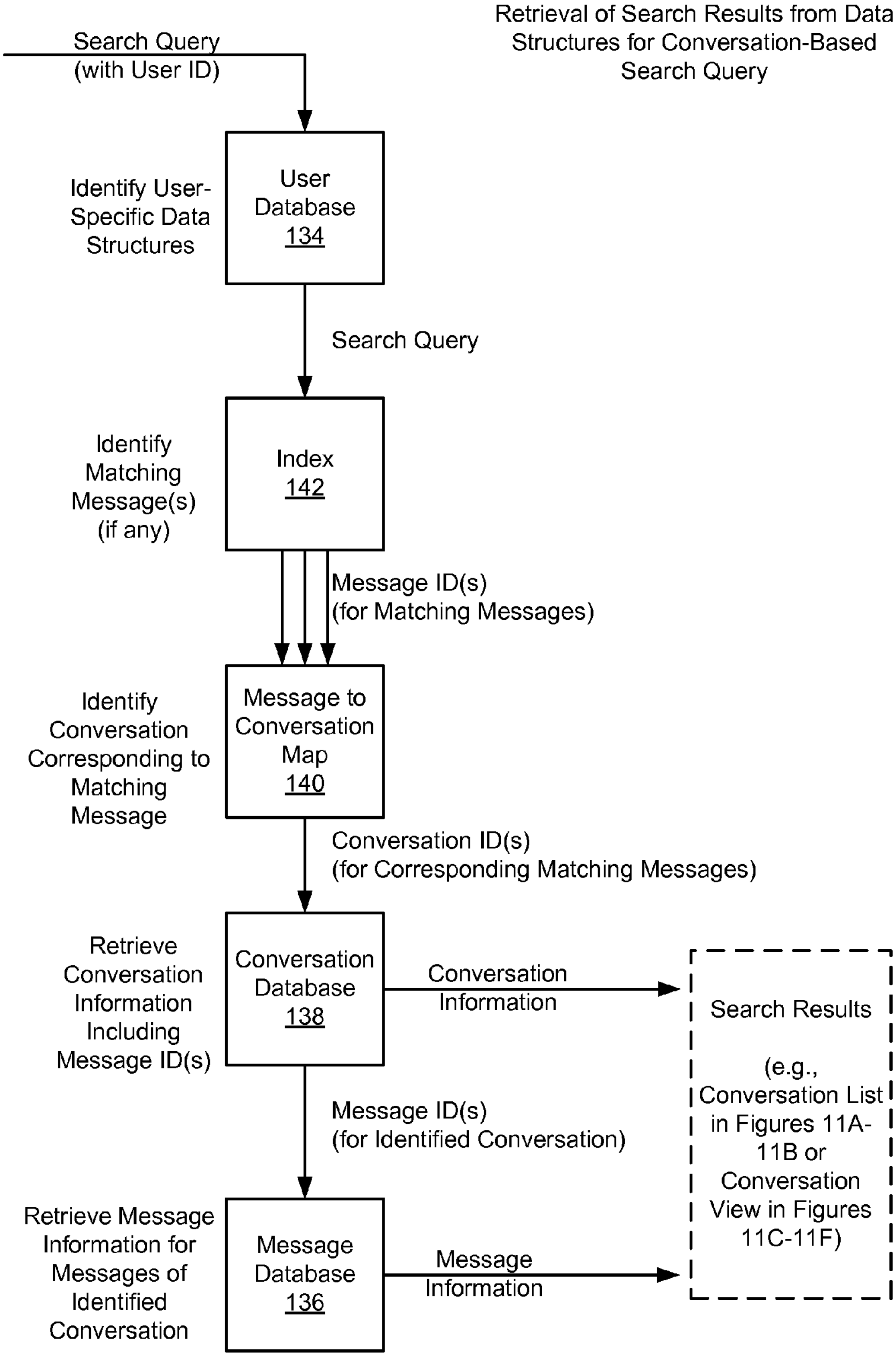
FIGS. 5A-5B are block diagrams illustrating a flow of data through data structures of a conversation server system, in accordance with some embodiments.
Figure 5B:
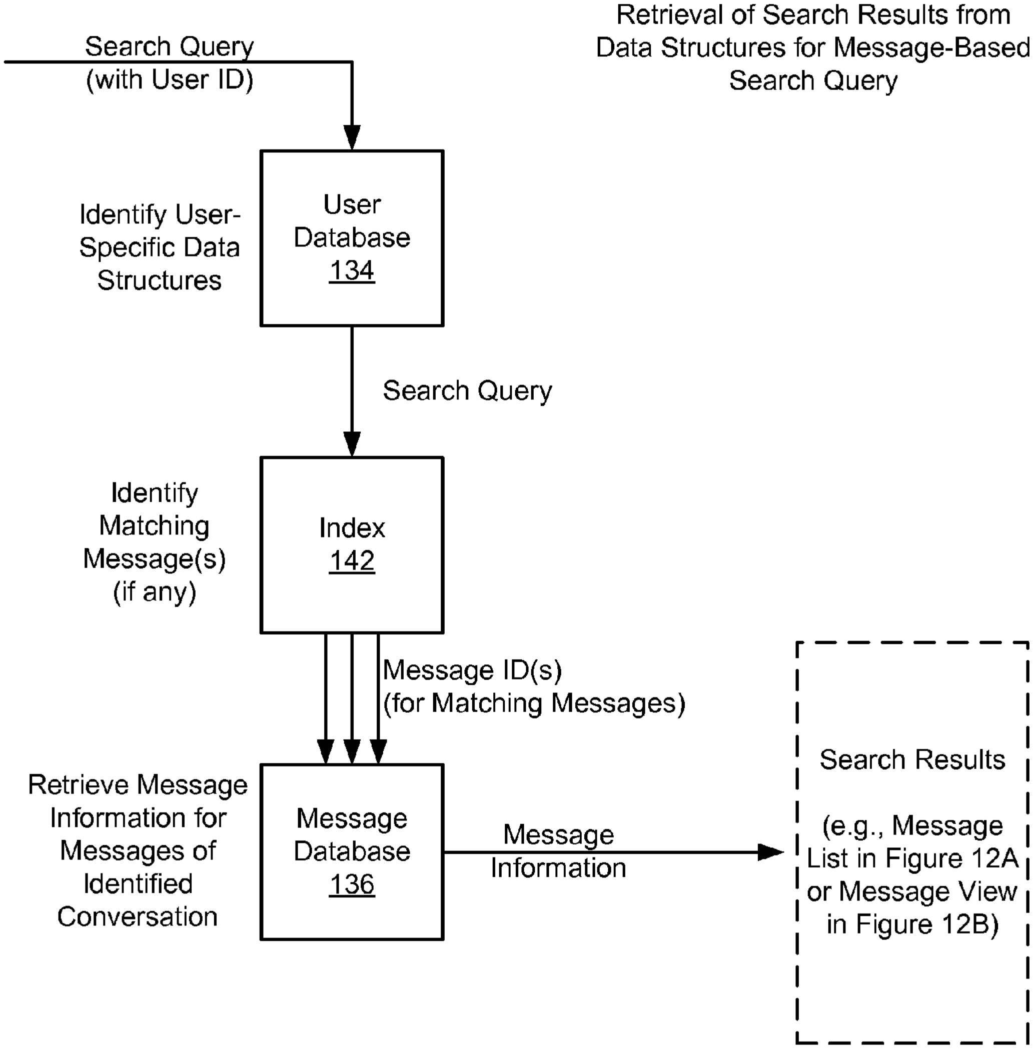
Figure 11A:
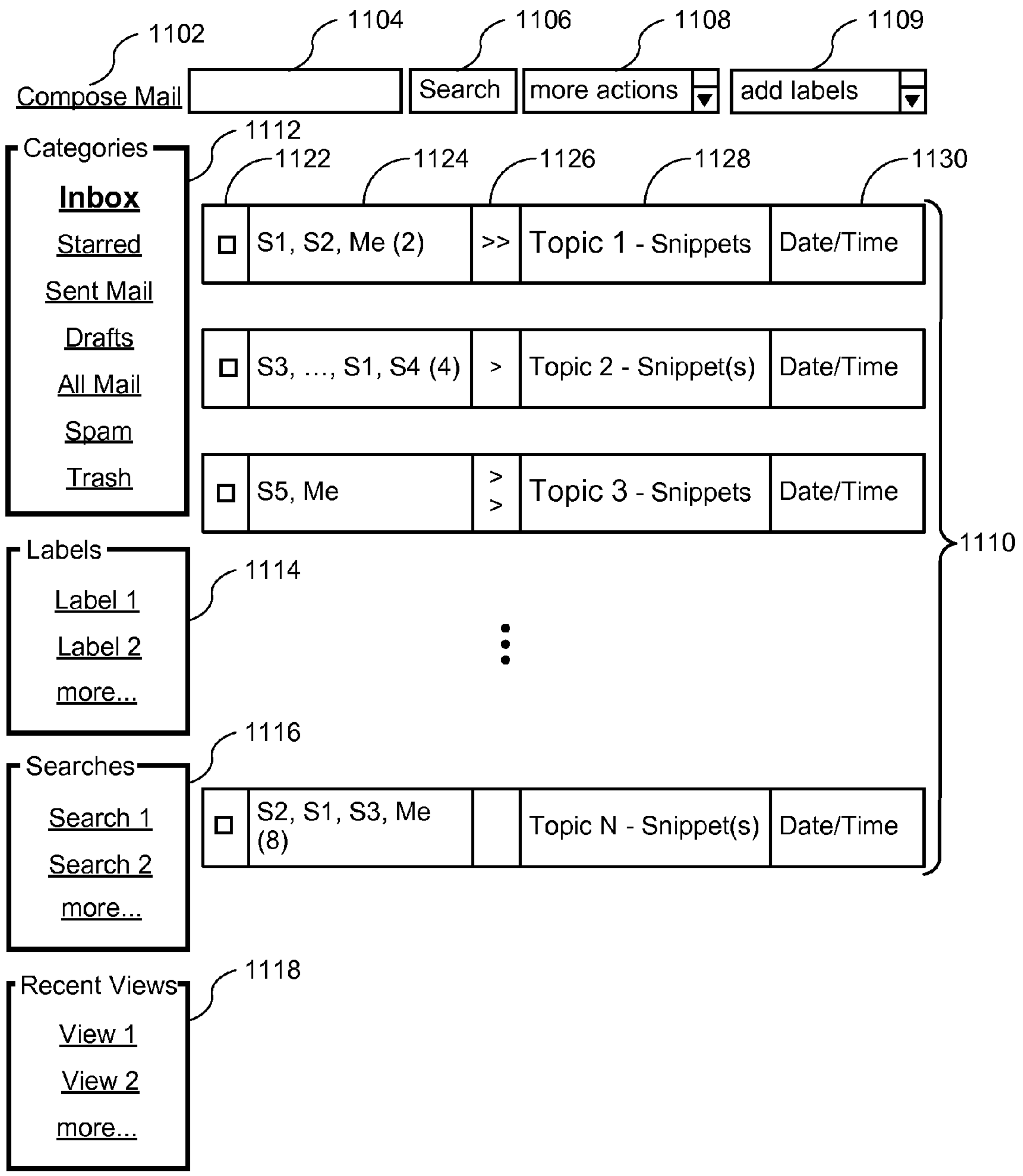
FIGS. 11A-11F are representations of exemplary user interfaces for interacting with conversations stored at the conversation server system, in accordance with some embodiments.
Figure 11B:
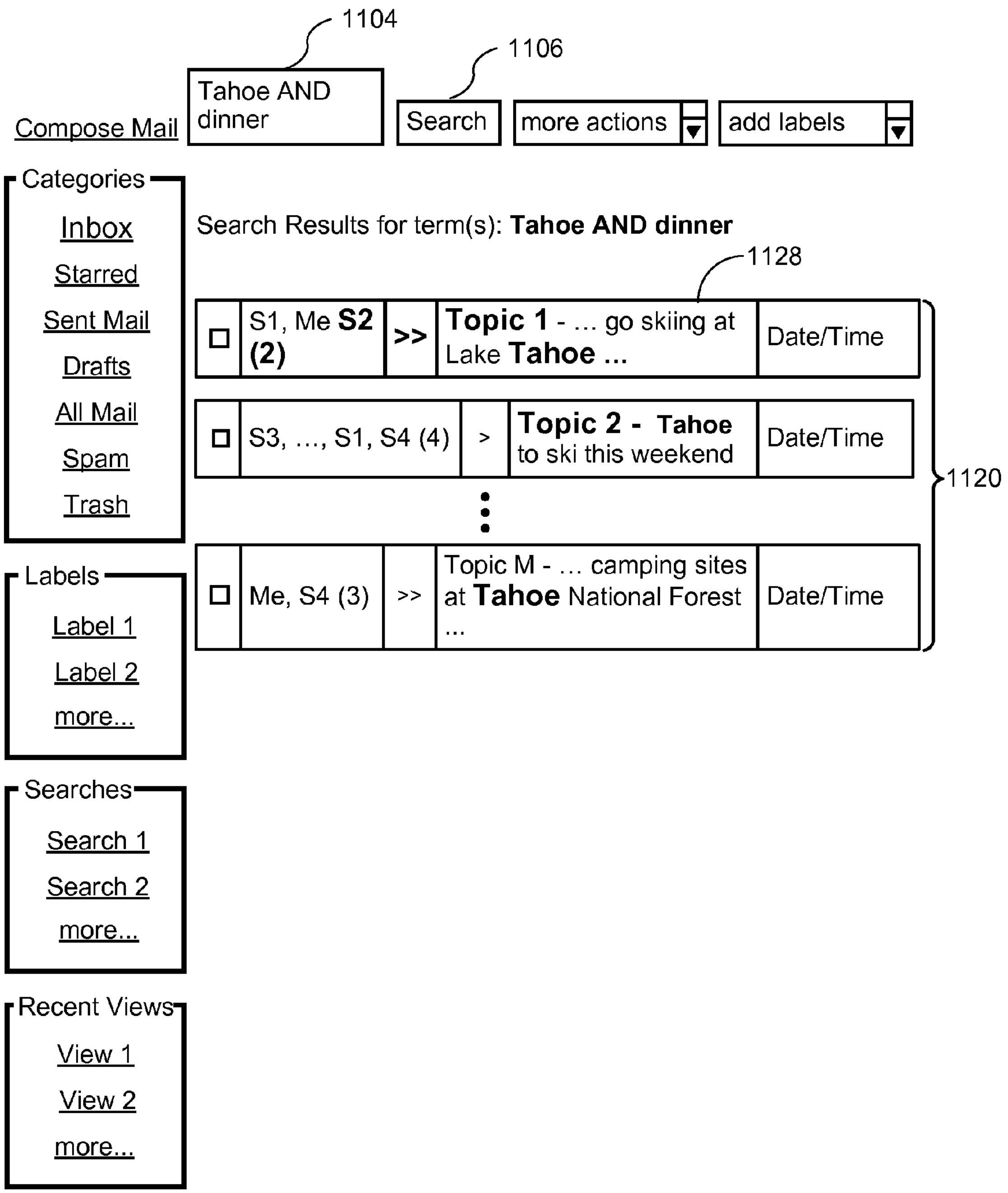

FIGS. 5A and 5B illustrated exemplary flows of data between the various data structures described above when processing a search query. FIG. 5A illustrates a flow of data for processing a conversation-based search query (e.g., a search query where the search results will be organized as conversations, as illustrated in FIGS. 11A-11F below) while FIG. 5B illustrates a flow of data for processing a message-based search query (e.g., a search query where the search results will be organized as messages, as illustrated in FIGS. 12A-12B below).

In FIG. 5A, a conversation-based search query associated with a User ID is received (e.g., from a Client 102 requesting conversations matching a particular set of criteria) or generated automatically by Conversation Server System 106 (e.g., Query Engine 128 may generate a search query for a subset of conversations with the "Inbox" label to generate an inbox view). Server 106 identifies user-specific data structures that are associated with the User ID associated with the search query in User Database 134. The search query is then executed over an Index 142 associated with the user, where Message IDs for any messages matching the search query are identified, as described in greater detail above. Message to Conversation Map 140 is used to retrieve Conversation IDs associated with respective Message IDs for matching messages. Respective retrieved Conversation IDs are, in turn, used by Server 106 to retrieve conversation information from the Conversation Database 138. The conversation information for the respective retrieved Conversation IDs may be used to produce search results (e.g., a conversation list) for display at Client 102 (e.g., as illustrated in the exemplary user interfaces shown in FIGS. 11A-11B). The conversation information may include Message IDs, which are used to retrieve message information for messages of the identified conversation(s) from Message Database 136. The message information may also be used to produce search results (e.g., conversation lists, as shown in FIGS. 11A-11B and/or conversation views as shown in FIGS. 11C-11F). In some embodiments, search results are generated by combining the conversation information retrieved from Conversation Database 138 and the message information retrieved from Message Database 136.

In FIG. 5B, a message-based search query associated with a user ID is received (e.g., from a Client 102 requesting messages matching a particular set of criteria) or generated (e.g., by Conversation Server System 106 or Query Engine 128 of Server 106 (FIG. 1) generating an inbox view or other predefined view that is generated by performing a search). Server 106 identifies user-specific data structures that are associated with the User ID associated with the search query in User Database 134. The search query is then executed over an Index 142 associated with the user, where Message IDs for any messages matching the search query are identified, as described in greater detail above. Message IDs are used to retrieve message information for messages of the identified conversation(s) from Message Database 136. The message information may also be used to produce search results (e.g., message lists as illustrated in FIG. 12A and message views as illustrated in FIG. 12B).

Conversation/Message Data Management

Figure 6A:
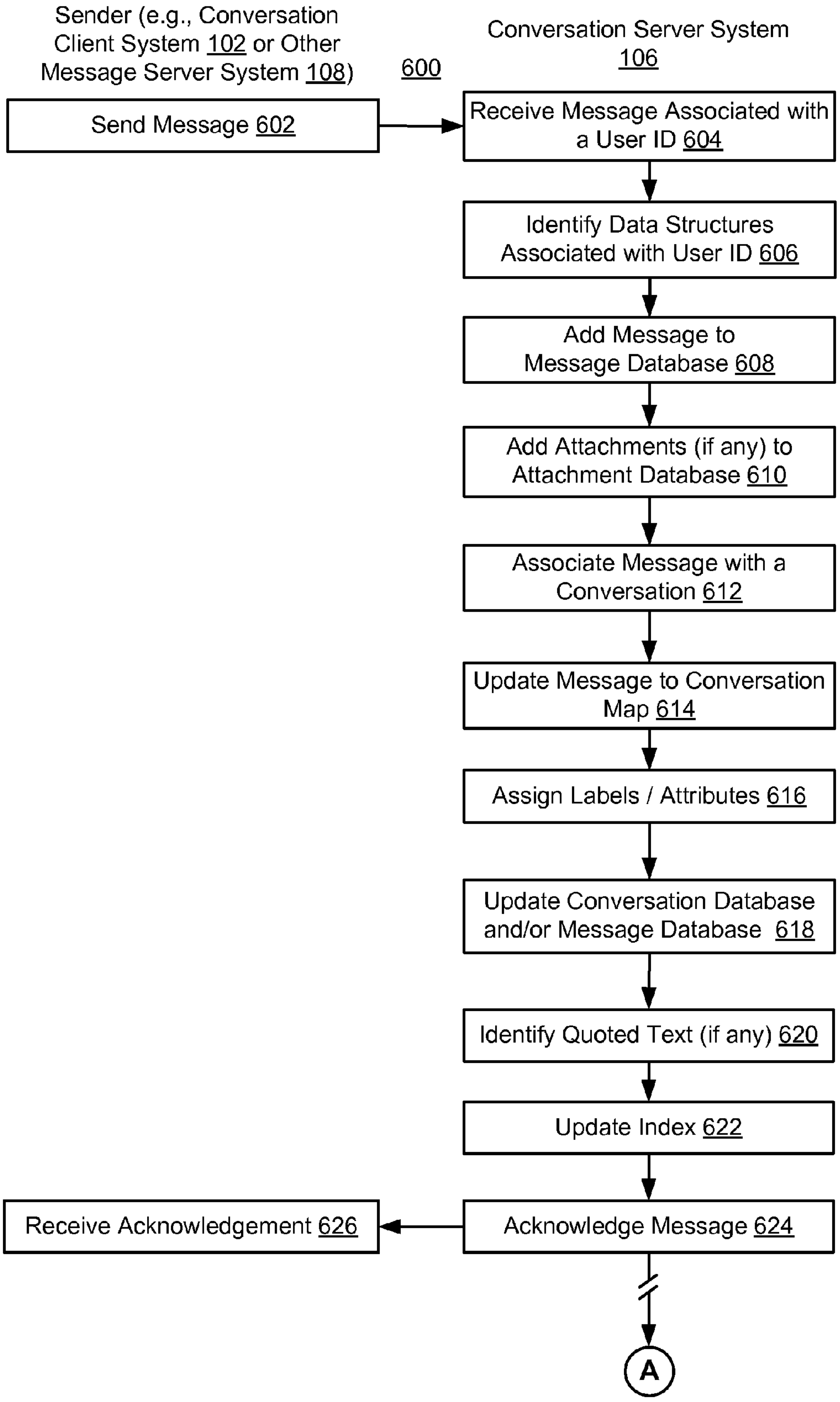
FIGS. 6A-6C include a flow chart illustrating a method for receiving and storing messages and receiving and responding to a queries at a conversation server system, in accordance with some embodiments.
Figure 6B:
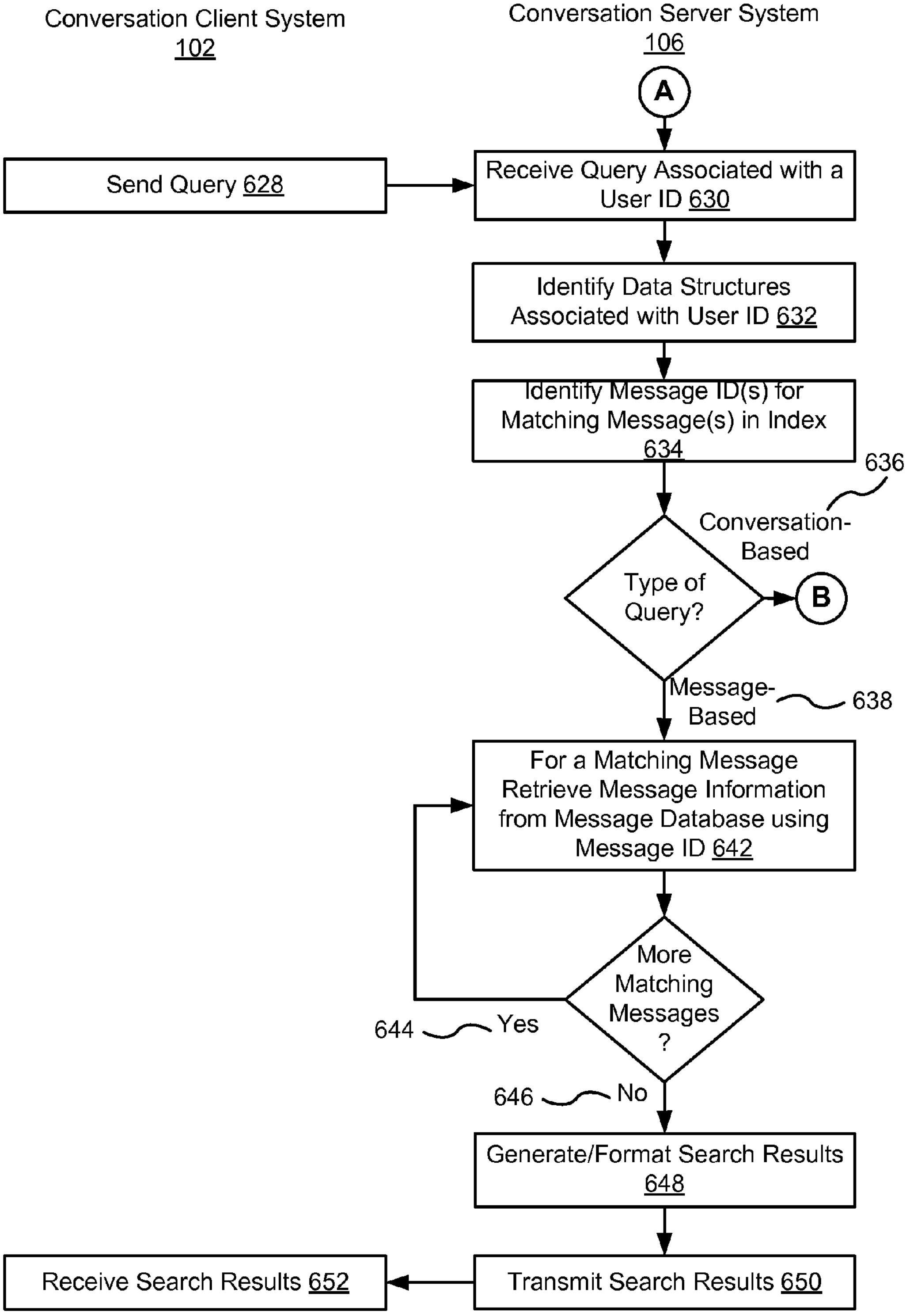
Figure 6C:
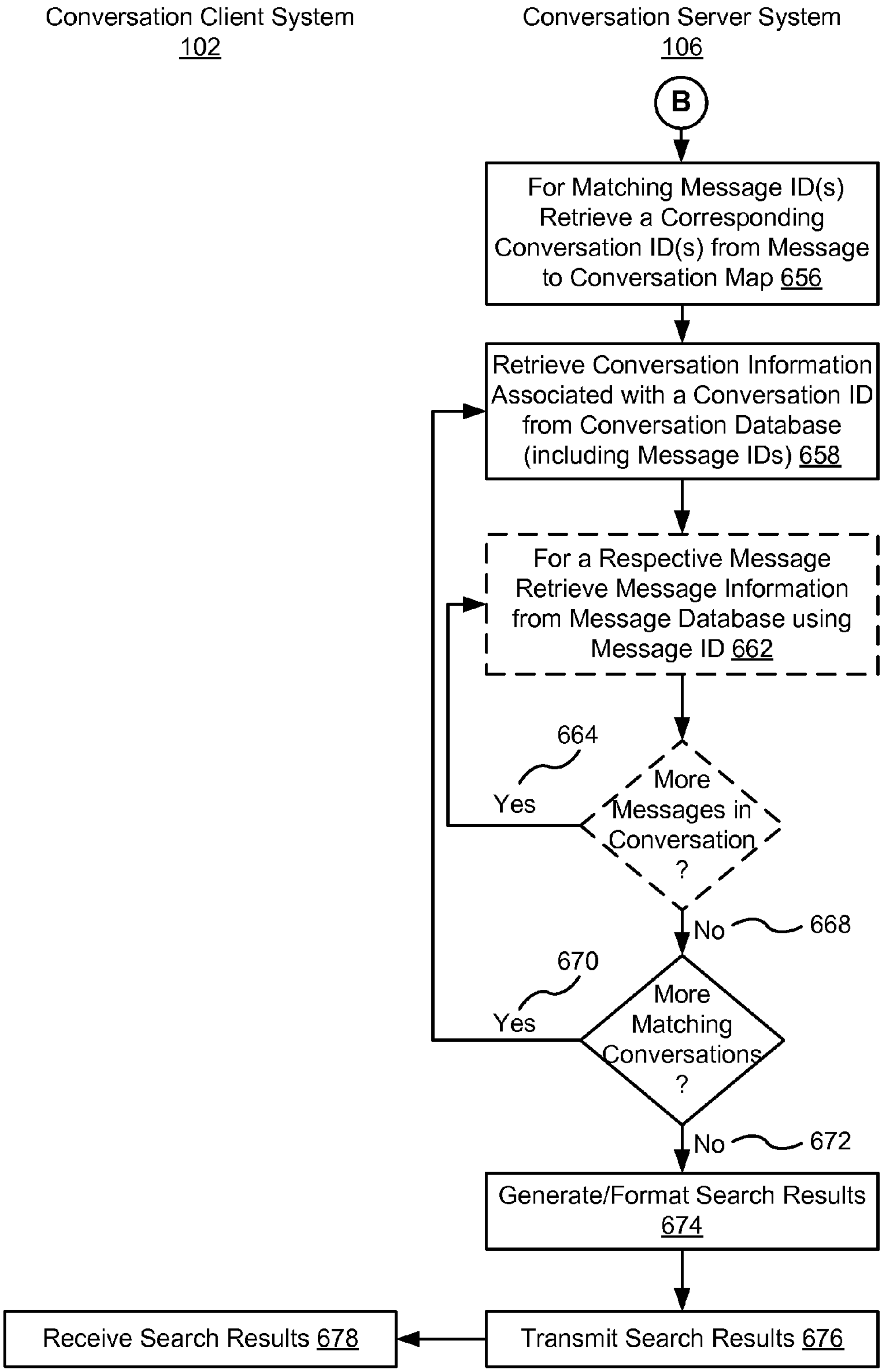
Figure 7A:
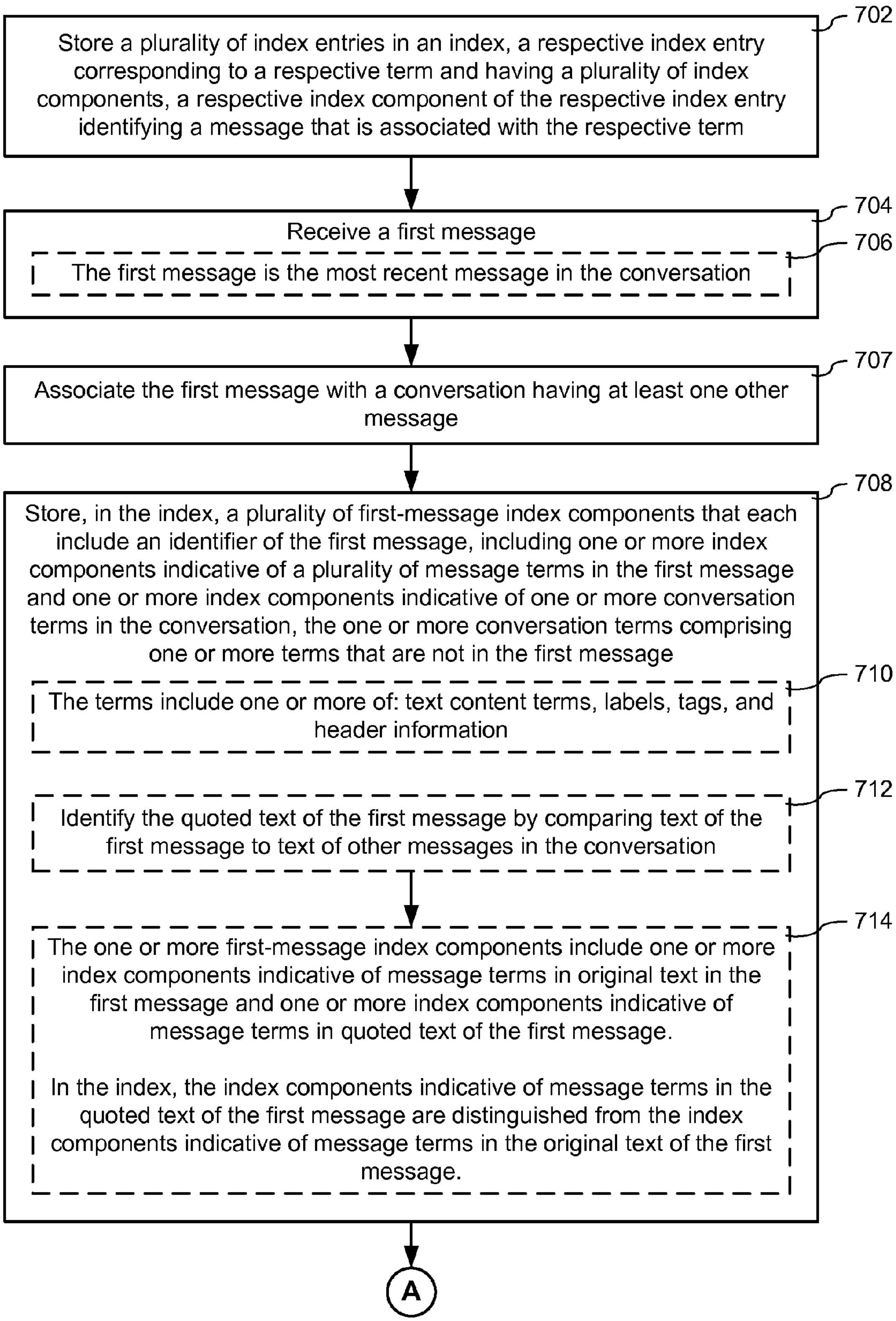
FIGS. 7A-7G include a flow chart illustrating a method for generating an index configured to support both conversation and message based searching, in accordance with some embodiments.
Figure 7B:
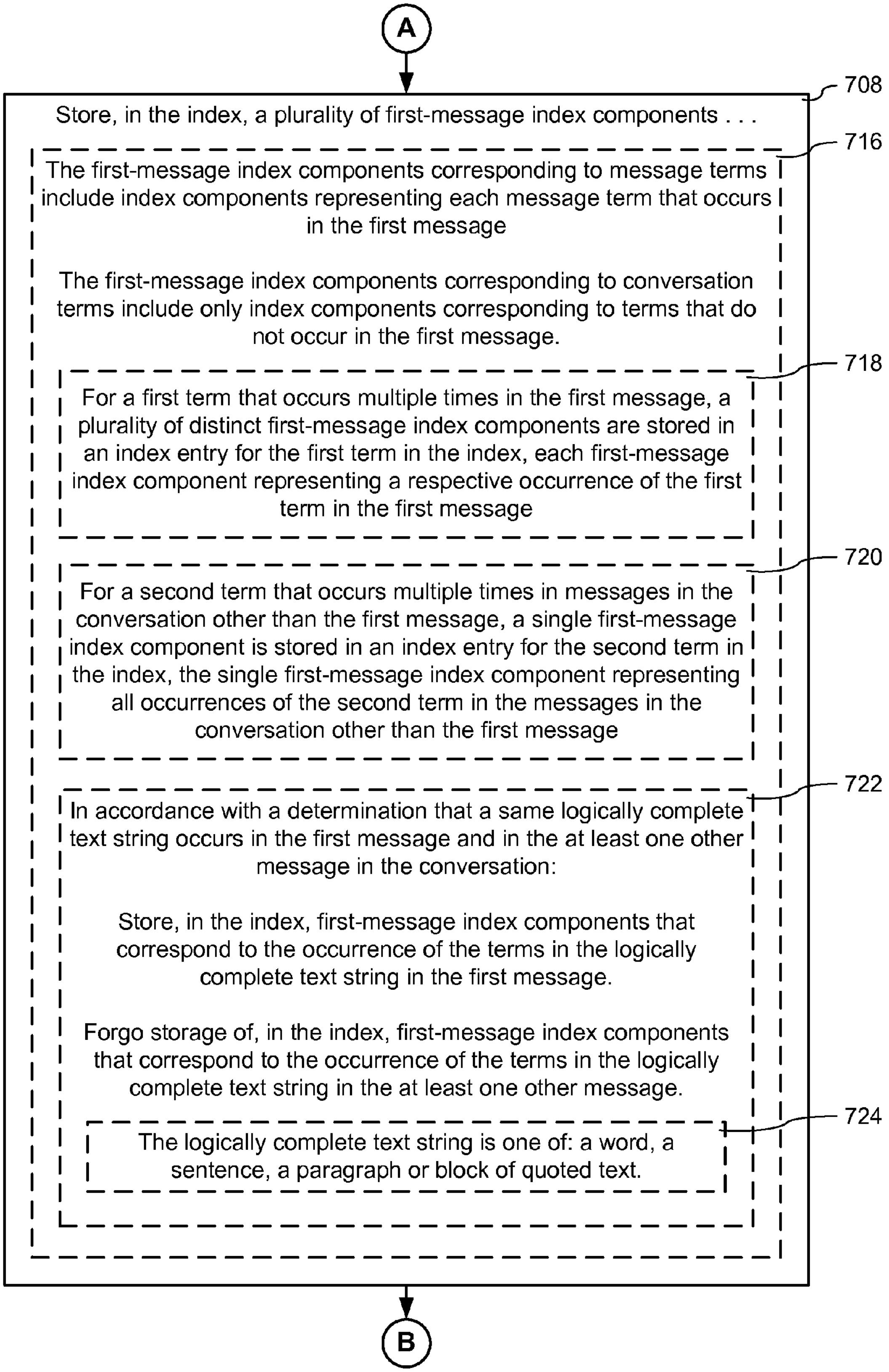
Figure 7C:
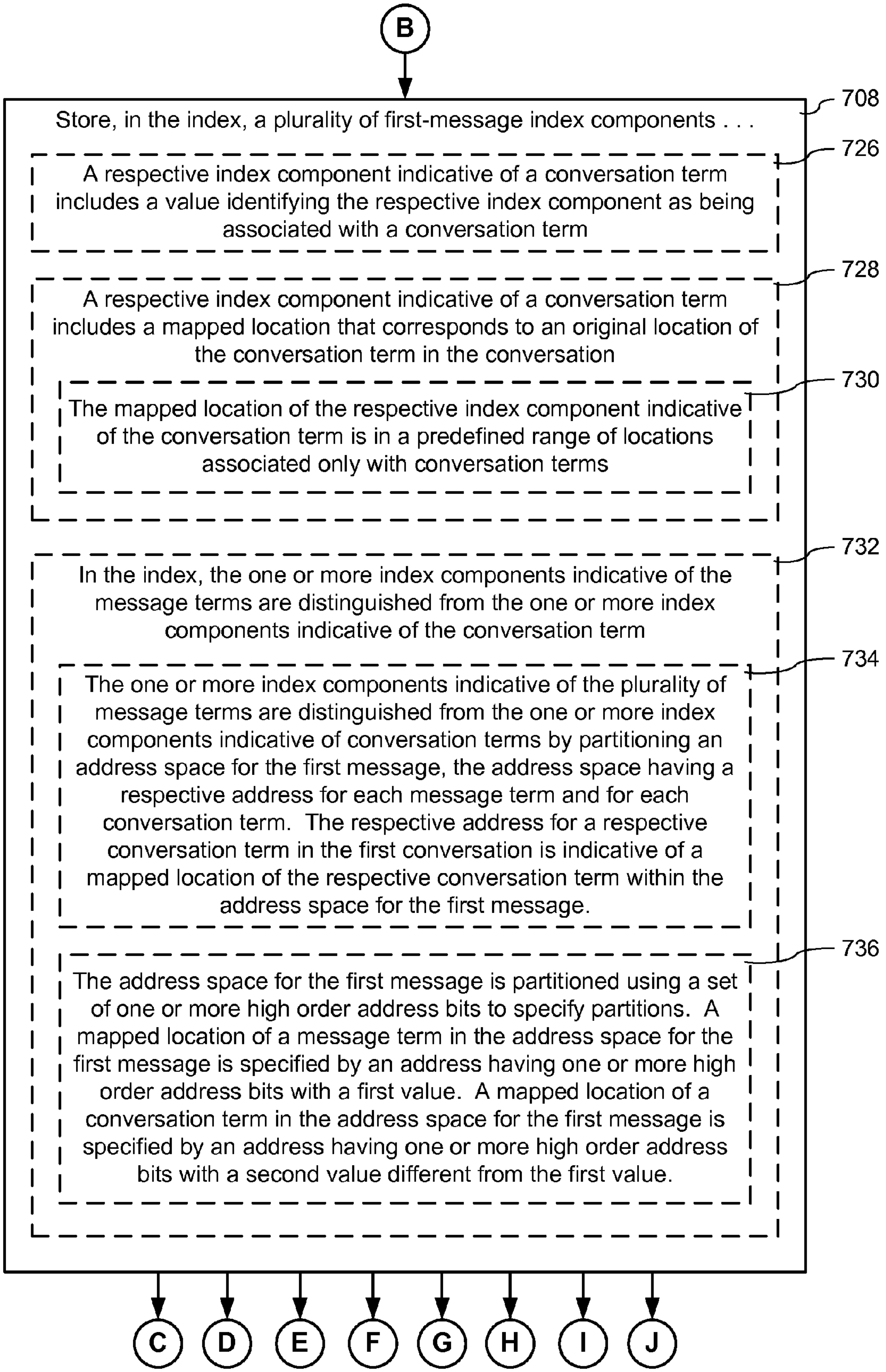
Figure 7D:
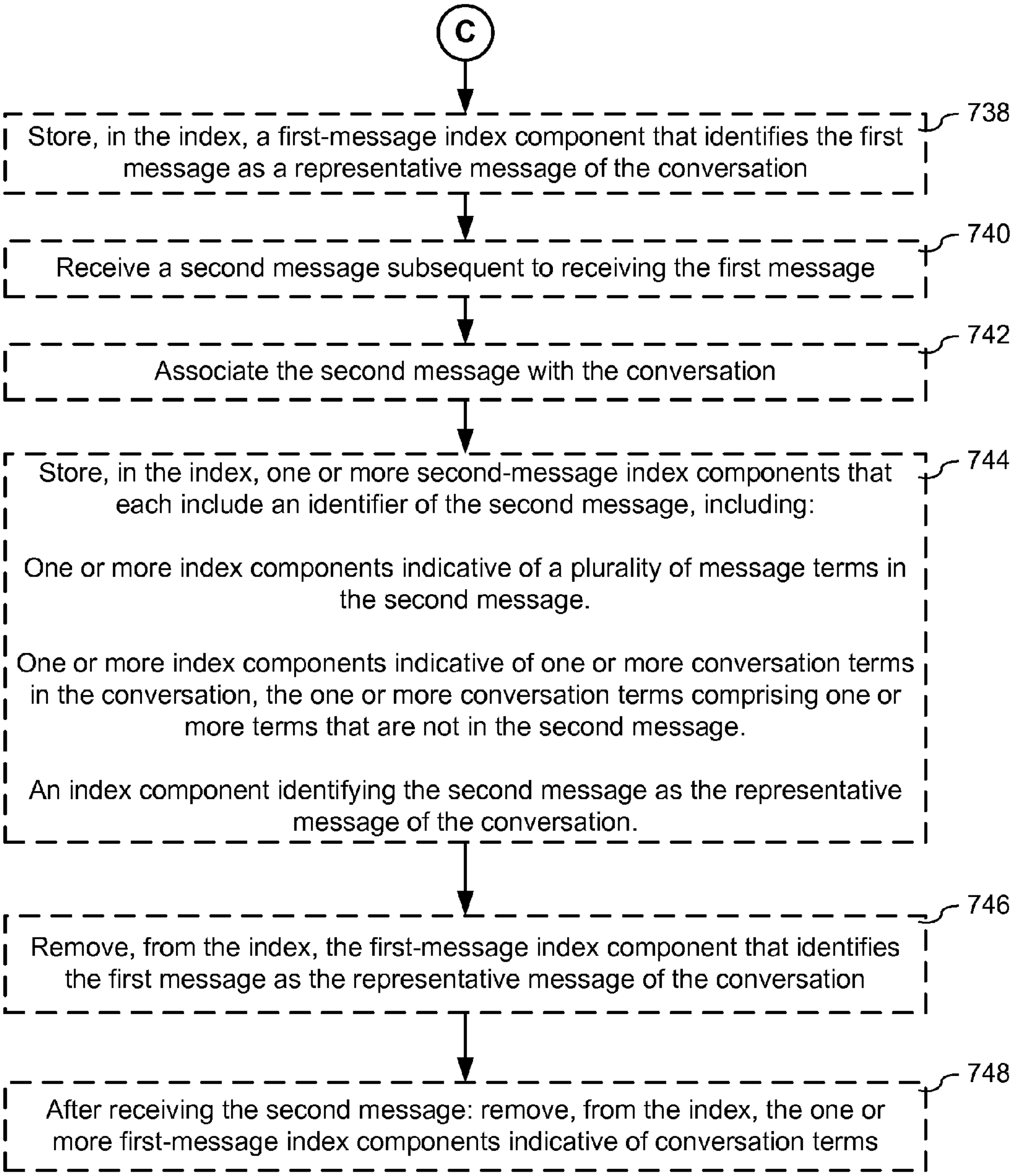
Figure 7E:
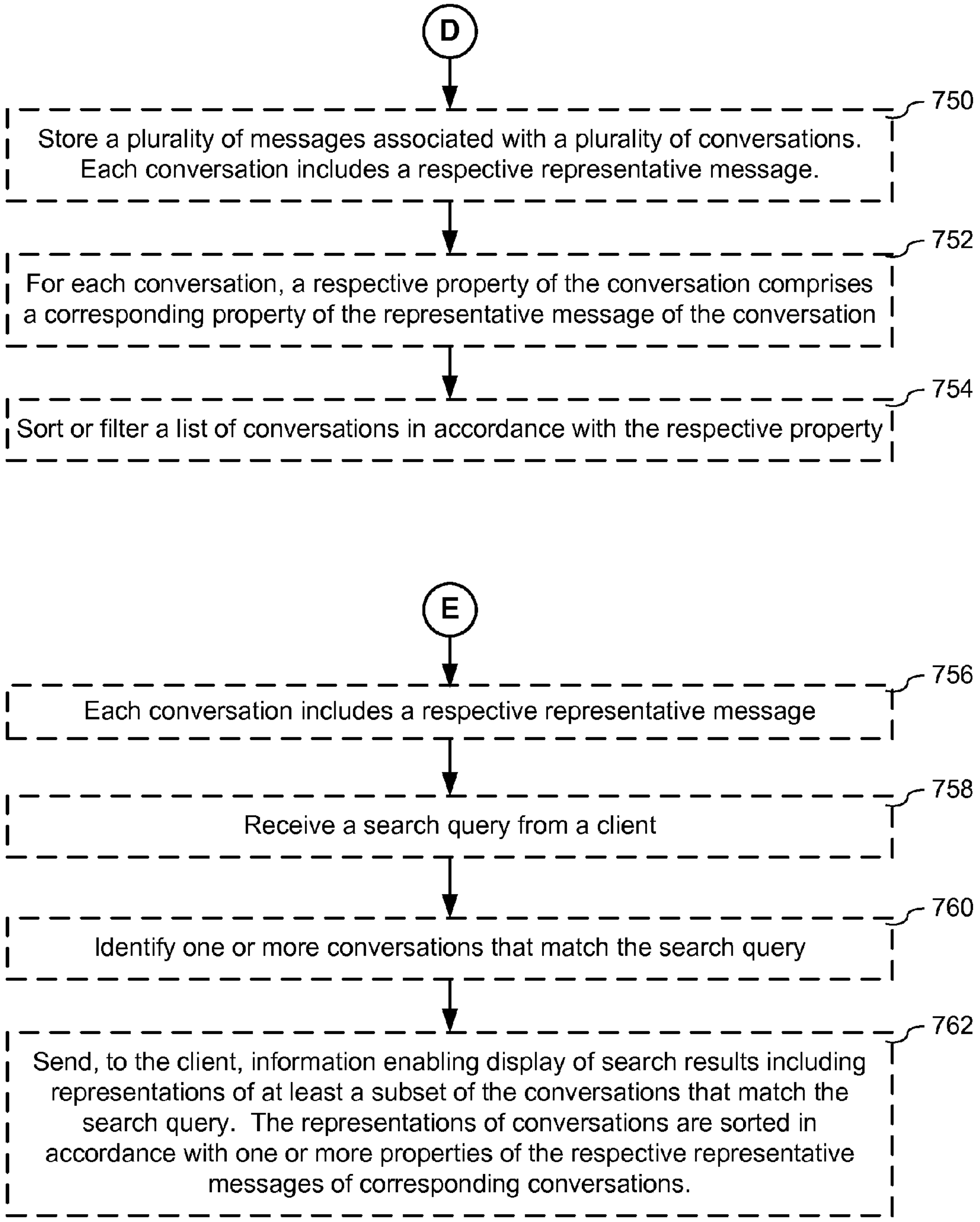
Figure 7F:
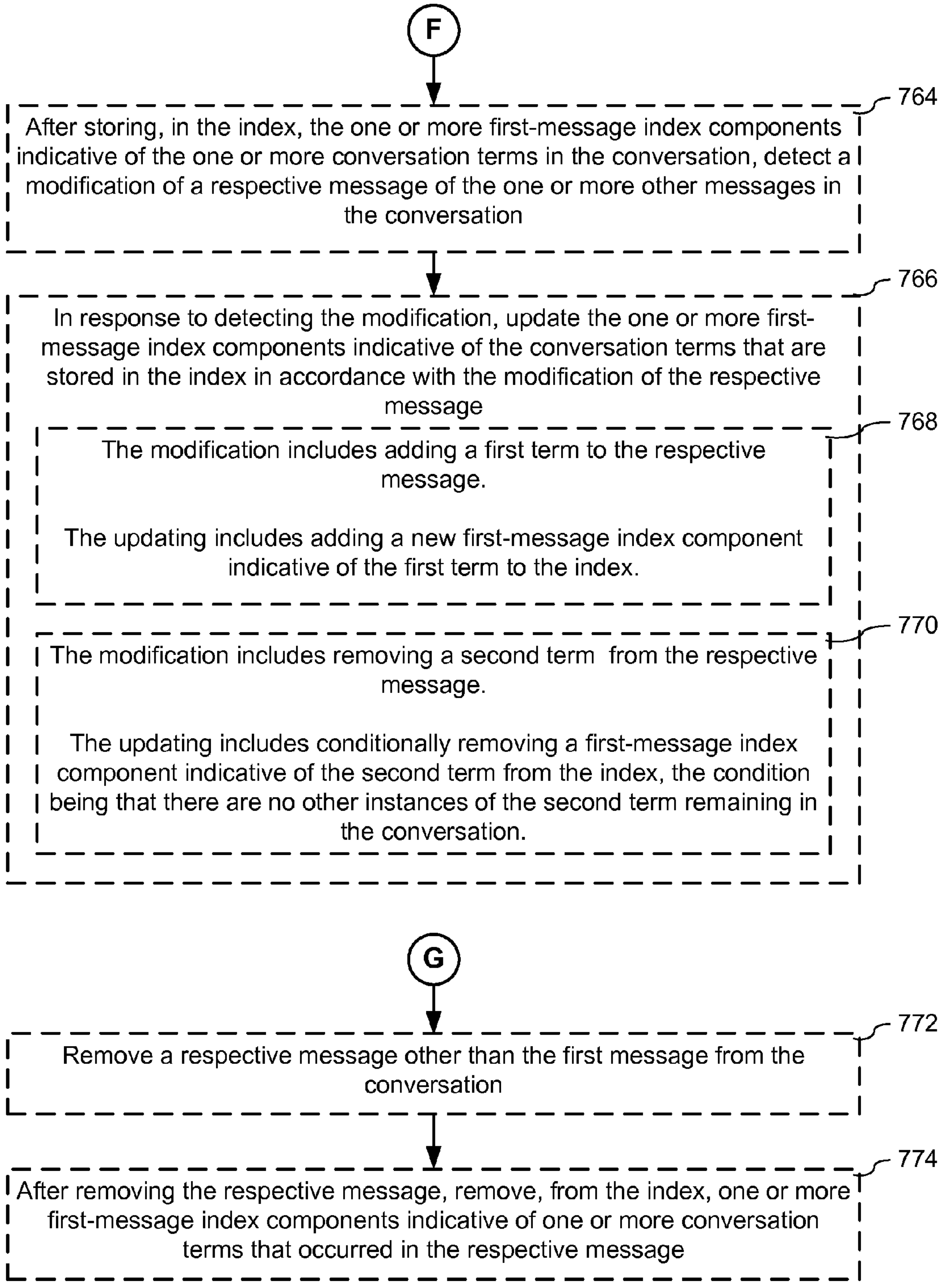
Figure 7G:
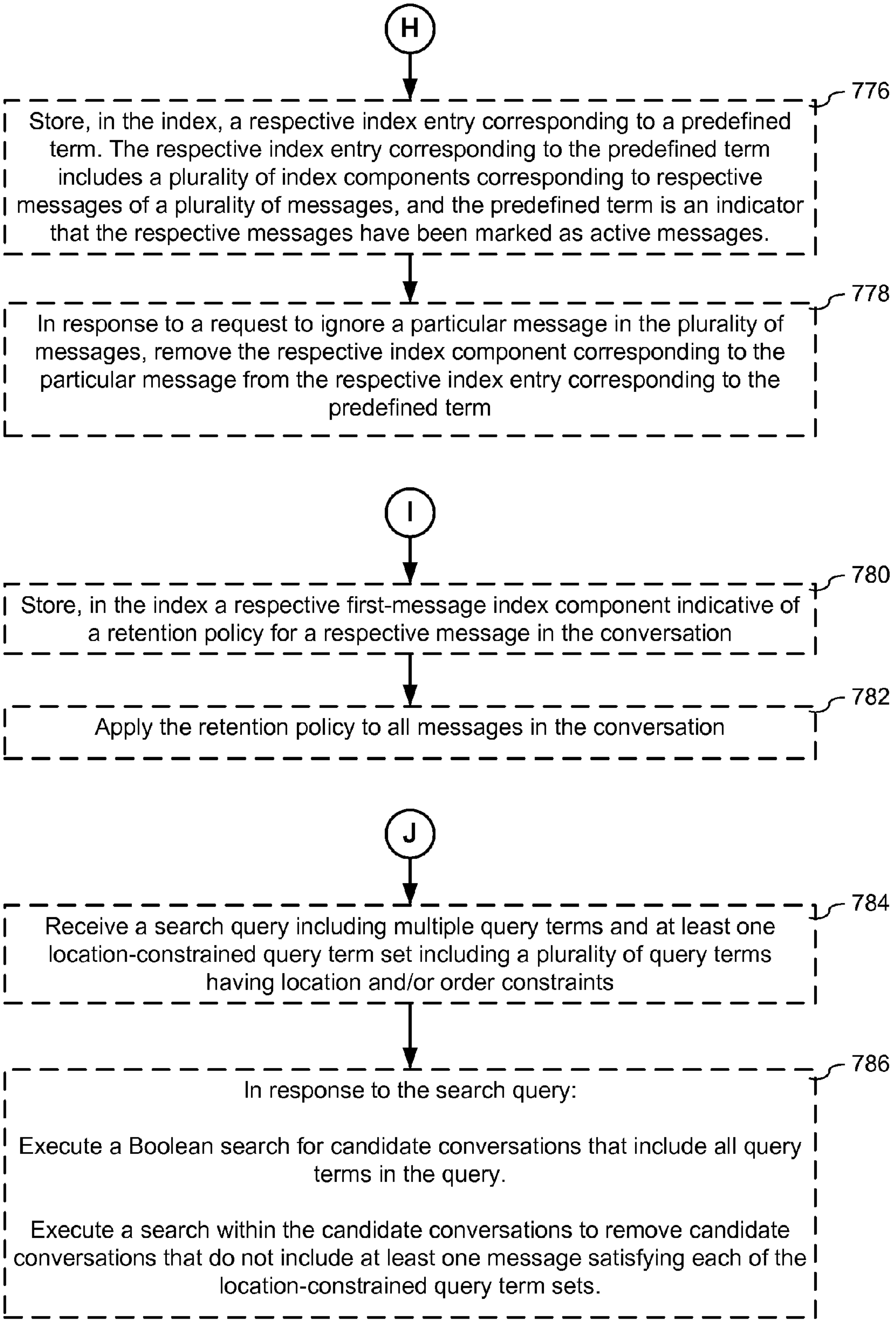
Figure 8A:
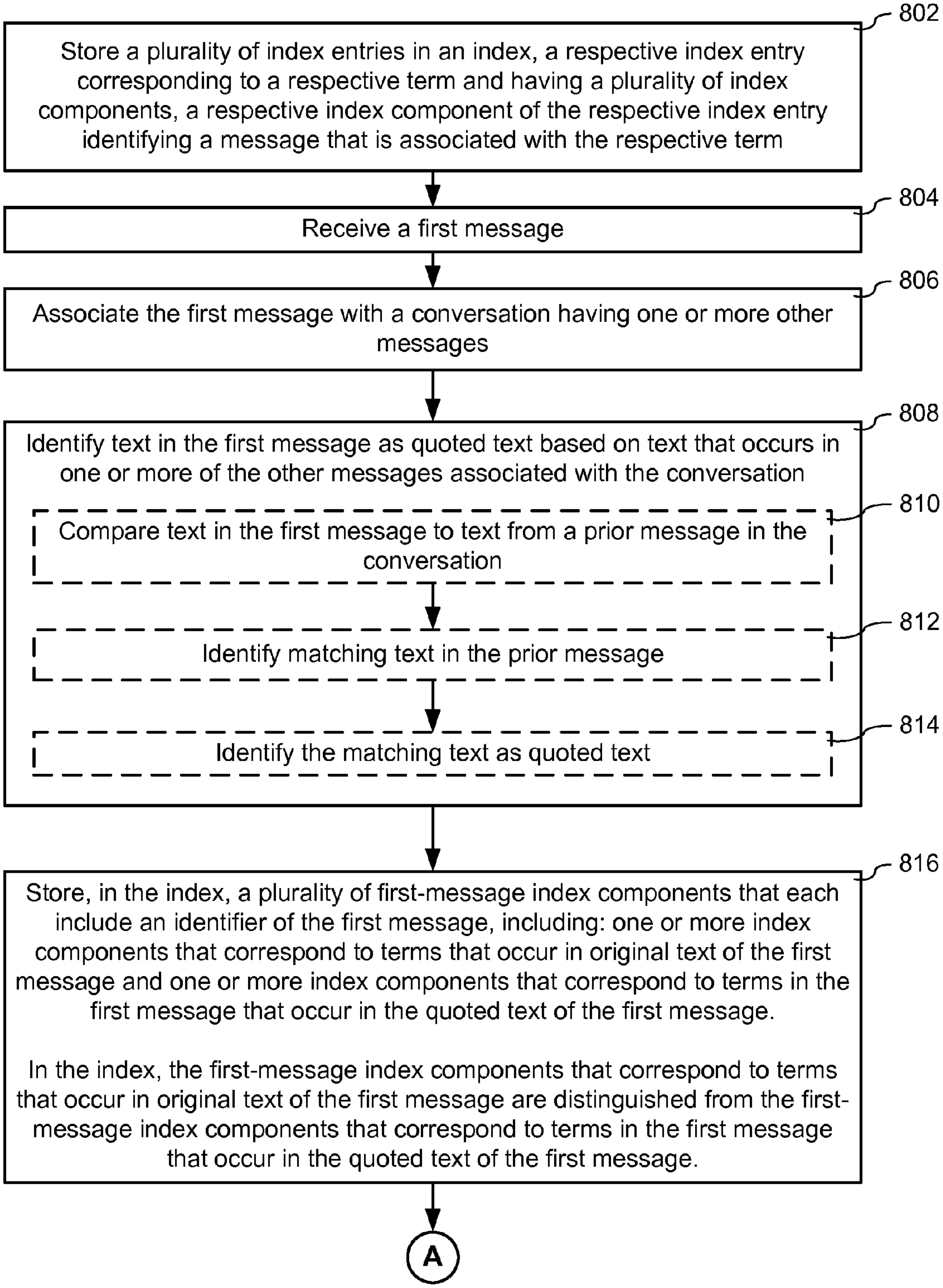
FIGS. 8A-8D include a flow chart illustrating a method for separately indexing quoted text in messages in conversations to support advanced conversation-based searching, in accordance with some embodiments.
Figure 8B:
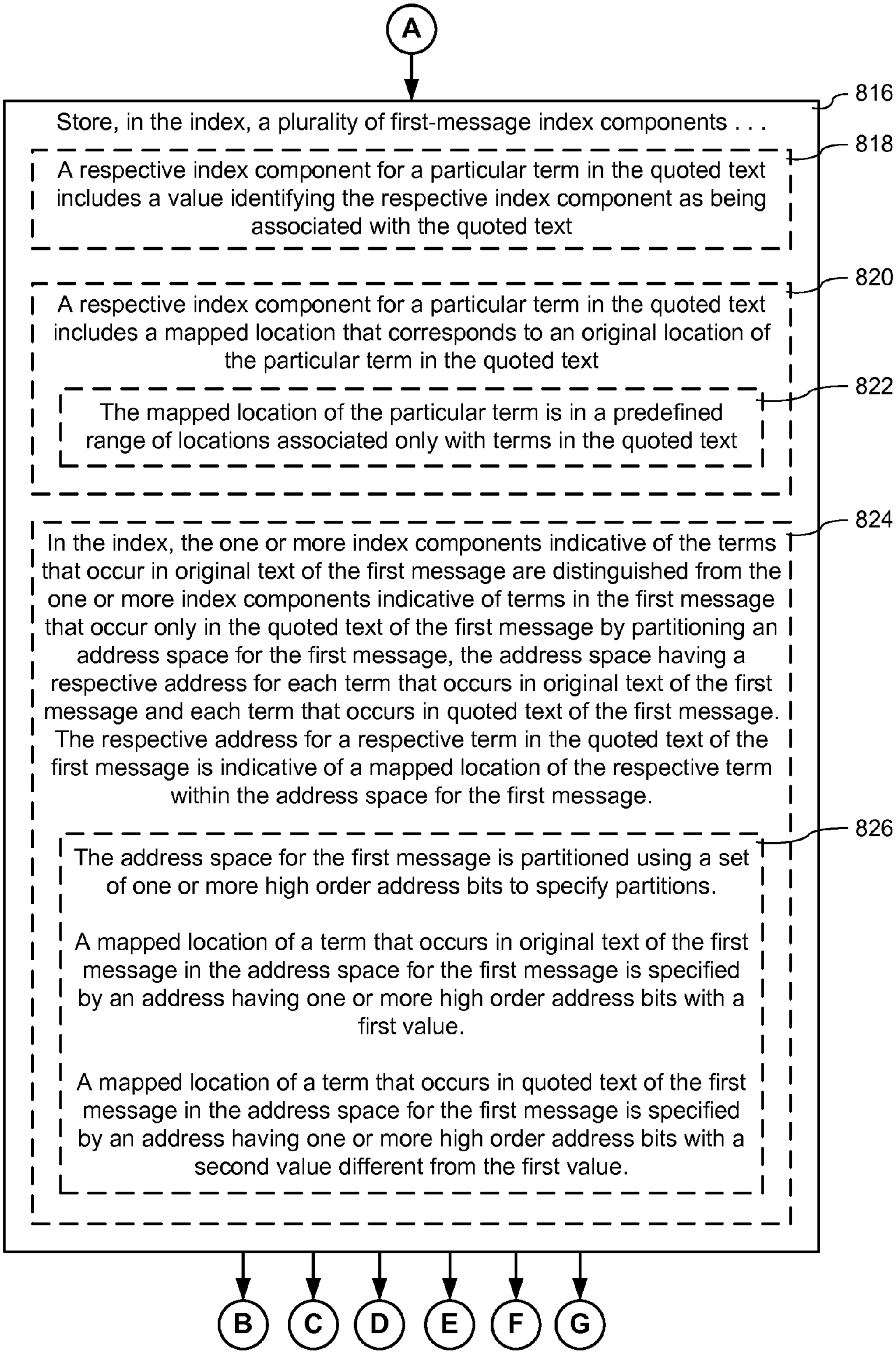
Figure 8C:
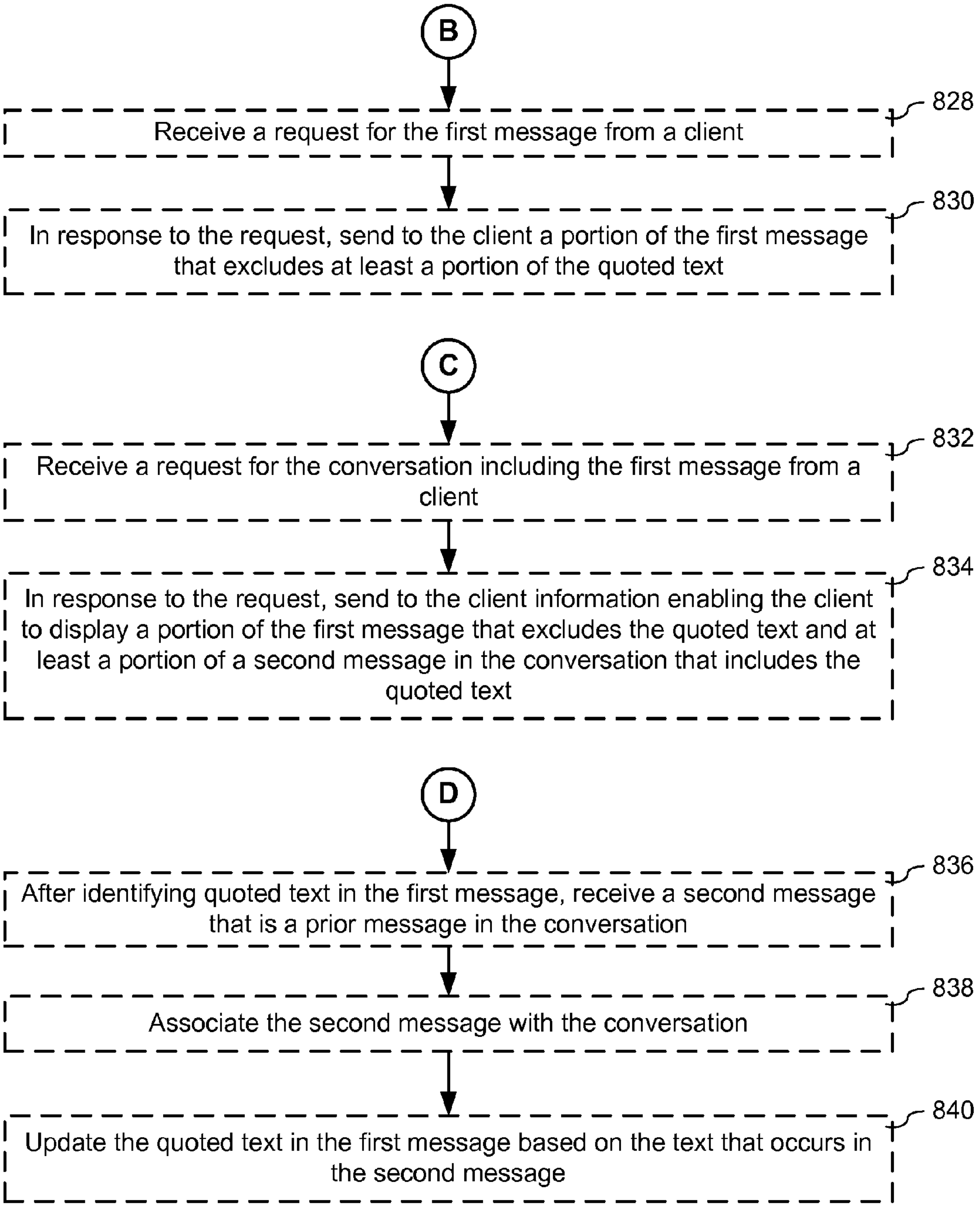
Figure 8D:
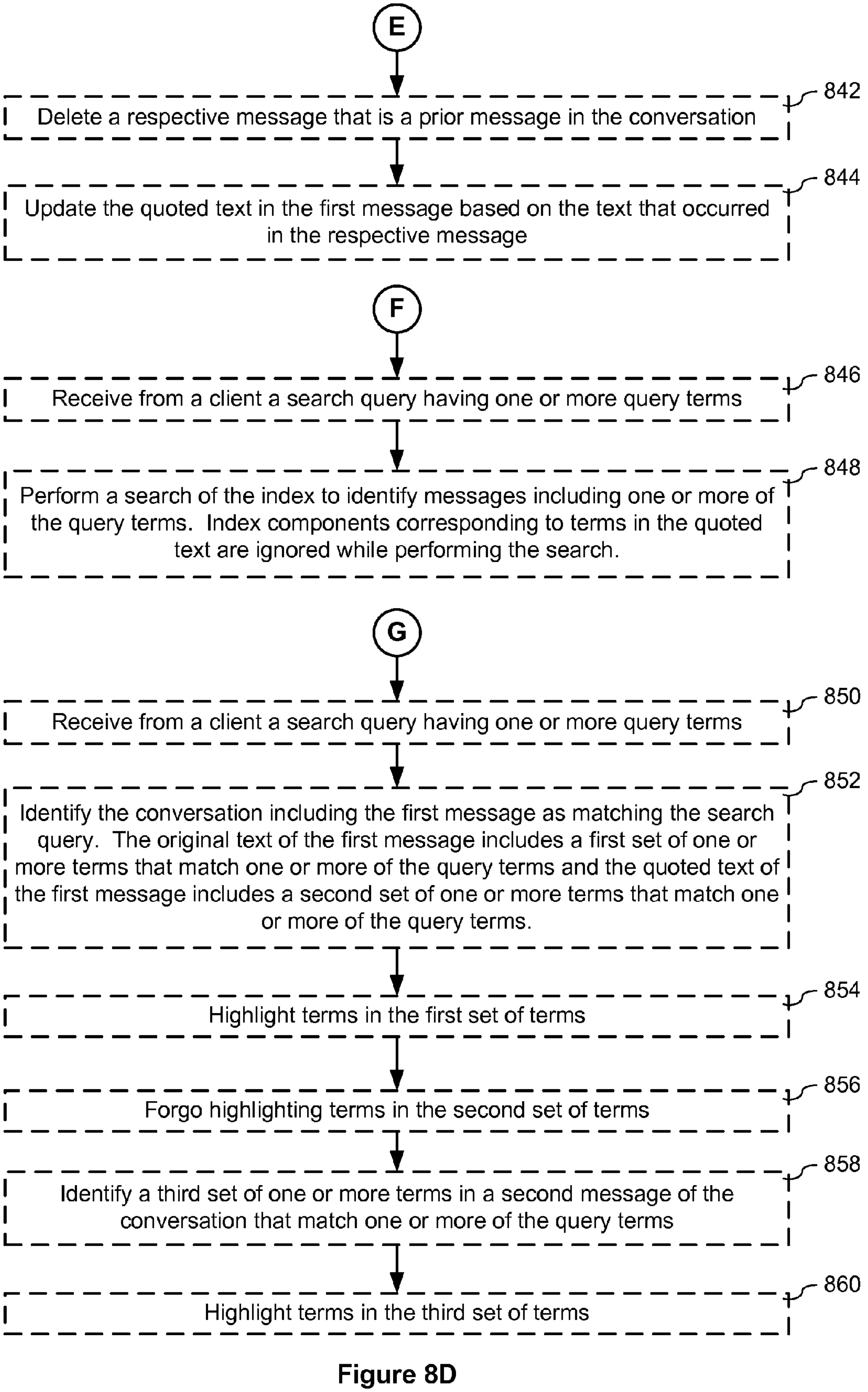
Figure 9A:
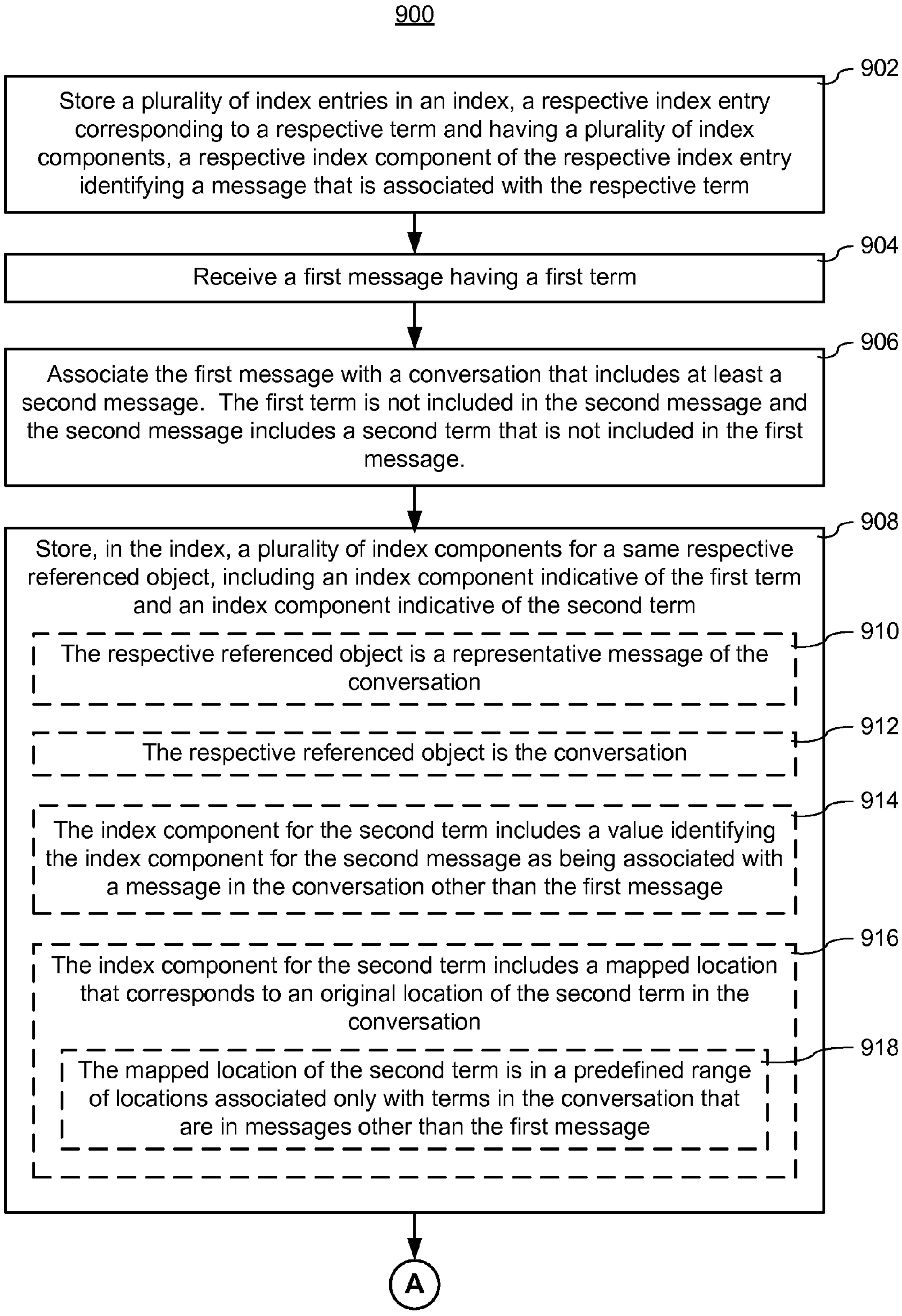
FIGS. 9A-9D include a flow chart illustrating a method for enabling search for conversations with two messages each having a respective query term from a search query, in accordance with some embodiments.
Figure 9B:
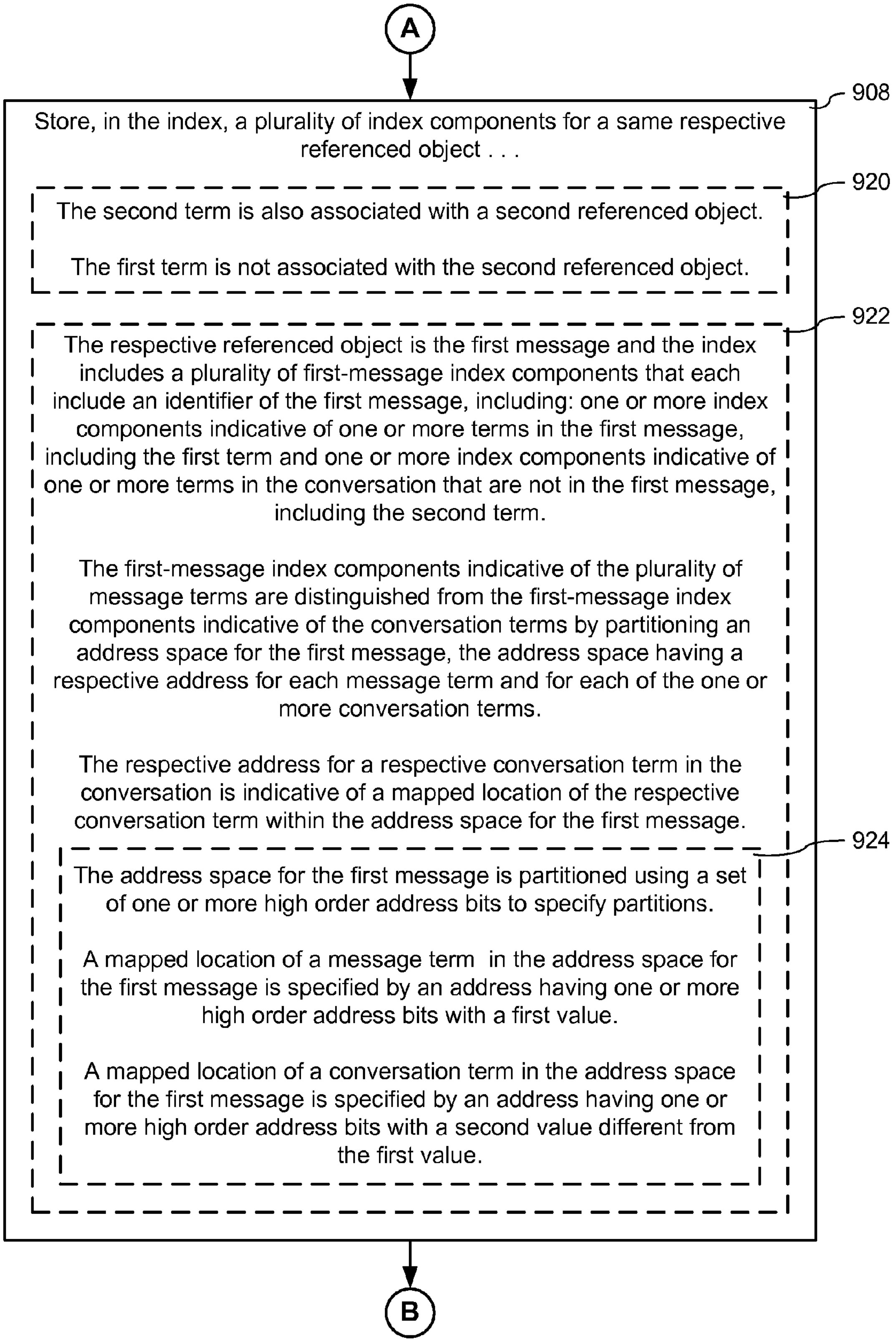
Figure 9C:
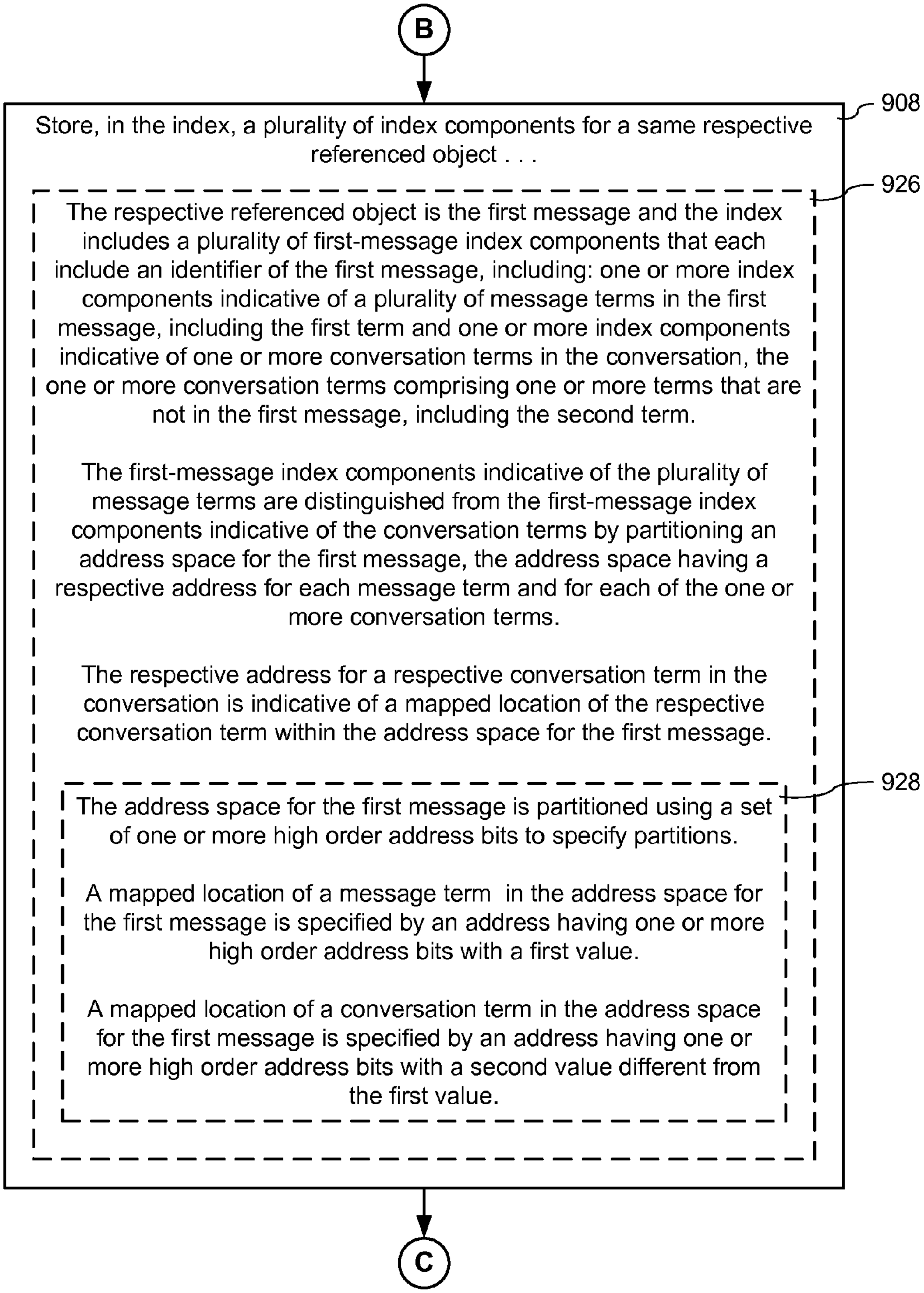
Figure 9D:
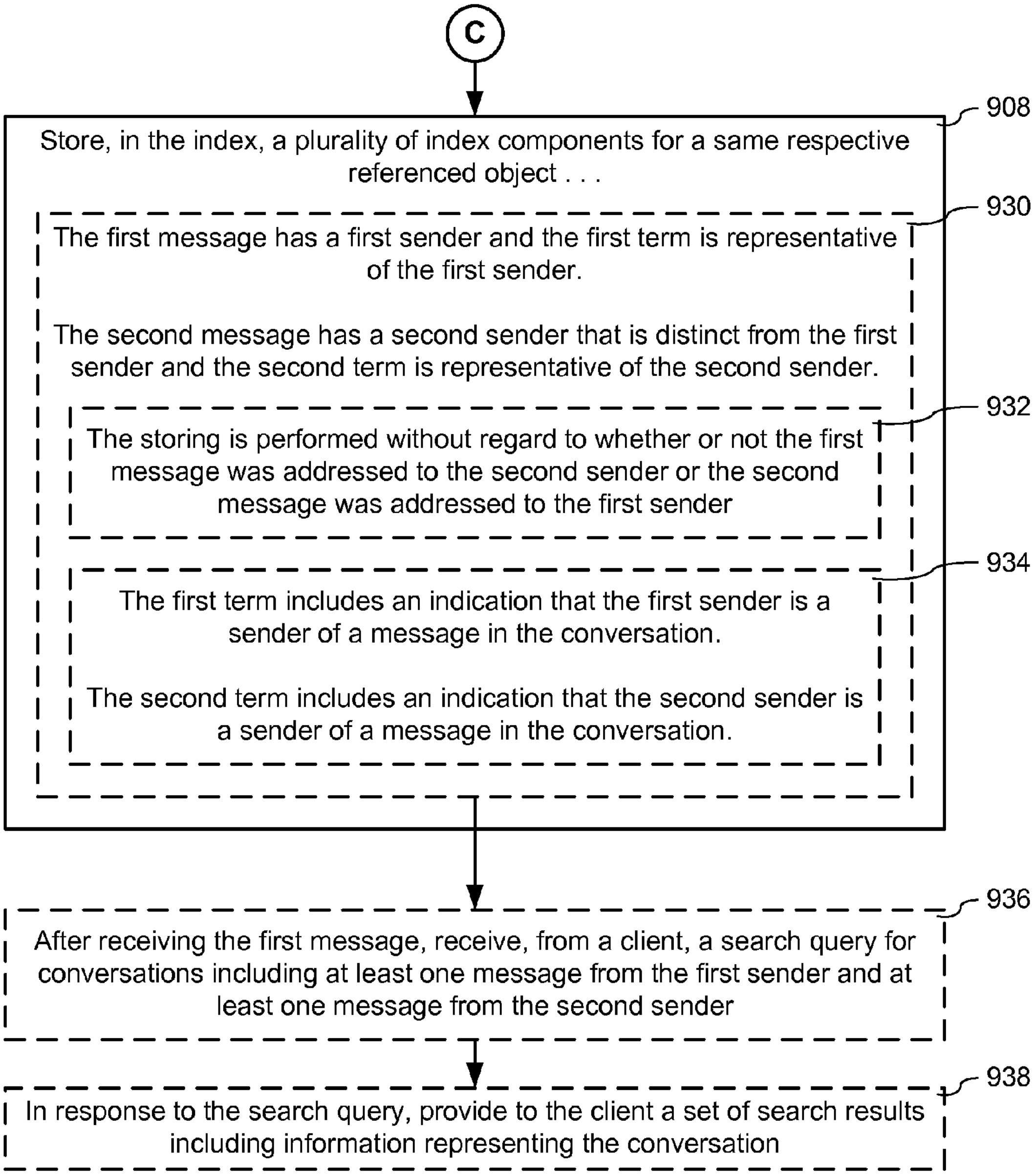

FIGS. 6A-6C include a flowchart representing a method 600 for storing, indexing and retrieving message information, according to certain embodiments. Method 600 may be governed by instructions that are stored in a non-transitory computer readable storage medium and that are executed by one or more processors of one or more servers, such as in conversation server system 106 (as illustrated in FIGS. 1 and 3). Each of the operations shown in FIGS. 6A-6C may correspond to instructions stored in a computer memory or computer readable storage medium. The computer readable storage medium may include a magnetic or optical disk storage device, solid state storage devices such as Flash memory, or other non-volatile memory device or devices (for example, devices in memory 306 of conversation server system 106). The computer readable instructions stored on the computer readable storage medium may include one or more of: source code, assembly language code, object code, or other instruction format that is executed or interpreted by one or more processors. Some operations in method 600 may be combined and/or the order of some operations may be changed.

An embodiment for processing a received message is shown in FIG. 6A. A sender (e.g., a Conversation Client System 102 or Other Message Server System 108) sends (602) a message to a user associated with Conversation Server System 106. The message is received (604) by Frontend Server 122 (e.g., SMTP Gateway) (FIG. 1), for example, where some processing and handling may occur, and may then be passed to Conversation Engine 124 (FIG. 1) where the received message is associated with a User ID for the user to whom the message is directed. Conversation Engine 124 may generate a Message ID for the received message. The Message ID is typically used to distinguish one message from other messages in the user's account. In an embodiment, the Message ID is an N bit number composed of one or more parts. For example, in an embodiment the Message ID may be a 64 bit number consisting of a Y bit (e.g., 32 bit or 48 bit) date/time stamp and a 64-Y bit hash of the message contents. A hash is a mathematical function that maps values from a large domain into a smaller one. One of ordinary skill in the art will recognize that there are many different ways to create Message IDs that provide sufficient information to distinguish messages from each other.

Conversation Engine 124 may then parse the received message into its constituent parts. These parts might include the address of the sender, one or recipient addresses, the subject of the received message, a "References:" field as that field is described in RFC 2822, an "In-Reply-To:" field also described in RFC 2822, the content of the received message, and any other information that might be contained in the received message. In some embodiments, either before after parsing the received message, the received message is passed to a Spam Identification Module 330 (FIG. 3) to determine if the received message matches spam criteria. In some embodiments, Spam Identification Module 330 works asynchronously, and in parallel with other processing of the received message. In some embodiments, the spam criteria are designed to determine whether a received message is likely to be an unsolicited message that the user is unlikely to want to read.

After the message is received, Server 106 identifies (606) data (e.g., databases tables, maps, indexes, etc.) associated with the User ID associated with the received message. The received message is added (608) to Message Database 136 (FIG. 1). In one embodiment, the received message is added to Message Database 136 and not subsequently modified thereafter, except perhaps for deletion. Additionally, if the received message has attachments, the attachments may be added (610) to Attachment Database 132 (FIG. 1).

Some or all of the parts of the received message that are obtained during parsing of the received message may be used to assist in determining a conversation, if any, to which the received message belongs and associating (612) the received message with a matching conversation. For example, the subject of the received message is compared to other messages with the same subject since it is likely that messages within a conversation will have the same, or very nearly the same, subject. If a matching conversation is not found, then a new conversation is created and the received message is associated with the new conversation. In some implementations, messages are determined to be related to each other and part of the same conversation, based on temporal information, sender information, subject information, other information in the header, or system supplied information, or any combination thereof. One embodiment formulates the search query used to identify matching conversations and/or messages using the subject of the message along with the "References:" and/or the "In-Reply-To:" field. When a message is associated with an existing conversation or a new conversation, Conversation Data Updater 126 updates (614) Message to Conversation Map 140 (FIG. 1) to reflect the changes.

Next, an initial set of attributes including one or more labels is assigned (616) to the received message. These type of attributes may include, for example, labeling a received message as "unread" (which typically means that the message has been neither viewed nor marked as read) to indicate that the received message is new. Another attribute that is initially assigned to messages, other than messages sent by the user, is the "Inbox" label. Another set of attributes that are initially assigned to each message are the user-defined labels associated with other messages (if any) in the same conversation. The user-defined labels associated with the other messages in the conversation are determined by searching a conversation database to identify other labels associated with messages in the same conversation. Optionally, other attributes are initially assigned to the message as well. The attributes associated with a message may be used to search a message database to obtain message with similar attributes. In one example, a search is executed to search for all messages which are labeled as "unread".

Additionally, user-defined labels may be added to the received message based on filters specified by the user. Typically, a user-defined filter includes a set of filter conditions and a set of actions. The filter conditions define which messages match the filer and the actions include actions that specify labels that are to be added or removed from the received message (e.g., messages from a particular user may be marked as "read" by removing an "unread" label or marked as important by adding a "Starred" label). The filter conditions can include criteria with respect to the sender, the recipients, text in the message subject, text in the received message, and the like. In some embodiments, the actions performed, with respect to a particular filter when the filter criteria are satisfied by a respective message, include one or more of: "remove from inbox" (i.e., remove the "Inbox" label from the received message, if present), adding a system label (sometimes called a category) to the received message, and adding a user-defined label to the received message. In one example, the filter specifies that all messages having a particular term or combination of terms be labeled with the "Trash" label. Another filter may specify that if the terms "Lake Tahoe" appear anywhere in the received message, a "Vacation" label is to be added to the received message.

In some embodiments, the labels associated with messages include labels associated with individual messages, but not necessarily all the messages in a conversation. For instance, a "Marked for Deletion" label (sometimes also called the "Trash" label) may be associated with an individual message in a conversation, while not being associated with other messages in the same conversation. Messages marked for deletion are still stored by Server 106, and are still associated with conversations, but are normally not displayed at Client 102 when the corresponding conversations are displayed. One or more special views may be employed to enable a user to view messages having the label "Marked for deletion." Such views afford the user the opportunity to "undelete" a message. On the other hand, in some embodiments, when a user-defined label is associated with a conversation, that label is associated with all messages in the conversation. In some other embodiments, when a user-defined label is associated with a conversation, that label is associated with all messages in the conversation that meet predefined criteria (e.g., messages other than those marked for deletion). Thus, Server 106 supports both message-specific labels that are applied to particular messages and conversation-specific labels that are applied to a conversation as a whole (which may include multiple messages).

It should be noted that in some instances it may be desirable to mark a message for deletion, but not remove it from the conversation; this may be accomplished by using, for example, a particular label. When the conditions are such that the message may now be removed from the conversation, the message may be removed from the conversation as described above. Conditions which may allow for the removal of the message from Message to Conversation Map 140 and Conversation Database 138 may include the passing of a certain amount of time since the message was marked for deletion, an action by the user (e.g., as communicated by Client 102 to Server 106), or other triggering events. Conversations may also be marked for deletion, but not yet removed from the user's messaging account. When a conversation is to be permanently removed from the user's mail account, then the Message to Conversation Map 140 entries for the messages in the conversation may be removed. In addition, the corresponding Conversation Entry 444 (FIG. 4D) may be removed from the Conversation Database 138, and furthermore Index Components 434 (FIG. 4C) for the messages in the conversation may be removed from the Index 142.

In this document, "associating" a particular label with a message, and "marking" the message with the particular label, are considered to be the same or equivalent operations. Additionally, the labels of a conversation may be added to the conversation's messages since, in one embodiment, a message inherits the labels of its conversation. Labels can include system-defined labels, for example, such as Inbox, Trash, Spam, All Documents and Unread. In some embodiments, certain system labels may be mutually exclusive (e.g., Inbox, Trash and Spam). Labels can also include user-defined labels, sometimes herein called Categories.

After any labels are assigned to the received message or conversation (616), Conversation Database 138 and/or Message Database 136 are updated (618) to reflect the newly assigned labels. In some embodiments, at or about the time that labels are assigned to a message or conversation, the results from Spam Identification Module 330 (FIG. 3) are retrieved. If Spam Identification Module 330 classifies the received message as spam, a "Spam" label is assigned to the received message and any conflicting labels (e.g., "Inbox" or "Trash") are removed from the received message.

In some embodiments, quoted text, if any, is identified (620) in the received message (e.g., by comparing the content of the received message with content of prior messages in the conversation associated with the received message). After the conversation association has been made, labels have been associated with the received message and, optionally, any quoted text has been identified, the received message is indexed for searching, and Server 106 updates (622) the Index 142 associated with the User ID by adding index entry components 434 (see FIG. 4C) for the received message to respective index entries 430 in the Index 142. In one embodiment all of the text of the received message is indexed along with portions of the header information. In some embodiments, "noise words" (e.g., words such as "the", "a" and "or") in the message body are not indexed, but all other text in relevant portions of the received message are indexed. One of ordinary skill in the art will recognize that the portions of the received message that are searchable (sometimes expressed as "considered to be searchable") are indexed. As noted below, in some embodiments information concerning labels associated with the received message are added to Index 142 (FIG. 1) at a later stage of the message processing.

Finally, Server 106 optionally sends (624) an acknowledgment to the sender of the message indicating that the message has been received. In implementations or circumstances in which a message n acknowledgment is sent, the sender (e.g., Conversation Client System 102 or Other Message Server System 108) receives (626) the acknowledgement and, typically, updates its own records to indicate that the message has been received by the recipient. After receiving a message, Server 106 may receive a search query and execute a search over the updated Index and use the other updated data structures to retrieve information related to any matching messages and or conversations, as described in greater detail below with reference to FIGS. 6B-6C.

Initially Conversation Client System 102 sends (628, FIG. 6B) a search query to Conversation Server System 106, and the search query is received (630) by Server 106 and processed as described below. The search query may be user specified, or system generated (e.g., in response to the user clicking on an "Inbox" icon). The search terms in the search query may come from the user in the form of words or combination of words. For example, a user could search for messages containing the words "Tahoe" and "dinner" and the stored messages and/or conversations including these terms, if any, would be returned by Server 106. Similarly, a search query can be automatically generated by Server 106 in response to certain user actions. For example, a system generated search query may search for conversations having the label "Inbox" if the user desired an Inbox view to be displayed at Client 102, however the user does not need to type "Inbox" into a search box, but rather selects a predefined user interface component that is a hyperlink to an Inbox view for the user's messaging account. After receiving the search query, Server 106 identifies (632) data structures (e.g., databases tables, maps, indexes, etc.) associated with the User ID and subsequently uses the data structures for the user to identify Message IDs for any matching messages in Index 142 (634).

As described in greater detail above, many features of the disclosed embodiments use conversations as the basic unit of information, as opposed to messages. For instance, in some embodiments, the Inbox presents the user with a list of conversations, while in other embodiments, the Inbox presents the user with a list of messages. Alternatively, the same embodiments may display either lists of messages or lists of conversations, in accordance with user instructions, user-selectable configuration options or query parameters in a received query. Some of the disclosed embodiments use searches to identify conversations to be listed in a plurality of distinct views of the conversations in a user's email account. However, other features of the disclosed embodiments use messages as the basic unit of information.

Index 142 is configured to enable the execution of both message-based search queries and conversation-based search queries. Any combination of searchable terms can be used in a search query. As mentioned above, searchable terms could include the text of the messages, any labels associated with the messages, conversations, or header information associated with a message. In some circumstances, the search query is a message-based query and searches are run against individual messages. In some other circumstances, the search query is a conversation-based query and searches are run against conversations as a whole rather than against individual messages. In some circumstances, the search query includes one or more message-based components and one or more conversation-based components, in which case the message based components are run against individual messages while the conversation based components are run against conversations as a whole rather than against individual messages.

For conversation-based queries or conversation-based query components, when a query requires both first and second query terms, one of which is found in a first message and the other which is found in a second message of the same conversation, the conversation will be considered to be relevant to the query, and thus included in the search results. For example, consider a conversation in which the first message solicited ideas for a lunch location and a subsequent message, while naming a particular restaurant, did not include the text of the original message. If a user was interested in finding that conversation in which the particular restaurant and lunch were discussed, then the search is more likely to produce the desired result if it were applied against the content of the entire conversation. In some implementations, a data structure (e.g., Index 142 in FIG. 4C that includes information corresponding to Simulated Data Structure 422, FIG. 4B) which matches terms in a conversation to a representative message of the conversation is maintained. If such implementations, conversations as a whole that match the search query are identified as matching conversations. Optionally, the number of conversations to return as the result set is limited to a predefined number. If so, then processing of the query continues until a sufficient number of conversations are identified and the results returned. Alternatively, all of the conversations associated with the set of messages returned are identified, but only a subset is returned as the result set.

In contrast, for message-based queries or message-based query components, when a query requires both first and second query terms, one of which is found in a first message (but not in the second message) and the other which is found in a second message (but not in the first message), neither the first nor second message is considered relevant to the query even if the first message and the second message are associated with the same conversation. Rather, only messages that include both the first and second query terms will be included in the search results. For example, if a user is looking for a message from a particular sender that discusses “Tahoe,” the user only wants to find messages that include both the particular sender and the term “Tahoe” and is unlikely to be interested in conversations where the particular sender sent a first message and a different sender used the term “Tahoe” in a second message.

Typically, after a search query has been executed over Index 142, operations are performed to retrieve message date and/or conversation data for generating search results. For a message-based query, typically only message data needs to be retrieved, and thus the message data can be retrieved by performing operations 642-650 (FIG. 6B). However, for a conversation-based query typically both message data and conversation data need to be retrieved and thus operations 656-676 (FIG. 6C) are performed to retrieve conversation data. Thus, in accordance with a determination that the search query is (636) a conversation-based queries or includes conversation-based query components, operations 656-676 are performed at Server 106, as described in greater detail below. In contrast, in accordance with a determination that the search query is (638) a message-based query or includes message-based query components, Server 106 uses the identified Message ID(s) to retrieve (642) message information (e.g., header information, label information, content, attachments, etc.) from Message Database 136 for a message of at least a subset of the matching messages.

After retrieving the message information for a respective message, if there are (644) more matching messages in the subset of matching messages, Server 106 repeats the process. In contrast, if message information has been retrieved for all of the messages in the subset of matching messages and there are not (646) any more matching messages, Server 106 generates and optionally formats (648) search results for the search query. After search results have been generated, the search results are transmitted (650) to Client 102 (e.g., display information including instructions for displaying a list of representations of messages is transmitted to Client 102). Client 102 receives (652) the search results or display information and typically displays the search results or a subset of the search results to a user of Client 102. Exemplary user interfaces for displaying search results and messages at a Client 102 (e.g., in accordance with display instructions from Server 106) in response to a message-based query are described in greater detail below and illustrated in FIGS. 12A-12B.

However, when the query is a conversation-based query or includes a conversation-based component, for the one or more matching Message ID(s), Server 106 retrieves (656) corresponding Conversation ID(s) from Message to Conversation Map 140. The retrieved Conversation ID(s) are used by Server 106 to retrieve (658) conversation information associated with at least a subset of the retrieved Conversation ID(s) from Conversation Database 138. In some embodiments, the conversation information can be used to generate a list of conversations matching the search query without retrieving any message information. For example, if the conversation information includes a list of participants, a number of messages, and a subject or snippet of relevant text for the conversation, Server 106 uses this conversation information to generate representations of the conversations for display at Client 102. Alternatively, or in addition, the conversation information for a respective conversation includes one or more Message IDs, which are used to retrieve (662) message information from Message Database 136 for messages associated with the respective conversation.

After message information for a respective message has been retrieved, if there are (664) more messages in the respective conversation, Server 106 retrieves message information for a next message. However, if there are not (668) any more messages in the respective conversation, Server 106 determines whether there are any more matching conversations. If there are (670) more matching conversations, Server 106 retrieves conversation information for a next matching conversation and, optionally, message information for the messages of that conversation, by repeating the operations described above. However, if there are not (672) any more matching conversations, Server 106 generates and optionally formats (674) search results for the search query. After search results have been generated, the search results are transmitted (676) to Client 102 (e.g., information indicative of the search results, such as a list of representations of conversations, and optionally including instructions for displaying the list of representations of conversations, is transmitted to Client 102). Client 102 receives (652) the search results or information enabling display of search results and typically displays the search results or a subset of the search results to a user of Client 102. Exemplary user interfaces for displaying search results and conversations at a Client 102 (e.g., in accordance with display instructions from Server 106) for a conversation-based query are described in greater detail below and illustrated in FIGS. 11A-11F.

It should be understood that the particular order in which the operations in FIGS. 6A-6C have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 700, 800, 900 and 1000 (e.g., FIG. 7A-7G, 8A-8D, 9A-9D or 10A-10E respectively) are also applicable in an analogous manner to method 600 described above with respect to FIGS. 6A-6C. For example, the conversations, messages and data structures (e.g., databases tables, maps, indexes, etc.) described above with reference to method 600 may have one or more of the characteristics of the various conversations, messages and data structures (e.g., databases tables, maps, indexes, etc.) described herein with reference to methods 700, 800, 900 and 1000. For brevity, these details are not repeated here.

FIGS. 7A-7G include a flowchart representing a method 700 for generating an index configured to support both conversation and message based searching, according to certain embodiments. Method 700 may be governed by instructions that are stored in a non-transitory computer readable storage medium and that are executed by one or more processors of one or more servers, such as in conversation server system 106 (as illustrated in FIGS. 1 and 3). Each of the operations shown in FIGS. 7A-7G may correspond to instructions stored in a computer memory or computer readable storage medium. The computer readable storage medium may include a magnetic or optical disk storage device, solid state storage devices such as Flash memory, or other non-volatile memory device or devices (for example, devices in memory 306 of conversation server system 106). The computer readable instructions stored on the computer readable storage medium may include one or more of: source code, assembly language code, object code, or other instruction format that is executed or interpreted by one or more processors. Some operations in method 700 may be combined and/or the order of some operations may be changed.

Conversation Server System 106 stores (702) a plurality of index entries in an index (e.g., Index 142 in FIGS. 1, 3 and/or 4C). A respective index entry (e.g., 430 in FIG. 4C) stored in the index corresponds to a respective term and has a plurality of index components, and a respective index component of the respective index entry identifying a message that is associated with the respective term, as described in greater detail above with reference to FIG. 4C.

Server 106 receives (704) a first message (e.g., a new message from a Conversation Client System 102 or Other Message Server System 108). In some embodiments, the first message is (706) the most recent message in the conversation (e.g., the new message is the message, in a conversation with multiple messages, that has the latest date/time stamp). After receiving the first message, Server 106 associates (707) the first message with a conversation having at least one other message, thereby creating a conversation including at least two messages (i.e., data structures representing the preexisting conversation are updated with information for the first message).

As described in greater detail above with reference to FIG. 6A, after a message is received, various data structures are updated to reflect the received message. In method 700, Server 106 stores (708), in the index (e.g., an index for the user to whom the message was sent), a plurality of first-message index components that each include an identifier of the first message. One or more of the first-message index components are indicative of a plurality of message terms in the first message. Additionally, when the first message is associated with a conversation having at least one other message with terms that are not included in the first message, one or more of the first-message index components are indicative of one or more conversation terms in the conversation, the one or more conversation terms include one or more terms that are not in the first message. However, in some implementations, if the conversation includes only one message (e.g., the first message is associated with a new conversation) or if the earlier messages contain only the same terms in the same order as in the new message, no index components corresponding to conversation terms are stored in the index. Thus, when the first message is associated with a conversation having at least one other message having terms that are not included in the first message, the first message is indexed in such a way that what is indexed is a simulated data structure (e.g., 422 in FIG. 4B) for the first message, where the simulated data structure includes both terms that occur in the first message as well as terms that occur in the conversation associated with the first message that are not included in the first message. In some embodiments, the terms include (710) one or more of: text content terms, labels, tags, and header information (e.g., subject, sender, recipients, date/time, etc.), as described in greater detail above.

In some embodiments, the one or more conversation terms include one or more terms that occur in both the first message and a second message in the conversation other than the first message. In other words, the conversation terms include terms that occur in both the representative message and other messages in the conversation. In some embodiments, the one or more conversation terms include a plurality of terms that occur in both the first message and a second message in the conversation other than the first message, the plurality of terms occur in a first order in the first message; and occur in a second order, different from the first order, in the second message. In other words, in these embodiments terms that occur in both the representative (first) message of a conversation and another (second) message of the conversation are repeated in the index (represented as both message terms and conversation terms) when the terms occur in a different order in the representative message than in the other message. In contrast, in some embodiments, if a term in the representative message is part of a block of quoted text that was copied from original text in the other message, the terms in the quoted text are not indexed as message terms, as these terms have already been indexed as conversation terms corresponding to the original text in the other message in the conversation.

In some embodiments, Server 106 (or Quoted Text Module 326 in FIG. 3) identifies (712) the quoted text of the first message by comparing text of the first message to text of other messages in the conversation (e.g., other messages in the conversation that have an earlier time/date than the first message). A variety of methods for identifying blocks of text from a previous message that are repeated in the first message as quoted text are well known in the art and will not be discussed in further detail here, for brevity. In some embodiments, in circumstances where quoted text has been identified in the first message, the one or more first-message index components include (714) one or more index components indicative of message terms in original text in the first message (e.g., text that is not quoted text) and one or more index components indicative of message terms in quoted text of the first message. The index components indicative of message terms in the quoted text of the first message are distinguished, in the index, from the index components indicative of message terms in the original text of the first message. For example, the index components indicative of terms in the quoted text may be distinguished from message components indicative of terms in the original text by a set of high order bits (e.g., “00” for original text and “01” for quoted text, as illustrated in the exemplary Simulated Data Structure 422 and Index 142 in FIGS. 4B-4C).

In some embodiments (e.g., index-size-reducing implementations, discussed above), the first-message index components corresponding to message terms include (716) index components representing each message term that occurs in the first message and the first-message index components corresponding to conversation terms include only index components corresponding to terms that do not occur in the first message. Further, while all of the message terms in the first message are indexed for the first message, only a subset of the conversation terms for other messages in the conversation associated with the first message are indexed, so that blocks of terms that occur repeatedly in the conversation (e.g., blocks of quoted text that are quoted from earlier messages in the conversation) are not indexed repeatedly. Typically, the subset of conversation terms would be selected so that each unique conversation term is represented by at least one index component for the first message.

Thus, in some of these embodiments, for a first term that occurs multiple times in the first message, a plurality of distinct first-message index components are stored (718) in an index entry for the first term in the index, each first-message index component representing a respective occurrence of the first term in the first message (e.g., if the term “dinner” occurs three times in the first message, there will be three index components associated with the first message in the index for the term “dinner” in the first message). In contrast, for a second term that occurs multiple times in messages in the conversation other than the first message, a single first-message index component is stored (720) in an index entry for the second term in the index, the single first-message index component representing all occurrences of the second term in the messages in the conversation other than the first message (e.g., if the term “dinner” occurs three times in messages other than the first message in a conversation, there will be a single index component associated with the first message in the index for the term “dinner” in the other messages). Alternatively, the conversation terms could include each occurrence of a term in the conversation; however, this would require a large amount of storage resources for conversations with multiple messages.

Similarly, in some embodiments, in accordance with a determination that a same logically complete text string (e.g., a word, a sentence, a paragraph, or a previously identified block of quoted text, etc.) occurs in the first message and in the at least one other message in the conversation, Server 106 stores (722) in the index, first-message index components that correspond to the occurrence of the terms in the logically complete text string in the first message and forgoes storage of first-message index components that correspond to the occurrence of the terms in the logically complete text string in the at least one other message in the index. In other words, if a block of text is already included in quoted text, then it only needs to be indexed once for the first message. Because many messaging systems automatically quote large blocks of previous messages, avoiding repeatedly indexing identical blocks of text that occur in the same conversation can significantly reduce the processing and storage resources that are required for storing and retrieving information in the index for the conversation.

In some embodiments, a respective index component indicative of a conversation term includes (726) a value (e.g., a set of one or more high order bits such as "11" in FIGS. 4B-4C) identifying the respective index component as being associated with a conversation term. Alternatively a flag bit or other metadata could be used to identify a respective index component as being associated with a conversation term (e.g., as opposed to being associated with a message term).

In some embodiments, a respective index component indicative of a conversation term includes (728) a mapped location that corresponds to an original location of the conversation term in the conversation. For example, when the original location is a location in a message of the conversation other than the first message, the mapped location can be a "virtual location" that is associated with the first message. In some embodiments, this mapped location of the respective index component indicative of the conversation term is in (730) a predefined range of locations associated only with conversation terms. For example, the mapped location may correspond to a location within a predefined partition of a simulated data structure (e.g., 422 in FIG. 4B) that is designated for conversation terms.

In some embodiments, in the index, the one or more index components indicative of the message terms are (732) distinguished from the one or more index components indicative of the conversation terms. In some implementations of these embodiments, the one or more index components indicative of the plurality of message terms are distinguished from the one or more index components indicative of conversation terms by partitioning (734) an address space for the first message, as described in greater detail above with reference to FIGS. 4B-4C. Additionally, in some implementations, Server 106 partitions (736) the address space for the first message using a set of one or more high order address bits to specify partitions, as described in greater detail above with reference to FIGS. 4B-4C.

In some embodiments, Server 106 stores, (738) in the index, a first-message index component that identifies the first message as a representative message of the conversation. For example, in some implementations, a special label is used by Server 106 to track representative messages of conversations, by assigning the special representative-message label (e.g., via a special ^th label) to each representative message. See discussion of FIG. 4C, above, with respect to representative-message labels. Typically, there will be only one representative message per conversation. When the first message is the representative message for a particular conversation, the index includes first-message index components representing all of the terms in the conversation, or all of the text content terms in the conversation (including both terms in the first message and terms in other messages in the conversation), so that a Boolean search in the index will be able to determine whether or not the conversation associated with the first message includes all of the search query terms by determining whether the index includes first-message index components that match the search query. By identifying a single message in each conversation as the representative message of that conversation, and adding first-message index components for terms in all of the messages in the conversation, Server 106 is able to perform conversation-based or message-based searches by either searching only representative conversations (e.g., for conversation-based searches) or searching only message terms (e.g., for message-based searches), as described in greater detail below with reference to method 900.

In some embodiments, Server 106 receives (740) a second message subsequent to receiving the first message and associates (742) the second message with the same conversation as the first message, as described in greater detail above with reference to FIG. 6A. It should be understood that the following operations are performed only when the second message has a date/time that is later than the date/time of the first message (e.g., when the second message is more recent than the first message). After receiving the second message, Server 106 stores, (744) in the index, one or more second-message index components that each includes an identifier of the second message. The second-message index components include one or more index components indicative of a plurality of message terms in the second message and one or more index components indicative of one or more conversation terms in the conversation, the one or more conversation terms including one or more terms that are not in the second message (e.g., one or more terms from the first message that do not occur in the second message). In some implementations, the second-message index components also include an index component identifying the second message as the representative message of the conversation. In conjunction with adding the index component identifying the second message as a representative message, Server 106 removes (746) from the index the first-message index component that identifies the first message as the representative message of the conversation. In other words, only one message at a time in each conversation is identified as the representative message of the conversation, so that Server 106 can use the label that identifies the representative messages of the conversation to determine which messages to search when executing a conversation-based search over the index.

In some embodiments, after receiving the second message and, optionally, after storing in the index the one or more second-message index components indicative of one or more terms in the conversation that are not in the second message, Server 106 removes (748) from the index the one or more first-message index components indicative of conversation terms. In other words, in these embodiments, index components for the first message that correspond to conversation terms are removed from the index when the first message is no longer the representative message for the conversation. As the first message is no longer a representative message, the first-message index components corresponding to conversation terms are not needed to execute conversation-based queries (instead, second-message index components corresponding to conversation terms serve this purpose). While there is some possibility that the first message will become a representative message again, this would typically only happen if the second message and all other messages in the conversation that are more recent than the first message were to be deleted, which is not a situation that will occur frequently under normal use. Removing the unneeded first-message index components reduces the size of the index, thereby improving speed and efficiency of executing search queries. However, in some implementations, because such considerations only impact performance and not accuracy of the search, the removal of unneeded index components is given lower priority than other tasks, such as search execution and new message processing. Thus, Server 106 may issue commands to create new second-message index components for conversation terms and remove old first-message index components at the same time or substantially the same time (e.g., in response to receiving the second message). However, in these implementations, even when these commands are issued at the same time, the operations removing the first-message index components are given lower priority and thus may be performed when the system has greater free processing capacity (e.g., during off-peak usage times, such as the middle of the night).

While in the embodiments described above, the unneeded index components are actively removed, in other embodiments, the unneeded index components are passively removed in the process of a regularly scheduled regeneration of the index. For example, if the messages and conversations for a user are re-indexed once a week and only the necessary index components are included in the index when the data is re-indexed, then unneeded index components will be effectively removed whenever the index is regenerated without any active procedures for identifying and deleting the unneeded index components. If re-indexing occurs relatively frequently, this passive approach may be more efficient than actively removing unneeded index components. In other embodiments, the first-message index components are retained when the cost (e.g., processing, storage, etc.) of retaining unneeded index components is determined to be less than the cost of removing the unneeded index components.

In some embodiments, the most recent message in a conversation is used as the representative message without regard to the order in which the messages in the conversation were received at Server 106. In these embodiments, when Server 106 receives a second message (e.g., from Client 102 or a respective Other Message Server System 108) that is a prior message in the conversation (e.g., the prior message is a message that was sent at a time that is earlier than a time that the first message was sent because the second message was delayed in transit or because the second message was associated with the conversation manually by the user or for some other reason), the second message is not used as the representative message. After receiving the second message that is a prior message, Server 106 associates the second message with the conversation and stores, in the index, one or more second-message index components that each includes an identifier of the second message including one or more index components indicative of a plurality of message terms in the second message. However, in some implementations, because the second message is a prior message and is not the most recent message in the conversation, the first message remains the representative message for the conversation. Thus, Server 106 updates the conversation terms associated with the first message rather than storing conversation terms associated with the second message. In particular, Server 106 stores, in the index, one or more first-message index components that each include an identifier of the first message including one or more index components indicative of a plurality of message terms in the second message that are identified as conversation terms. Alternatively, in other embodiments, the last received message could be used as a representative message without regard to whether the last received message is the most recent message in the conversation.

In some embodiments, Server 106 stores (750) a plurality of messages associated with a plurality of conversations. Each conversation in this plurality of conversations includes a respective representative message. Typically, for a conversation with a plurality of messages, one of the messages is selected and identified as a representative message. For conversations with a single message, the single message is the representative message. In some embodiments, for convenience, all of the representative messages are marked with a common label (e.g., a representative-message label, as described in greater detail above). For each conversation, a respective property of the conversation comprises (752) a corresponding property of the representative message of the conversation. Subsequently, when a list of conversations is prepared as search results, Server 106 sorts or filters (754) the list of conversations in accordance with the respective property. The property could be a date/time stamp or other time indicator; a subject/snippet that is representative of the content of the representative message; a recipient list, etc. As one example, a list of conversations is produced as search results for a search query (e.g., as illustrated in FIG. 11B) and the conversations in the list are sorted in date/time order from most recent to least recent based on a date/time associated with the respective representative messages of the conversations. Thus, the conversations would be sorted based on a date/time of the most recent message rather than a date/time of the earliest message of the conversation.

In some embodiments, each conversation includes (756) a respective representative message. Server 106 receives (758) a search query from a client and identifies (760) one or more conversations that match the search query. A general description of responding to a search query is provided above with reference to FIGS. 6B-6C. More specifically, in method 700, after identifying the conversations that match the search query, Server 106 sends (762) to the client information enabling display of search results including representations of at least a subset of the conversations that match the search query, as shown in the exemplary user interface described in greater detail below with reference to FIG. 11B. The representations of conversations, also called concise conversation headers, are sorted in accordance with one or more properties (e.g., date/time, monotonically assigned Message ID that is assigned in the order in which messages are received by Server 106, etc.) of the respective representative messages of corresponding conversations. In some embodiments, the Message ID of the oldest message in a conversation is used as at least a portion of the Conversation ID for the conversation.

In some embodiments, after storing in the index the one or more first-message index components indicative of the one or more conversation terms in the conversation, Server 106 detects (764) a modification of a respective message of the one or more other messages in the conversation. In response to detecting the modification, Server 106 updates (766) the one or more first-message index components indicative of the conversation terms that are stored in the index in accordance with the modification of the respective message. In some situations, the detected modification includes adding (768) a first term (e.g., adding a label) to the respective message; and the updating includes adding a new first-message index component indicative of the first term (e.g., label) to the index. In other situations, the modification includes removing (770) a second term (e.g., deleting the label) from the respective message; and the updating includes conditionally removing a first-message index component indicative of the second term (e.g., label) from the index, the condition being that there are no other instances of the second term remaining in the conversation.

In some embodiments, Server 106 removes (772) a respective message other than the first message from the conversation. For example, a message may be removed from a conversation in response to a request from Client 102 to delete or disassociate the message from the conversation. After removing the respective message, Server 106 removes (774) from the index one or more first-message index components indicative of one or more conversation terms that occurred in the respective message. In some embodiments, the index components that are removed include only first-message index components corresponding to terms that occurred only in the respective removed message but not in other messages of the conversation.

In some embodiments, if a message has been marked for deletion by the user but not removed from the system (e.g., a deleted message), the first-message index components corresponding to terms in the deleted message are maintained in the index, but the deleted message is not displayed to the user in the conversation view. Instead, in order to track messages that are deleted or marked for deletion, labels of the messages may be modified. For example a label indicating that the message is an active message may be removed from the message and/or a corresponding index component may be removed from the index. As another example, a label indicating that the message has been "marked for deletion" may be added to the message and/or a corresponding index entry may be added to the index. Thus, if the deleted message matches a search query (or, in combination with other messages in the conversation matches a search query) then the conversation would still be returned, but Server 106 will prevent the deleted message from being displayed in accordance with a label that indicates that the message has been marked for deletion or is no longer an active message. In some embodiments, where messages marked for deletion are not displayed, Server 106 provides Client 102 with display information enabling Client 102 to display an indicator that the conversation includes one or more deleted messages so as to alert the user that there are one or more deleted messages that may match the search query terms.

In some embodiments, Server 106 stores (776) in the index a respective index entry corresponding to a predefined term (e.g., an "active-message" label), where the respective index entry corresponding to the predefined term includes a plurality of index components corresponding to respective messages of a plurality of messages (e.g., all messages stored at the server that are not spam and have not been deleted), and the predefined term is an indicator that the respective messages have been marked as active messages (e.g., a message that is neither spam nor a message marked for deletion). In response to a request to ignore a particular message in the plurality of messages, Server removes (778) the respective index component corresponding to the particular message from the index entry corresponding to the predefined term. In other words, the "active-message" label (which could also be termed a "not spam/not trash" label) is added by Server 106 to every message (e.g., as it is received) and removed from messages that are flagged as trash and/or removed from or not added to messages that are flagged as spam. Thus, the respective representative message for any conversation with at least one non-spam non-trash message will have the "active-message" label because the representative message for a conversation inherits at least one copy of each label associated with a message in the conversation. Consequently, conversations including no "active" messages (e.g., conversations including only messages marked for deletion or marked as spam) will not be returned as search results unless the search is search for deleted messages, or spam flagged messages. On the other hand, in some embodiments, conversations that include at least one "active" message (e.g., a message that is not marked for deletion or identified as spam) can still be returned as search results, even if some or all of the other messages (even matching messages) in the conversation have been marked for deletion or identified as spam.

A retention policy may be specified by a user or an organization and indicates how long messages and/or conversations are retained. Many organizations have a policy that all communications are deleted after a predefined time period (e.g., 30 days, 2 years, etc.) has passed since the communication was sent or received. In some circumstances retention policies are adjusted on a per message basis. For instance, in some organizations when a litigation matter is pending all written communications relevant to the litigation matter will be retained for the duration of the litigation matter. Individual "retention policy" labels may be used to identify all messages and/or conversations to which a particular set of retention policies are to be applied. In some embodiments, the retention policy is only applied to the particular message to which the corresponding retention policy label has been applied. In some embodiments, Server 106 stores (780) in the index a respective first-message index component indicative of a retention policy for a respective message in the conversation, and Server 106 applies (782) the retention policy to all messages in the conversation associated with the first message. In some embodiments, whether the retention policy is applied to the particular message or all of the messages in the conversation depends on whether the user who added the information indicative of the retention policy interacts with the message separately or as part of the conversation (e.g., whether the client used by the user displays messages in "message view mode" as illustrated in FIGS. 12A-12B or in "conversation view mode" as illustrated in FIGS. 11A-11F).

In some embodiments, a user of a client may interact with messages using either a message view mode or a "conversation view mode." In these embodiments, when in a "conversation view mode," conversations (e.g., groups of associated messages) are treated as the primary unit of information (e.g., search results return a list of conversations matching the search query, and whenever a conversation is opened all of the messages associated with the conversation are displayed, as illustrated in FIGS. 11A-11F), while when in "message view mode," messages are treated as the primary unit of information (e.g., search results return a list of messages matching the search query, and whenever a message is only the message is displayed, as illustrated in FIG. 12A-12B). Display information provided by Server 106 enabling a client to display messages may be different depending on whether a user of the client has indicated a desire to operate in "conversation view mode" or "message view mode." Alternatively, Server 106 may provide the same display information to a requesting client without regard to whether a user of the requesting client has indicated a desire to operate in "conversation view mode" or "message view mode," and the requesting client may manipulate the display information based on the indication provided by the user.

In some embodiments a user may decide on a per session basis whether to display content in "conversation view mode"

or "message view mode." Alternatively, a Server 106 may enable only "conversation view mode" or only "message view mode" at particular clients. However, when these two different modes exist, it may be advantageous to treat labels added in "conversation view mode" differently from labels added in "message view mode." For example, a retention policy label added to a message while in "conversation view mode" may be applied to the entire conversation associated with the message. However, when the retention policy label is applied to the message while in "message view mode," the retention policy is applied to only the message and not the entire conversation associated with the message.

Even in embodiments where conversations can be viewed in both "conversation view mode" and "message view mode," using the exemplary data structures described herein, index components indicative of the labels are stored in same data structure and/or indexed in the same index without regard to whether the labels were added in "conversation view mode" or "message view mode." Thus the messages can be made available in either mode, and the index does not need to be duplicated for conversation based interactions.

In some embodiments, the first-message index components corresponding to message terms include index components representing each message term that occurs in the first message; and the first-message index components corresponding to conversation terms include only index components corresponding to terms that do not occur in the first message, as described in greater detail above (e.g., embodiments where only a subset of the terms in the messages other than the representative message are indexed as conversation terms). In some of these embodiments, Server 106 receives (784) a search query including multiple query terms and at least one location-constrained query term set including a plurality of query terms having location and/or order constraints. In response to the search query, Server 106 executes (786) a Boolean search for candidate conversations that include all query terms in the query and also executes a search within the candidate conversations to remove candidate conversations that do not include at least one message satisfying each of the location-constrained query term sets. Thus, in these embodiments a search query is performed in two stages. In a first stage conversations including the searched for terms are identified and in the second stage conversations that do not include the terms in the proper order or location are removed from the set of matching conversations. This embodiment enables location-constrained queries to be performed even when first-message index components do not preserve an order and/or relative location of terms in the conversation.

It should be understood that the particular order in which the operations in FIGS. 7A-7G have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600, 800, 900 and 1000 (e.g., FIG. 6A-6C, 8A-8D, 9A-9D or 10A-10E respectively) are also applicable in an analogous manner to method 700 described above with respect to FIGS. 7A-7G. For example, the conversations, messages and data structures (e.g., databases tables, maps, indexes, etc.) described above with reference to method 700 may have one or more of the characteristics of the various conversations, messages and data structures (e.g., databases tables, maps, indexes, etc.) described herein with reference to methods 600, 800, 900 and 1000. For brevity, these details are not repeated here.

FIGS. 8A-8D include a flowchart representing a method 800 for separately indexing quoted text in messages in conversations to support advanced conversation-based searching, according to certain embodiments. Method 800 may be governed by instructions that are stored in a non-transitory computer readable storage medium and that are executed by one or more processors of one or more servers, such as in conversation server system 106 (as illustrated in FIGS. 1 and 3). Each of the operations shown in FIGS. 8A-8D may correspond to instructions stored in a computer memory or computer readable storage medium. The computer readable storage medium may include a magnetic or optical disk storage device, solid state storage devices such as Flash memory, or other non-volatile memory device or devices (for example, devices in memory 306 of conversation server system 106). The computer readable instructions stored on the computer readable storage medium may include one or more of: source code, assembly language code, object code, or other instruction format that is executed or interpreted by one or more processors. Some operations in method 800 may be combined and/or the order of some operations may be changed.

Conversation Server System 106 stores (802) a plurality of index entries in an index (e.g., Index 142 in FIGS. 1, 3 and/or 4C). A respective index entry (e.g., 430 in FIG. 4C) corresponds to a respective term and includes a plurality of index components, a respective index component of the respective index entry identifies a message that is associated with the respective term.

Server 106 receives (804) a first message (e.g., from a Conversation Client System 102 or Other Message Server System 108). After receiving the first message, Server 106 associates (806) the first message with a conversation having one or more other messages and identifies (808) text in the first message as quoted text. In some embodiments, the quoted text is identified in the first message based on text that occurs in one or more of the other messages associated with the conversation. In other words, in these embodiments, the quoted text is not determined merely by looking for conventional quoted text indicators such as ">>" or metadata indicating that a particular block of text is quoted text. A variety of methods for identifying blocks of text from a previous message that are repeated in the first message as quoted text are well known in the art and will not be discussed in further detail here, for brevity. However in other embodiments, one or more conventional approaches to identifying quoted text in messages (e.g., quoted text indicators and/or metadata identifying quoted text, etc.) are used instead of, or in addition to, the approaches described above for identifying quoted text in messages.

An advantage of comparing messages to determine quoted text, as described in some of the embodiments above, in addition to or instead of using quoted text indicators or metadata identifying quoted text, is that text identified as quoted text using quoted text indicators or metadata may not actually be repeated elsewhere in the conversation (e.g., because quoted text indicators were added in error, the message from which the text was quoted is not included in the conversation, or the message from which the text was quoted was deleted from the conversation). Thus, identifying quoted text at least in part by comparing messages ensures that only quoted text that actually occurs in a prior message is identified as quoted text. Similarly, quoted text in a conversation may not include quoted text indicators, and thus identifying quoted text by comparing messages will identify quoted text that would be missed if other methods of identifying quoted text were used.

In some embodiments, identifying quoted text in the first message includes comparing (810) text in the first message to text from a prior message in the conversation, identifying (812) matching text in the prior message, and identifying (814) the matching text as quoted text. It should be understood that, as used herein, a prior message is a message that was sent at a time that is earlier than a time that the first message was sent (e.g., a prior message has an earlier date/time stamp than the first message). It should be noted that the matching text will be quoted text in the first message but may be either original text or quoted text in the prior message (e.g., depending on whether or not the matching text was originally introduced in the prior message or in some other earlier message). In some embodiments, the text of the first message is compared with text of multiple messages with earlier date/time stamps. In other embodiments, the text of the first message is only compared with a predefined number of messages with earlier date/time stamps (e.g., the message in the conversation that is immediately prior to the first message).

As described in greater detail above with reference to FIG. 6A, after a message is received, various data structures are updated to reflect the received message. In method 800, after identifying the quoted text, Server 106 stores (816) in the index, a plurality of first-message index components that each includes an identifier of the first message. One or more of the first-message index components correspond to terms that occur in original text of the first message. Additionally, one or more of the first-message index components correspond to terms in the first message that occur in the quoted text of the first message, and in the index, the first-message index components that correspond to terms that occur in original text of the first message are distinguished from the first-message index components that correspond to terms in the first message that occur in the quoted text of the first message. In some embodiments, the first message is indexed in such a way that a simulated data structure (e.g., 422 in FIG. 4B) for the first message identifies both original text and quoted text within the first message. In some embodiments, the terms include one or more of: text content terms, labels, tags, and header information. (e.g., subject, sender, recipients, date/time, etc.), as described in greater detail above.

Typically, an index entry for a respective term indicates locations of the respective term in quoted text of a message and locations of the term in original text (which could also be referred to as non-quoted text) of the message. The index entry for the respective term includes information that distinguishes the index components corresponding to quoted text from the index components corresponding to non-quoted text. In some embodiments, a respective index component for a particular term in the quoted text includes (818) a value identifying the respective index component as being associated with the quoted text. In some embodiments, a respective index component for a particular term in the quoted text includes (820) a mapped location that corresponds to an original location of the particular term in the quoted text. In some embodiments, the mapped location of the particular term is in (822) a predefined range of locations associated only with terms in the quoted text (e.g., locations in a partition with one or more high order address bits identifying quoted text). For example, the first-message index components for terms in the quoted text may include a predefined quoted-text marker (e.g., a set of one or more high order address bits such as "01") that is independent of the terms in the quoted text and is also independent of the length and content of the first message, where first-message index components for terms in the original text include a different predefined original text marker (e.g., a set of one or more high order address bits such as "00" as illustrated in FIGS. 4B-4C). In some embodiments, the predefined quoted-text marker is included in the index component for each term of the quoted text.

In some embodiments, in the index, the one or more index components indicative of the terms that occur in original text of the first message are distinguished from the one or more index components indicative of terms in the first message that occur only in the quoted text of the first message by partitioning (824) an address space for the first message, as described in greater detail above with reference to FIGS. 4B-4C. Additionally, Server 106 may partition (826) the address space for the first message using a set of one or more high order address bits to specify partitions, as described in greater detail above with reference to FIGS. 4B-4C.

Server 106 may receive (828) a request for the first message from a client. In some embodiments, in response to the request, Server 106 sends (830) to the client a portion of the first message that excludes at least a portion of the quoted text (e.g., the quoted text is elided form the first message). In some embodiments, even if quoted text is not sent to the client, a user can request the quoted text. For example, Server 106 may send the quoted text to the client in response to detecting selection of a "show quoted text" link by the user (e.g., 1152 in FIG. 11E). Additionally, when Server 106 receives (832) a request for the conversation including the first message from a client, in some embodiments, in response to the request, Server 106 sends (834) information to the client enabling the client to display a portion of the first message that excludes the quoted text and at least a portion of a second message in the conversation that includes the quoted text, as shown in the exemplary user interface described in greater detail below with reference to FIG. 11E. For example, in a conversation with a first message that includes a block of quoted text from a second message as original text, the conversation would include both the first message without the quoted text and the second message with the original text that was quoted in the quoted text of the first message.

In some embodiments, after identifying quoted text in the first message Server 106 receives (836) a second message (e.g., from Client 102 or a respective Other Message Server System 108) that is a prior message in the conversation (e.g., the prior message is a message that was sent at a time that is earlier than a time that the first message was sent). After receiving the second message, Server 106 associates (838) the second message with the conversation and updates (840) the quoted text in the first message based on the text that occurs in the second message. For example, a message sent prior to the first message may be associated with the conversation including the first message after the first message is associated with the conversation (e.g., because the second message was delayed in transit or because the second message was associated with the conversation manually by the user or for some other reason), and thus additional quoted text may be identified in the second message that was quoted in the first message. When this additional quoted text is identified, first-message index components for terms in the newly identified quoted text of the first message are updated to indicate that the terms are in quoted text of the message.

Server 106 may receive (e.g., from a Client 102) a request to delete a respective message that is a prior message in the conversation in a conversation (e.g., the prior message is a message that was sent at a time that is earlier than a time that the first message was sent). In response to the request to delete the respective message, Server 106 deletes (842) the respective message. In some embodiments, upon deleting the respective message, Server 106 updates (844) the quoted text in the first message based on the text that occurred in the respective message. For example, when a message sent prior to the first message is removed from the conversation including the first message, some of the quoted text previously identified in the first message may be text quoted from the deleted message. However, once the deleted message has been deleted any quoted text that was only present in the deleted message and the first message is now only present in the conversation in the first message. As such, the copy of the text quoted from the deleted message that occurs in the first message is no longer treated as quoted text, and first-message index components for terms in the newly identified quoted text of the first message are updated to indicate that the terms in text previously identified as quoted text from the deleted message are no longer identified as quoted text in first-message index components (e.g., the high order bits for the mapped locations of the terms are changed from "01" to "00" to indicate that the terms are considered to be original text of the message rather than quoted text of the message).

Server 106 may receive (846) from a client a search query (e.g., a message-mode search query) having one or more query terms. A general description of responding to a search query is described above in greater detail with reference to FIGS. 6B-6C. More specifically, in method 800, in response to receiving the search query, Server 106 performs (848) a search of the index to identify messages including one or more of the query terms. However, in some embodiments, index components corresponding to terms in the quoted text are ignored while performing the search. For example, the index components including mapped locations with addresses having high order bits (e.g., one or more high order address bits, such as "01," as illustrated in FIGS. 4B-4C) specifying that the terms corresponding to the index component are in quoted text are ignored while performing the search. Optionally, instead of ignoring the index components while performing the search, after preliminary search results are generated, any index components that are identified as being associated with quoted text are filtered out of the preliminary results so as to produce updated results.

Server 106 may receive (850) from a client a search query (e.g., a conversation-mode search query) having one or more query terms. A general description of responding to a search query is described above in greater detail with reference to FIGS. 6B-6C. More specifically, in method 800, after receiving the search query having one or more terms, Server 106 identifies (852) a conversation having a representative message (i.e., the first message from operations 804-826) that matches the search query. The original text of the first message includes a first set of one or more terms that match one or more of the query terms and the quoted text of the first message includes a second set of one or more terms that match one or more of the query terms. In some implementations, when preparing instructions for displaying the conversation at a client in response to the search query, Server 106 generates display instructions for highlighting (854) terms in the first set of terms; and forgoing (856) highlighting terms in the second set of terms. In other words, when search terms are highlighted in messages produced in response to a search query, Server 106 produces instructions for only highlighting terms that occur within original text of the first message, as shown in the exemplary user interface described in greater detail below with reference to FIGS. 11D-11E.

In some of these embodiments, Server 106 also identifies (858) a third set of one or more terms in a second message of the conversation that match one or more of the query terms (e.g., the terms are identified in original text of the second message). In accordance with the identification of the third set of one or more terms, Server 106 generates display instructions for highlighting (860) terms in the third set of terms (e.g., by changing the font of the terms in the third set of terms, or by instructing the client to display an expanded view of the second message). In some embodiments only messages that have terms in the original text that match the search query (and, optionally, the most recent message in the conversation) are displayed in expanded mode, using an expanded message display sub-form, and all other messages in the conversation are displayed in a compressed mode, using a compact message display sub-form (e.g., where only a concise message header including a sender, snippet and/or date/time is displayed in the compressed mode), as shown in the exemplary user interface described in greater detail below with reference to FIG. 11D-11E. Thus, a respective message that only includes search terms in quoted text would be displayed using the compact sub-form, and/or no terms in the respective message would be highlighted.

It should be understood that the particular order in which the operations in FIGS. 8A-8D have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600, 700, 900 and 1000 (e.g., FIG. 6A-6C, 7A-7G, 9A-9D or 10A-10E respectively) are also applicable in an analogous manner to method 800 described above with respect to FIGS. 8A-8D. For example, the conversations, messages and data structures (e.g., databases tables, maps, indexes, etc.) described above with reference to method 800 may have one or more of the characteristics of the various conversations, messages and data structures (e.g., databases tables, maps, indexes, etc.) described herein with reference to methods 600, 700, 900 and 1000. For brevity, these details are not repeated here.

FIGS. 9A-9D include a flowchart representing a method 900 for enabling searches for conversations with two messages each having a respective query term from a search query, according to certain embodiments. Method 900 may be governed by instructions that are stored in a non-transitory computer readable storage medium and that are executed by one or more processors of one or more servers, such as in conversation server system 106 (as illustrated in FIGS. 1 and 3). Each of the operations shown in FIGS. 9A-9D may correspond to instructions stored in a computer memory or computer readable storage medium. The computer readable storage medium may include a magnetic or optical disk storage device, solid state storage devices such as Flash memory, or other non-volatile memory device or devices (for example, devices in memory 306 of conversation server system 106). The computer readable instructions stored on the computer readable storage medium may include one or more of: source code, assembly language code, object code, or other instruction format that is executed or interpreted by one or more processors. Some operations in method 900 may be combined and/or the order of some operations may be changed.

Conversation Server System 106 stores (902) a plurality of index entries in an index (e.g., Index 142 in FIGS. 1, 3 and/or 4C). A respective index entry (e.g., 430 in FIG. 4C) corresponds to a respective term and having a plurality of index components, a respective index component of the respective index entry identifying a message that is associated with the respective term.

Server 106 receives (904) a first message having a first term. In the particular situation addressed by method 900, after receiving the first message, Server 106 associates (906) the first message with a conversation that includes at least a second message, where the first term is not included in the second message and the second message includes a second term that is not included in the first message. It should be understood that, typically, the second message is a prior message that was received at the server prior to receiving the first message.

As described in greater detail above with reference to FIG. 6A, after a message is received, various data structures are updated to reflect the received message. In method 900 Server 106 stores (908) in the index, a plurality of index components for a same respective referenced object, including an index component indicative of the first term and an index component indicative of the second term, where, in some embodiments, a referenced object is an object that has a single identifier by which it is referenced/identified in the index. Some or all of the index components may include information indicating a location of the term within a message database (e.g., by specifying a Message ID and position within the message). However in some embodiments, at least some of the index components do not correspond to any location of a term within a message. For example, index components for conversation terms may not correspond to terms stored in a data structure for the representative message of the conversation, but may instead be added to the index and given "mapped" locations within the representative message that do not correspond to actual locations of the terms to indicate that the terms occur in the conversation for which the first message is a representative message and do not occur in the first message itself (e.g., the index terms for conversations correspond to mapped locations within a Simulated Data Structure 422 in FIG. 4B that is not actually stored at Server 106). In some embodiments, Server 106 receives a search query for a conversation having the first term in one message and the second term in another message, and in response to the request the server generates search results including the conversation that includes the first message and the second message, as described in greater detail below.

In some embodiments, the respective referenced object is (910) a representative message of the conversation. For example, a most recently received message (e.g., the first message) in the conversation may be identified as the representative message for the conversation. In some other embodiments, the respective referenced object is (912) the conversation. For example, a conversation may be indexed in addition to indexing each of the messages of the conversation, and thus all of the terms that occur in different messages of the conversation would be associated with the index components associated with the conversation (e.g., individual index components could include a Conversation ID for the conversation and a value corresponding to a mapped location of the term in the conversation).

In some embodiments, the index component for the second term includes (914) a value (e.g., a set of one or more high order bits such as "11" in FIGS. 4B-4C) identifying the index component for the second message as being associated with a message in the conversation other than the first message. Alternatively a flag bit or other metadata could be used to identify a respective index component as being associated with a conversation term (e.g., as opposed to being associated with a message term).

In some embodiments, the index component for the second term includes (916) a mapped location that corresponds to an original location of the second term in the conversation. For example, when the original location is a location in a message of the conversation other than the first message, the mapped location is a "virtual location" that is associated with the first message. In some implementations, this mapped location of the second term is in (918) a predefined range of locations associated only with terms in the conversation that are in messages other than the first message. For example, in some implementations, the mapped location corresponds to a location within a predefined partition of a simulated data structure (e.g., 422 in FIG. 4B) that is designated for conversation terms.

In some embodiments, the second term is (920) also associated with a second referenced object and the first term is not associated with the second referenced object. In other words, the first message is a representative message and thus is augmented with conversations terms that do not occur in the first message, while the second message is not a representative message for the conversation and thus is not augmented with conversation terms that do not occur in the second message. In some embodiments, a message is augmented by adding terms to a data structure representative of the message (e.g., Simulated Data Structure 422 in FIG. 4B). In some embodiments, a message is augmented by modifying index components identifying the message. For example, when the first term and the second term are indicative of senders of respective messages, for a conversation with a first message having a first sender and a second message having a second sender, the identifiers of the first sender and the second sender are both associated with the first message. However, in this example, the identifier of the second sender is also associated with a second message (e.g., the message sent by the second sender), but the first sender is not associated with the second message, because the second message is not a representative message for the conversation and thus is not augmented with information about the first message.

In some embodiments, the respective referenced object is (922) the first message and the index includes a plurality of first-message index components that each include an identifier of the first message, as described in greater detail above with reference to FIGS. 4B-4C. In some embodiments, the address space for the first message is partitioned (924) using a set of one or more high order address bits to specify partitions, as described in greater detail above with reference to FIGS. 4B-4C.

In contrast, in some embodiments, the referenced object is (926) the conversation including the first message and the second message, and the index includes a plurality of conversation index components that each include an identifier of the conversation, including: one or more index components indicative of a plurality of first message terms in the first message, including the first term; and one or more index components indicative of a plurality of second message terms in the second message, including the second term; and the index components indicative of the plurality of first message terms are distinguished from the index components indicative of the plurality of second message terms by partitioning an address space for the conversation, the address space having a respective address for each first message term and each second message term. In these embodiments, the respective address for a respective term in the conversation is indicative of a mapped location of the respective term within the address space for the conversation.

In some of these embodiments (e.g., where the referenced object is a conversation), the address space for the conversation is partitioned (928) using a set of one or more high order address bits to specify partitions; a mapped location of a first message term in the address space for the conversation is specified by an address having one or more high order address bits with a first value; and a mapped location of a second message term in the address space for the conversation is specified by an address having one or more high order address bits with a second value different from the first value. In other words, for all first message terms (e.g., terms that are in the first message) a mapped location is specified by an address including a set of high order address bits having a value that is different from the value of a set of high order address bits of an address that specifies a mapped location of any of the second message terms (e.g., terms that are in the second message). It should be understood that the data structures required to use the conversation as the referenced object are substantially similar to the data structures described above in FIGS. 4B-4C, where a representative message is the referenced object, with a few exceptions, including using Conversation IDs instead of Message IDs to refer to index components and having partitions in a simulated data structure that refer to different messages (e.g., one partition for each message) rather than having a partition for "message terms" in original text, a partition for "message terms" in quoted text and a partition for "conversation terms."

In some embodiments, the first message has a first sender and the first term is (930) representative of the first sender and the second message has a second sender that is distinct from the first sender and the second term is representative of the second sender. In some embodiments, the storing is (932) performed at Server 106 without regard to whether or not the first message was addressed to the second sender or the second message was addressed to the first sender. In other words, the operations described above would be performed even if the first message was not addressed to the second sender, and/or the second message was not addressed to the first sender, because the first and second terms indicate a sender of the message not a recipient of the message. In some embodiments, the first term includes (934) an indication that the first sender is a sender of a message in the conversation and the second term includes an indication that the second sender is a sender of a message in the conversation. In other words, the terms differentiate between senders and recipients (e.g., there is one term for a message sent by a particular user (e.g., From:UserA) and a different term for a message received by the particular user (e.g., To:UserA).

In some embodiments, after receiving the first message Server 106 receives (936) from a client, a search query for conversations including at least one message from the first sender and at least one message from the second sender. A general description of responding to a search query is described above in greater detail with reference to FIGS. 6B-6C. More specifically, in method 900, in response to the search query, Server 106 provides (938) to the client a set of search results including information representing the conversation (e.g., the conversation with which the first message and the second message are associated). The search results may include display information enabling the requesting client to display conversation lists and/or messages that match the search query, as shown in the exemplary user interface described in greater detail below with reference to FIGS. 11A-11F.

Note that because messages (e.g., e-mail messages) typically have a single sender a search for a message with multiple senders will typically not produce any results. Many conventional messaging systems use individual messages as the primary unit of conversation and index individual messages separately, and thus do not have any single referenced object that is associated with multiple sender identifiers. Moreover even in messaging systems that group messages into conversations, messages are typically indexed separately, rather than being indexed as a conversation as a whole. For this reason, conventional messaging systems typically have difficulty identifying conversations including a message with a first sender and a message with a second sender (e.g., a conversation between user A and user B). In contrast, because the presently disclosed embodiments include an index (e.g., Index 142 in FIGS. 1, 3 and/or 4C) having a plurality of index components for a same respective referenced object, including an index component indicative of a first sender and an index component indicative of a second sender, a conversation including a message with a first sender and a message with a second sender can be quickly and efficiently identified by identifying any referenced object that includes both the index component indicative of the first sender and the index component indicative of the second sender as a matching referenced object.

It should be understood that the particular order in which the operations in FIGS. 9A-9D have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600, 700, 800 and 1000 (e.g., FIG. 6A-6C, 7A-7G, 8A-8D or 10A-10E respectively) are also applicable in an analogous manner to method 900 described above with respect to FIGS. 9A-9D. For example, the conversations, messages and data structures (e.g., databases tables, maps, indexes, etc.) described above with reference to method 900 may have one or more of the characteristics of the various conversations, messages and data structures (e.g., databases tables, maps, indexes, etc.) described herein with reference to methods 600, 700, 800 and 1000. For brevity, these details are not repeated here.

FIGS. 10A-10E include a flowchart representing a method 1000 for performing both conversation based queries and message based queries, according to certain embodiments. Method 1000 may be governed by instructions that are stored in a non-transitory computer readable storage medium and that are executed by one or more processors of one or more servers, such as in conversation server system 106 (as illustrated in FIGS. 1 and 3). Each of the operations shown in FIGS. 10A-10E may correspond to instructions stored in a computer memory or computer readable storage medium. The computer readable storage medium may include a magnetic or optical disk storage device, solid state storage devices such as Flash memory, or other non-volatile memory device or devices (for example, devices in memory 306 of conversation server system 106). The computer readable instructions stored on the computer readable storage medium may include one or more of: source code, assembly language code, object code, or other instruction format that is executed or interpreted by one or more processors. Some operations in method 1000 may be combined and/or the order of some operations may be changed.

Conversation Server System 106 stores (1002) a plurality of messages organized as a plurality of conversations, each conversation including a respective representative message and, optionally, one or more other messages. At least one of the conversations includes multiple messages. Additionally, a respective representative message of a conversation including multiple messages is associated with one or more message terms and one or more conversation terms. The message terms include terms that occur in the respective representative message, and the conversation terms include terms from the conversation that do not occur in the respective representative message. In some implementations, each representative message includes at least one conversation term, for example a special representative-message label that identifies the message as the representative message. In some embodiments, if a conversation has only one message, that message is the respective representative message for the conversation.

As described in greater detail above with reference to FIG. 6A, as messages are received various data structures are updated to reflect the received messages. In some embodiments of method 1000, Server 106 stores (1004) a plurality of index entries in an index (e.g., 142 in FIG. 4C), a respective index entry (e.g., 430 in FIG. 4C) corresponding to a respective term and having a plurality of index components, a respective index component of the respective index entry identifying a message that is associated with the respective term. The index includes, for the representative message of a respective conversation, a plurality of conversation index components that each includes an identifier of the conversation, as described in greater detail above with reference to FIGS. 4B-4C. In some embodiments, the address space for the representative message of the respective conversation is partitioned (1006) using a set of one or more high order address bits to specify partitions, as described in greater detail above with reference to FIGS. 4B-4C.

After storing the plurality of index components, Server 106 receives (1008) a message search query from a client. A general description of responding to a message search query is described above in greater detail with reference to FIG. 6B. More specifically, in method 1000, Server 106 responds (1010) to the message search query by identifying, (1012) in the plurality of messages (i.e., the messages organized as conversations, and corresponding to index entries in the index), one or more matching messages that are associated with message terms matching the message search query. As noted above, in some embodiments, the storing (1002) includes storing a plurality of index entries in an index, a respective index entry corresponding to a respective term and having a plurality of index components. A respective index component of the respective index entry identifies a message that is associated with the respective term. Additionally, responding to the message search query (1010) includes ignoring (1014) the index components associated with conversation terms of the representative messages. In other words, the message search is performed over all of the messages, but some or all of the index components in the index that correspond to conversation terms are ignored for the purposes of the message search. In some embodiments, one or more of the messages that are not representative messages may be associated with index components that correspond to conversation terms (e.g., index components for a respective message that once was a representative message, but is no longer a representative message, may still include index components for conversation terms, because those index components have not been removed from the index), and these index components that correspond to conversation terms are also ignored when executing the message search query. The index components that correspond to conversation terms may be easily identified in some embodiments by the high order bits, flags or other metadata that is used to distinguish index components for conversation terms from index components for message terms, as described in greater detail above with reference to FIG. 4B. After identifying the one or more matching messages, Server 106 returns (1016), to the requesting client, message search results including representations of at least a subset of the matching messages for display at the client from which the message search query was received.

After storing the plurality of index components, in addition to receiving the message query, Server 106 may also receive (1018) a conversation search query from a client. In some embodiments, the message search query and the conversation search query are received (1020) from a same client (e.g., a user of the client toggles between message mode and conversation mode or uses predefined query syntax to differentiate a message search query from a conversation search query). In some embodiments, the message search query and the conversation search query are received (1022) from different clients that are associated with a same user account for a user associated with the conversations (e.g., a mobile phone displays/searches messages in message mode while a desktop or laptop computer displays/searches messages in conversation mode).

A general description of responding to a conversation search query is described above in greater detail with reference to FIG. 6B-6C. More specifically, in method 1000, Server 106 responds (1024) to the conversation search query by identifying, (1026) in the plurality of messages, one or more matching representative messages that are associated with a combination of message and conversation terms matching the conversation search query. The combination of message and conversation terms may include any number of conversation terms and any number of message terms. However, uniquely advantageous aspects of the presently disclosed embodiments are most readily apparent when the combination of message and conversation terms includes one or more conversation terms associated with the representative message and zero or more message terms associated with the representative message, because in those situations the identified conversations are identified based on index components for terms that do not occur in the representative messages with which the index components are associated. In other words, the matching conversations that are identified via index entries for respective representative messages are identified based at least in part on conversation terms that occur in messages other than the respective representative messages for the conversations.

In some embodiments, storing the index components includes (1028) storing a plurality of index entries in an index, a respective index entry corresponding to a respective term and having a plurality of index components, a respective index component of the respective index entry identifying a message that is associated with the respective term, as described in greater detail above with reference to FIGS. 4B-4C. In these embodiments, responding to the conversation search query includes ignoring index components associated with messages other than representative messages. In other words, in some embodiments, the conversation search is performed over only the representative messages. For example, only index components that include identifiers (e.g., Message IDs) for messages identified as representative messages (e.g., messages having Message IDs that are associated, in the index with a representative-message label) are included in the search. In some other embodiments, the conversation search is performed over all of the messages to generate preliminary search results and the preliminary search results are filtered to remove any non-representative messages from the results to produce updated search results. For example, each of the representative messages may have a representative-message label index component that identifies the message as a representative message, and these index components are stored in an index entry for the representative-message label (e.g., the representative-message label is treated as a term in the index).

After identifying the one or more matching representative messages, Server 106 selects (1030) one or more conversations including a matching representative message as matching conversations. In some embodiments, the conversation search query includes (1032) a conversation-search component and a message-search component. In some of these embodiments, the search query includes (1034) syntax that identifies at least a portion of the search query as a message-search component. For example, a search query "Message [TermA AND TermB] AND TermC" would search for a conversation including at least one message with both TermA and TermB and at least one message with TermC, whereas a search query "TermA AND TermB AND TermC" would search for a conversation including some combination of messages that include the query terms (e.g., TermA, TermB and TermC).

In response to receiving a conversation search query that includes a conversation-search component, Server 106 selects the one or more matching conversations by identifying (1036) a set of conversations that each include a representative message matching the conversation-search component. In some embodiments, identifying a set of conversations that each include a representative message matching the conversation-search component comprises (1038) identifying a set of conversations that each include a representative message that is associated with (e.g., are represented in the index by index components corresponding to) a combination of message terms and conversation terms matching the conversation-search component which may include any combination of message terms and/or conversation terms. However, uniquely advantageous aspects of the presently disclosed embodiments are most readily apparent when the combination of message and conversation terms includes at least one conversation term, as described in greater detail above. If the received search query includes two or more conversation-search components then Server 106 identifies, as the set of conversations, one or more conversations that each include a combination of the conversation-search components specified by the search operators (e.g., Boolean operators such as AND, OR, etc.) in search query.

Figure 10B:
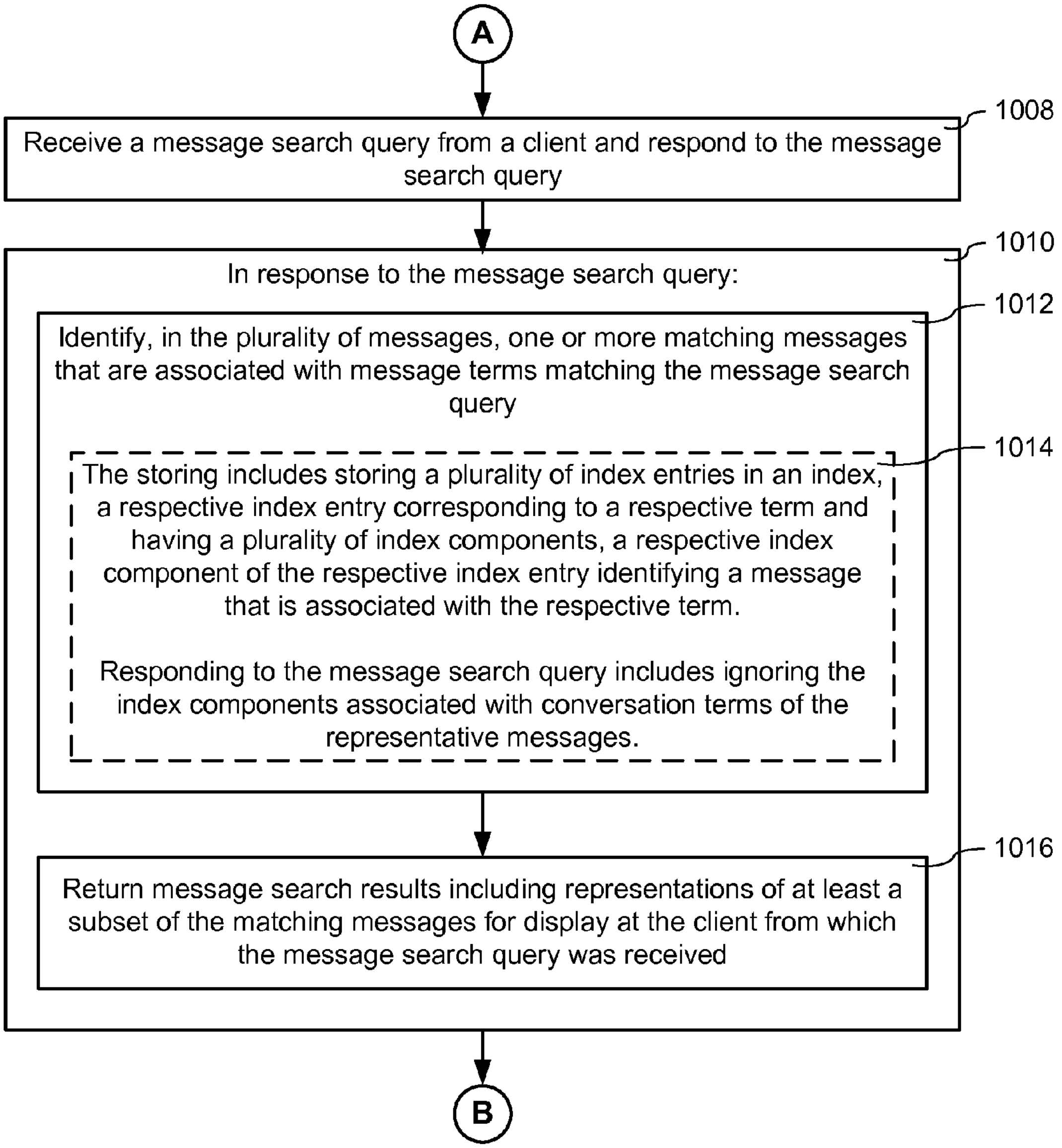
Figure 10C:
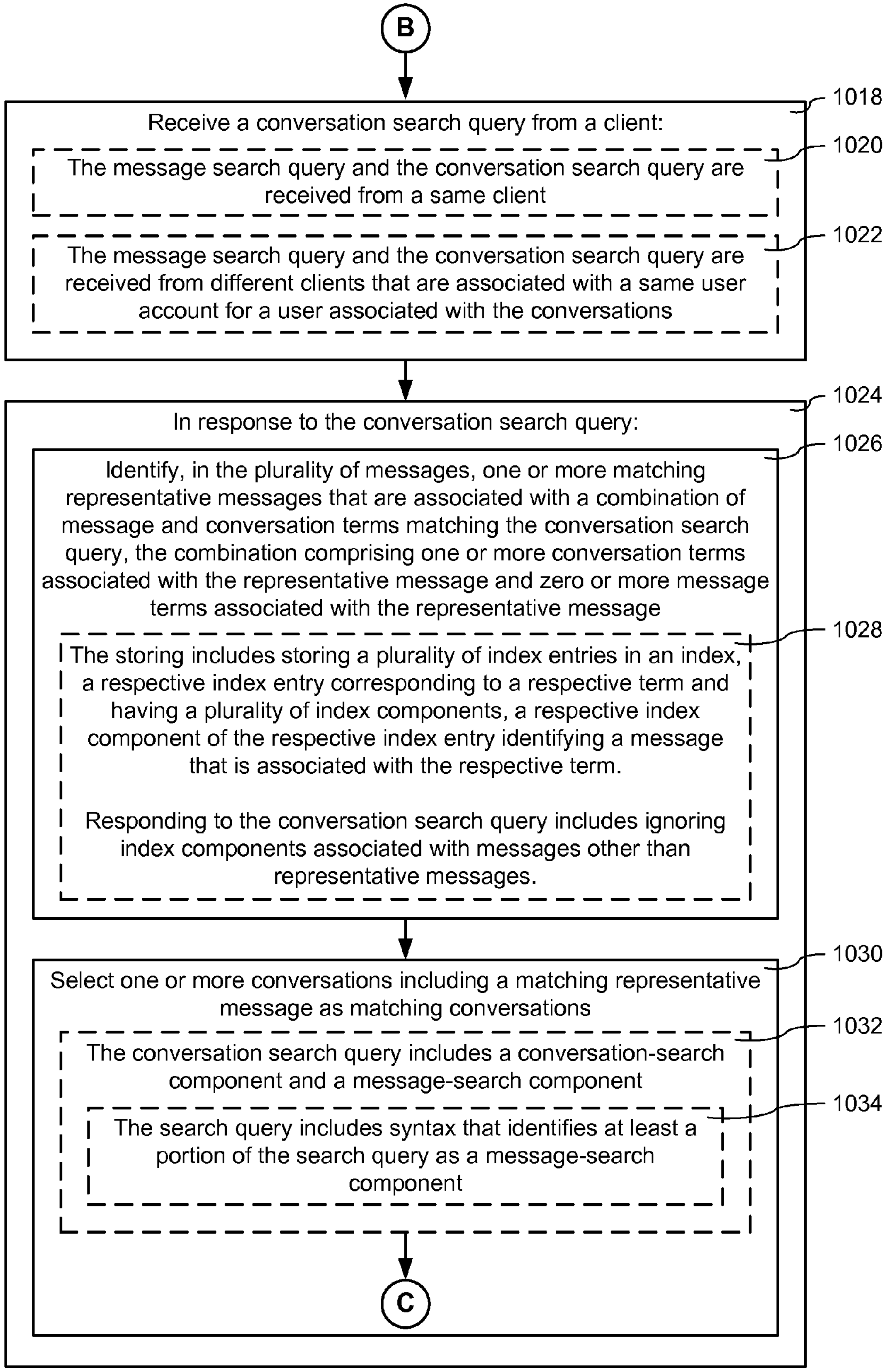
Figure 10D:
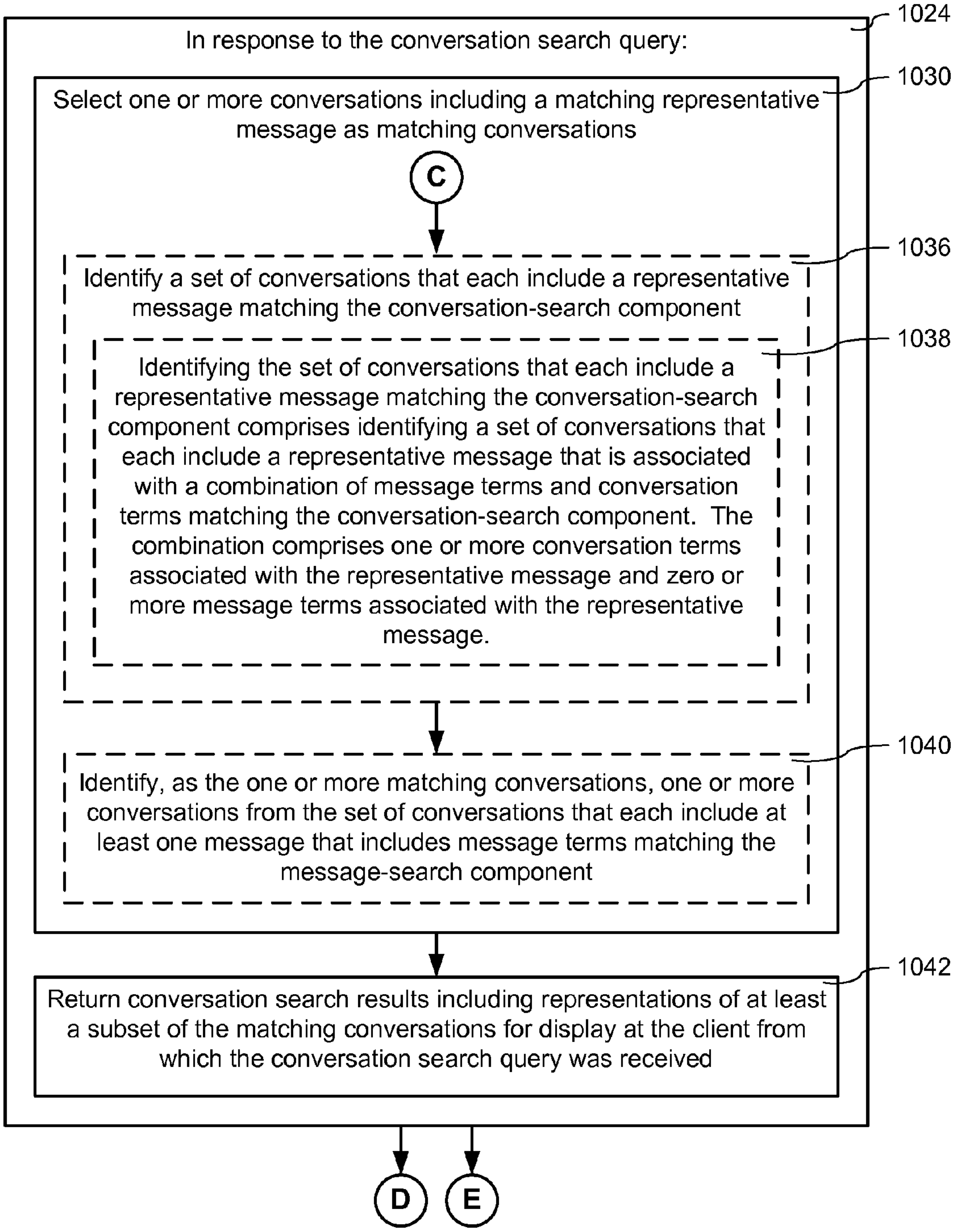
Figure 10E:
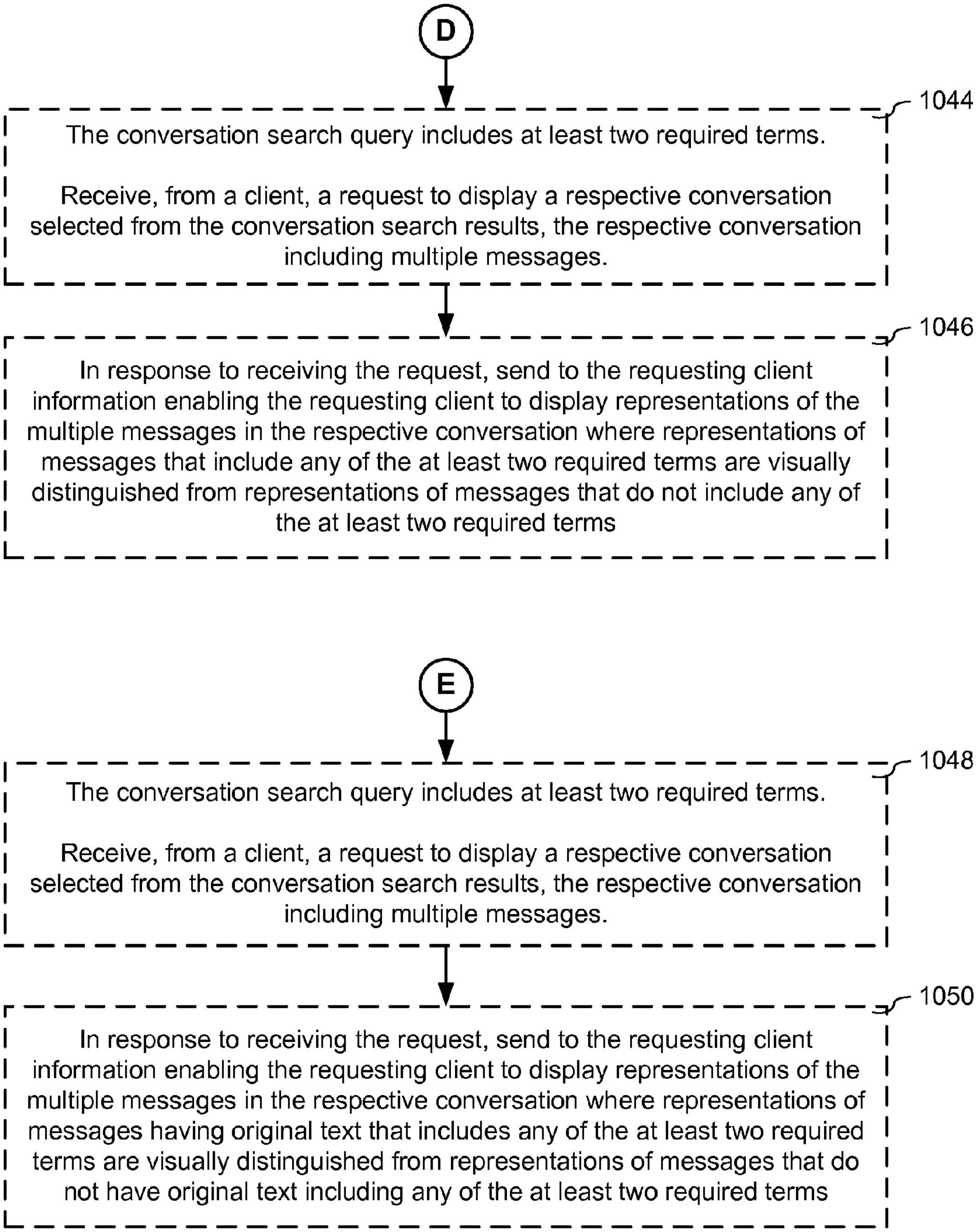

In these embodiments, after identifying the set of conversations that each include a representative message matching the conversation-search component, Server 106 identifies, (1040) as the one or more matching conversations, one or more conversations from the set of conversations that each include at least one message that includes message terms matching the message-search component of the search query (see 1034, FIG. 10C). If the search query includes two or more message-search components, then the server identifies, as the one or more matching conversations, from the set of conversations (see 1036), one or more conversations that each include a combination of the message-search components specified by one or more search operators (e.g., Boolean operators such as AND, OR, etc.) in the search query.

After identifying the one or more matching conversations, Server 106 returns (1042) conversation search results including representations of at least a subset of the matching conversations for display at the client from which the conversation search query was received. In some embodiments, the conversation search results include display instructions for displaying the search results at the requesting client. Various user interfaces for displaying conversation lists generated in response to search queries are described in greater detail below with reference to FIGS. 11A-11B.

In some situations, the conversation search query includes at least two required terms (e.g., "Tahoe" and "dinner"), and Server 106 receives (1044) from a client a request to display a respective conversation selected from the conversation search results, the respective conversation including multiple messages. In response to receiving the request, Server 106 sends (1046) to the requesting client information enabling the requesting client to display representations of the multiple messages in the respective conversation where representations of messages that include any of the at least two required terms (e.g., messages that include either "Tahoe" or "dinner") are visually distinguished from representations of messages that do not include any of the required terms. In some embodiments the messages that include any of the at least two required terms are displayed in expanded mode, while the messages that do not include any of the required terms are displayed in compressed mode.

In some situations, the conversation search query includes at least two required terms (e.g., Tahoe and dinner), and Server 106 receives (1048) from a client, a request to display a respective conversation selected from the conversation search results, the respective conversation including multiple messages. In response to receiving the request, Server 106 sends (1050) to the requesting client information enabling the requesting client to display representations of the multiple messages in the respective conversation where representations of messages having original text that includes any of the at least two required terms (e.g., messages that include either "Tahoe" or "dinner") are visually distinguished from representations of messages that do not have original text including any of the at least two required terms. In some embodiments the messages that have original text (e.g., non-quoted text) including any of the at least two required terms are displayed in expanded mode, while the messages that do not have original text (e.g., non-quoted text) including any of the at least two required terms are displayed in compressed mode, as shown in the exemplary user interface described in greater detail below with reference to FIGS. 11D-11F.

It should be understood that the particular order in which the operations in FIGS. 10A-10E have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600, 700, 800 and 900 (e.g., FIG. 6A-6C, 7A-7G, 8A-8D or 9A-9D respectively) are also applicable in an analogous manner to method 1000 described above with respect to FIGS. 10A-10E. For example, the conversations, messages and data structures (e.g., databases tables, maps, indexes, etc.) described above with reference to method 1000 may have one or more of the characteristics of the various conversations, messages and data structures (e.g., databases tables, maps, indexes, etc.) described herein with reference to methods 600, 700, 800 and 900. For brevity, these details are not repeated here.

Exemplary Conversation User Interfaces

As discussed above, in some embodiments, after performing a search query to identify matching conversations and/or messages, Server 106 generates display information for displaying a list of conversations or messages at Client 102. FIGS. 11A-11F illustrate exemplary user interfaces for displaying conversation lists (FIGS. 11A-11B) and conversation views (FIGS. 11C-11F) formatted in accordance with display information generated by Server 106 in response to search queries received from a client in conversation view mode.

FIG. 11A illustrates an exemplary user interface including a list 1110 of representations of conversations in the "Inbox" category (e.g., conversations with which a system-defined "Inbox" label is associated). This user interface is typically generated in response to a user requesting to view the user's inbox (e.g., by clicking on an "Inbox" icon or link in a messaging user interface), and Server 106 executing a predefined search query to identify all conversations associated with a system-defined "Inbox" label. Similar searches are performed to generate other views for the messaging system (e.g., a search for all conversations with a "Starred" label is performed to generate a list of conversations including a "Starred" label, etc.). At the top left corner of the screenshot, there is a "Compose Mail" link 1102. The user clicks on this link to start writing a new message. Next to the link 1102, there are a textbox 1104 and a "Search" button 1106. After the user enters one or more query terms into the textbox 1104 and then clicks on the "Search" button 1106, Client 102 sends a search query including query terms from the text box to Server 106. In response to the search query, Server 106 generates display information for displaying a set of conversations that match the submitted search query. In some embodiments, matches can occur by the presence of one or more synonyms of a respective query term. In some embodiments, matches can occur based on the root of the respective query term. For example, a search for "book" could be matched by the words "book", "books", and "booking".

Next to "Search" button 1106 are two pull-down lists: the "more actions" list 1108 and the "add label" list 1109 which enable the user to request that user-defined and/or system-defined labels be added to selected messages and/or conversations. In some embodiments user-defined labels are added to messages and/or conversations in response to an explicit requests from a user to add a label, while system-defined labels (e.g., "Inbox," "Unread," "Spam," "Trash," "Active Message") are added to or removed from messages and/or conversations in response to requests from the user to perform functions associated with the system-defined labels (e.g., "Remove from Inbox" removes the "Inbox" label, "Mark as Unread" adds the "Unread" label, "Report Spam" adds the "Spam" label and removes the "Inbox" and "Active Message" labels, "Move to Trash" or "Delete Message" removes the "Inbox" label and adds a "Trash" label).

Right below the "Compose Mail" link 1102, there are a series of group boxes enabling a user to instruct the Client 102 to send predefined queries to Server 106. For instance, the group box 1112 displays system-defined categories, including "Inbox", "Starred", "Sent Mail", "Drafts", "All Mail", "Spam" and "Trash", etc. In other embodiments, the set of system-defined categories may be different, including a subset of these categories and/or additional categories. In some embodiments, the "Starred" category includes conversations in which the user plans to be actively involved, e.g., by sending messages to other participants, which is similar to a "To Do" list. Thus, in one embodiment, a message may be flagged with a star, so that a user can, for example, search for starred messages. In one embodiment, the "All Mail" category includes all conversations associated with the user that are not in the "Spam" or "Trash" categories. Note that since the exemplary screenshot in FIG. 11A includes only conversations belonging to the "Inbox" category, the corresponding link in the group box 1112 has been highlighted. If many people have contributed messages to a conversation, the sender list may become too long to fit into the limited space in a browser window. This is especially true if one or more of the senders in the sender list are identified by their email address. If so, the Server 106 prioritizes the senders in the list of senders based on various information to identify a subset of the sender list and sends Client 102 display information that enables Client 102 to display the subset of the sender list to the user.

The central area of the exemplary screenshot in FIG. 11A is a form comprising a list 1110 of representations of conversations (e.g., "concise conversation headers"), each representation of a conversation occupying one row in the form. Each row further includes a checkbox 1122, a sender list 1124, a recipient status indicator 1126, a conversation topic and snippets 1128 and a date/time value 1130. In other embodiments, the set of fields for each conversation row may be different, including a subset of these fields and/or additional fields. In some embodiments, all rows have a uniform height when a list of conversations is displayed. In other embodiments, heights may be variable to accommodate various snippet lengths. In some embodiments, the sender list comprises a plurality of sender identifiers, each identifier corresponding to a sender who has authored at least one of the messages. A sender may be identified by his first name, last name, full name, email address, picture or a unique icon or a combination thereof. The sender list for a conversation may contain all or a subset of the senders within the conversation. In some embodiments, the list of senders is formatted so as to visually distinguish those senders who have sent a message (in the conversation) that is currently labeled as "Unread." The concise conversation header may also includes a count of the number of messages included in each conversation in the list of conversations, a subject and/or snippet from the conversation, and a date/time of the conversation.

The display information used by Client 102 to display the list of representations of conversations includes date/time values 1130 for the conversations as identified by Server 106. These date/time values often dictate the display order of a list of representations of conversations at Client 102. Typically, each conversation in a list of conversations, is assigned a date/time equal to the date/time of the most recent message of the conversation, and the conversations in a list of conversations are ordered (e.g., in reverse chronological order) in accordance with these assigned date/time values. However, one of ordinary skill in the art will recognize that there are various other ways to order and present the conversations in a list of conversations. For example, in some implementations, each conversation in a list of conversations, may be assigned a date/time equal to the date/time of the most recent message that matches the search criteria used to generate the list of conversations. For instance, if a user-specified search query is used (e.g., "Lake Tahoe"), then for each matching conversation in the list of conversations, the assigned date/time is the date/time of the most recent message matching the user-specified search query (or, optionally a term in the query). In some embodiments, the conversations in the list of conversations are listed in reverse chronological order with respect to their assigned date/time values (i.e., with the most recent conversations being listed first). As used herein, "date/time" value refers to whatever date value and/or time value is associated with a particular message or conversation. Dates and/or times may be associated with messages based on the date and/or time of the message's creation, transmission, receipt or other event.

FIG. 11B illustrates an exemplary user interface including a list of representations of conversations that correspond to conversations identified at Server 106 in response to a search query "Tahoe AND dinner." This user interface is typically generated in response to a user submitting a search query (e.g., by entering a search query "Tahoe AND dinner" in text box 1104 and selecting "Search" button 1106). The search query is executed by Server 106 to identify matching conversations as discussed in greater detail above, and Server 106 sends display information to Client 102 enabling Client 102 to display the search results. The search results include a list of representations of conversations 1120 in FIG. 11B. Each representation of a conversation includes the same elements as described above in the "Inbox" view, except that in FIG. 11B, the snippet/subject of each of the concise conversation headers includes text associated with the query terms (e.g., “Tahoe” and/or “dinner”). In this example, the snippets include relevant content of the conversations, the first and second conversations are about a ski trip to Lake Tahoe, while the third conversation is about camping sites at the Tahoe National Forest. Thus, in this example the user would be able to use the information in the snippets to decide which particular conversation, if any, to open for viewing.

FIGS. 11C-11F illustrate messages displayed in a conversation view. In some embodiments, messages in a conversation view can be displayed in one of a plurality of different sub-forms (also sometimes called message display sub-forms). In some embodiments a compacted sub-form for a message contains only a concise message header. For example, the compacted sub-form may include only a sender list, a snippet that includes only a predefined portion of the message body such as the first few lines of the message body, and optionally a date/time indicator. In contrast, an expanded sub-form includes more information than the compacted sub-form. In particular, the expanded sub-form may include, in addition to the sender list and the date/time indicator, a complete message body, a “More options” link, which causes the detailed message header to be display when selected, and a list of reply options (e.g., Reply, Reply All, Forward, etc.). In some embodiments, if the message associated with the sub-form has not been viewed or marked as read by the user, the expanded sub-form for the message is displayed. In contrast, if a respective message has been viewed or marked as read, the compacted sub-form is displayed. This provides a visual effect that all the read messages in the conversation are piled together (e.g., only compacted sub-forms are displayed), while unread messages are displayed in expanded sub-forms so that they can be easily read.

Figure 11C:
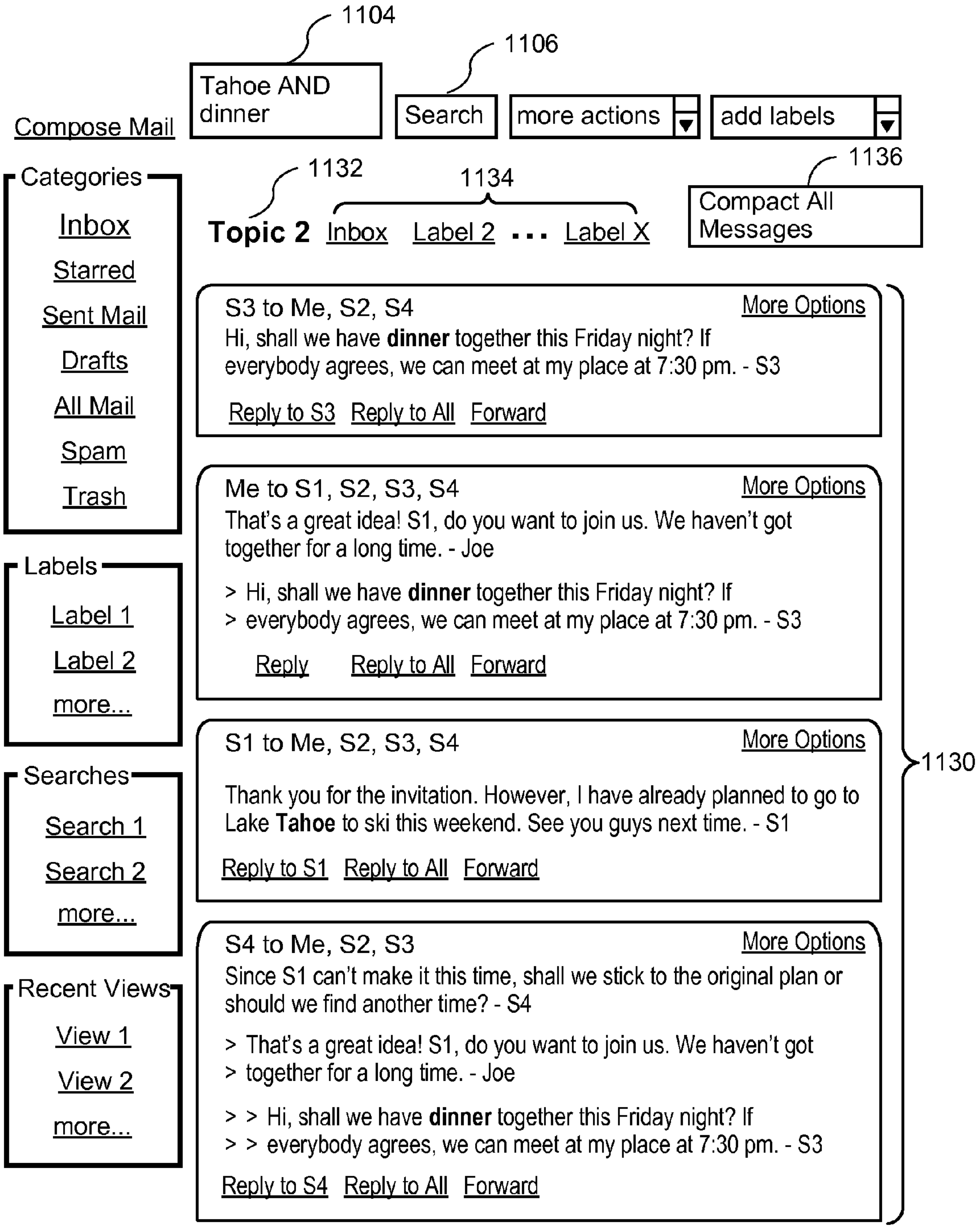
Figure 12A:
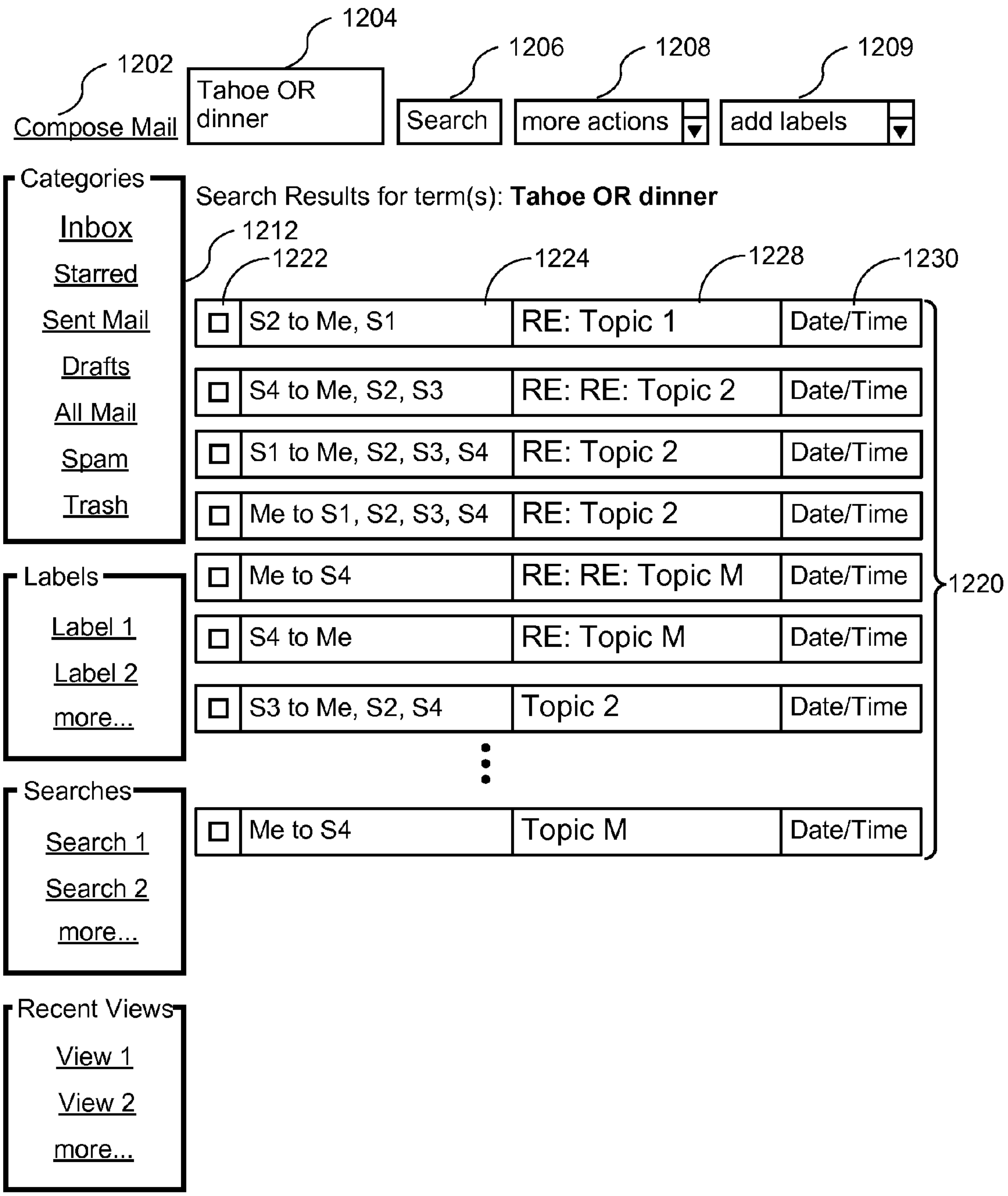
FIGS. 12A-12B are representations of exemplary user interfaces for interacting with messages stored at the conversation server system, in accordance with some embodiments.
Figure 12B:
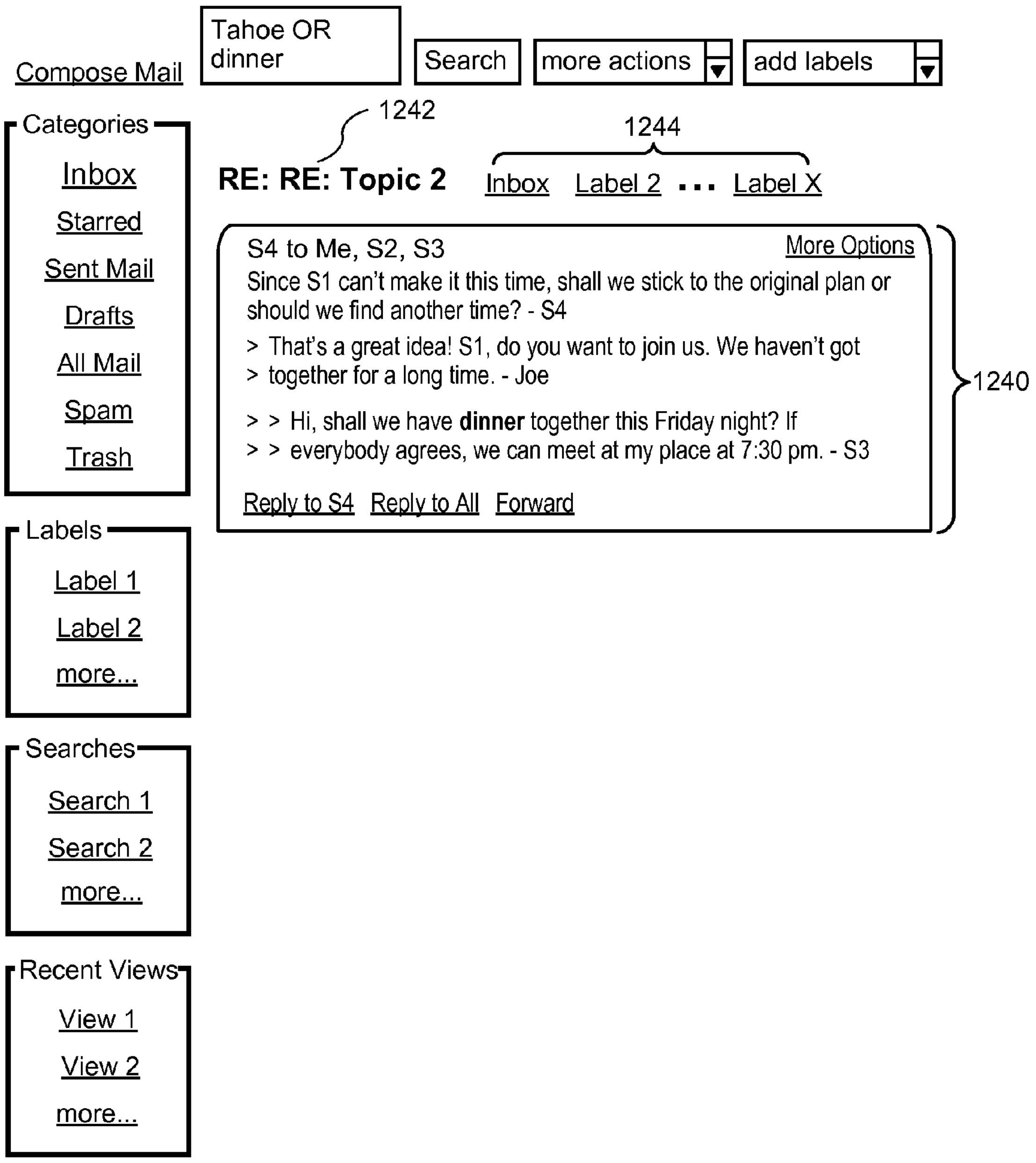

FIG. 11C illustrates an exemplary user interface including a conversation view of a conversation including a plurality of messages that matches the search query (e.g., “Tahoe AND dinner”) displayed in accordance with display information received from Server 106. The top and left portions of the screenshot are identical to that of FIG. 11B. But the list of conversations 1120 has been replaced by a conversation view 1130 that includes a plurality of representations of messages associated with a selected conversation from the list of conversations 1120 in FIG. 11B. On top of the list of messages are the conversation’s topic “Topic 2” 1132, all the user-defined labels 1134 associated with the conversation and a “Compact All Messages” button 1136 for compacting the expanded messages (e.g., messages displayed with expanded sub-forms). Since the last message was sent by S4, one of the reply options is “Reply to S4”, which alerts the user that a reply will be addressed to S4.

In FIG. 11C, the user has selected to view messages for the conversation Topic 2, which includes four messages. The first and third messages include only original text and the second and fourth messages include both original text and quoted text (where each line of quoted text is indicated by a “>” before the line of quoted text). In the embodiment illustrated in FIG. 11C, Server 106 has identified query terms in each of the messages and provided display information for highlighting the query terms that occur in either original text or quoted text. Thus, all of the messages are displayed in expanded mode, because each of the messages includes either the term “Tahoe” or the term “dinner.” The user can subsequently collapse the expanded sub-form for a respective message to display a compacted sub-form for the respective message by clicking on a top edge of the expanded sub-form. Each of the expanded sub-forms also includes a set of reply options at the bottom of the sub-form, (e.g., “Reply”, “Reply to All” and “Forward”).

Figure 11D:
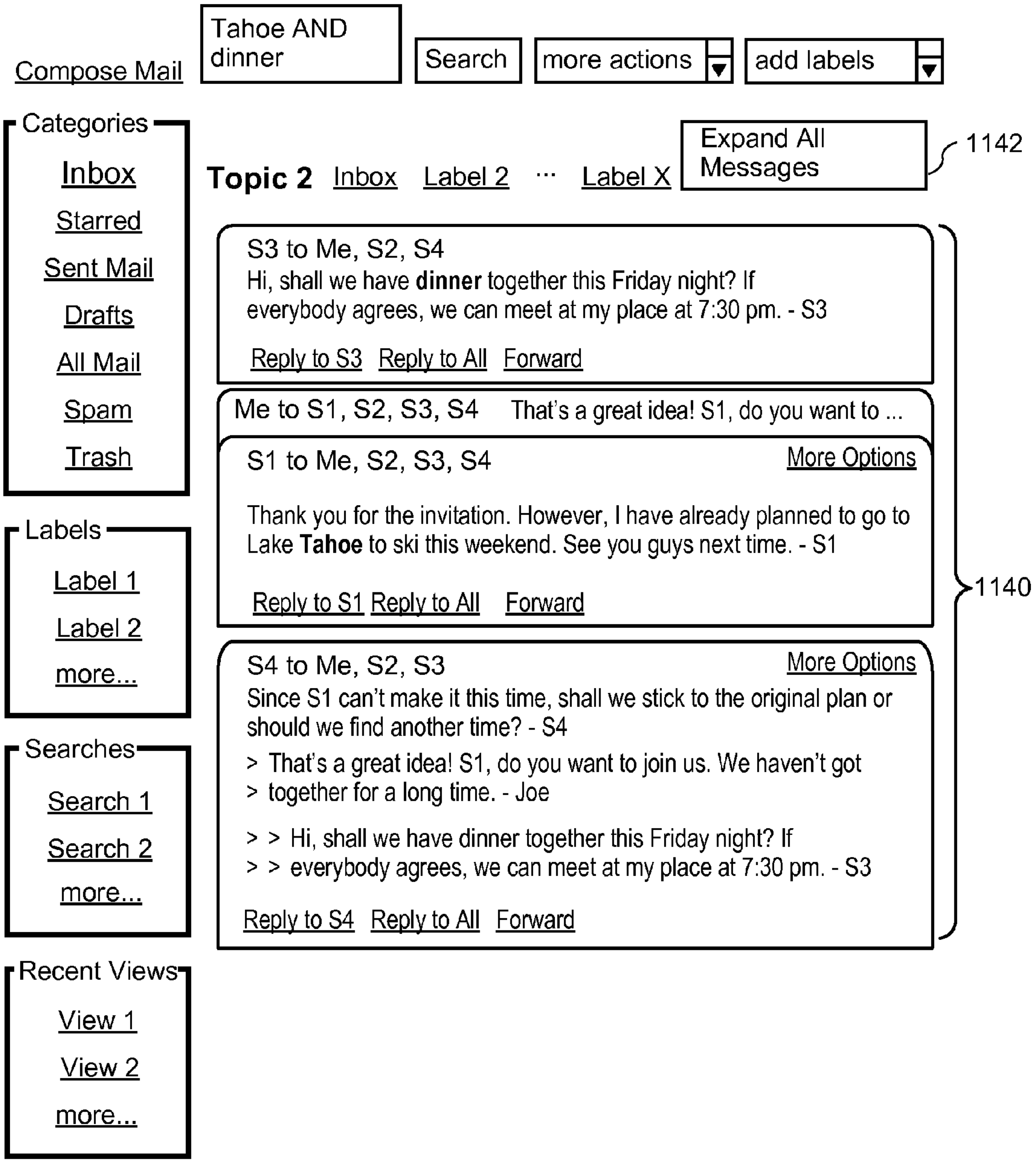

FIG. 11D is a schematic screenshot of the conversation shown in FIG. 11C in embodiments where terms in original text are highlighted but terms in quoted text are not highlighted. As shown in FIG. 11C, the second and fourth messages in the conversation do not include the term “Tahoe” or the term “dinner” in original text (“dinner” is included only in quoted text). Thus, in the conversation view 1140 in FIG. 11D, the second message is displayed using a compact sub-form, while the text in the fourth message that matches the search terms is not highlighted (e.g., the term “dinner” is not highlighted in the fourth message). In some embodiments, the user can subsequently expand the compacted sub-form of any message by clicking on it. Note that the “Compact All Messages” button is replaced with an “Expand All Messages” button 1142 as at least some of the messages are now represented by compacted sub-forms. Selecting the “Expand All Messages” button would display the expanded sub-form for all of the messages in the displayed conversation.

Figure 11E:
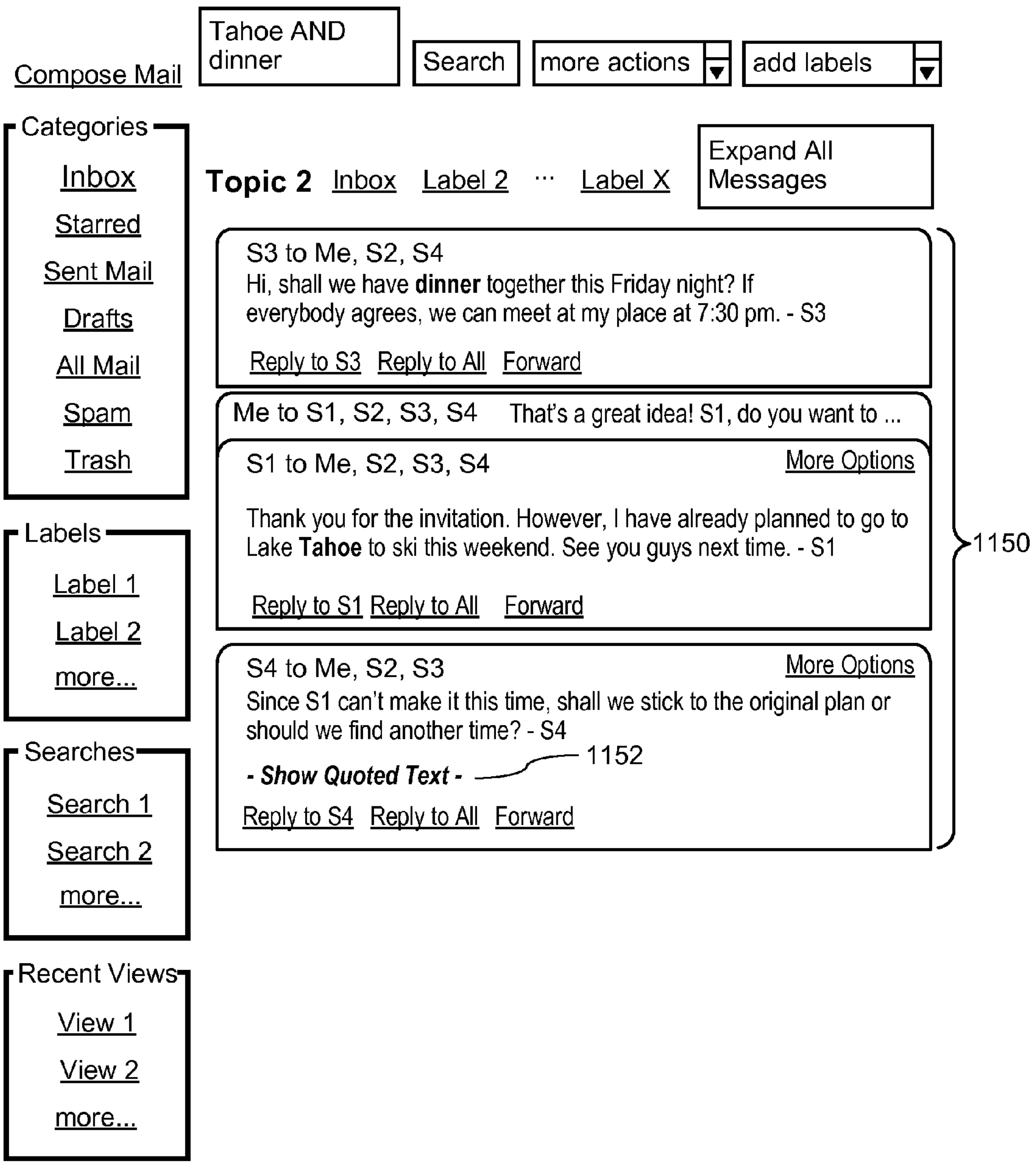

FIG. 11E is a schematic screenshot of the conversation shown in FIG. 11C in embodiments where terms in original text are highlighted but terms in quoted text are not highlighted and quoted text is elided. As shown in FIG. 11C, the second and fourth messages in the conversation do not include the term “Tahoe” or the term “dinner” in original text (“dinner” is included only in quoted text). Thus, in the conversation view 1150 in FIG. 11E, the second message is displayed using a compact sub-form, and the quoted text in the fourth message has been replaced with a “show quoted text” affordance 1152, which, when selected by a user causes the quoted text to be displayed. However, even if the quoted text were to be displayed, the term “dinner” would not be highlighted in the quoted text of the fourth message. Thus, in the embodiment illustrated in FIG. 11E, not only are matching terms in the quoted text not highlighted, but the quoted text itself is elided from the representations of the messages unless the user affirmatively requests that the quoted text be displayed (be selecting the “show quoted text” affordance 1152). It should be noted that the quoted text may accumulate over the course of conversation due to automated quoting processes of messaging systems. However when messages are grouped together as conversations, the original text from which the quoted text originated is typically readily available in the conversation. Thus, the quoted text merely adds unneeded bulk to the conversation as a whole and makes it harder to discern the structure of the conversation. Thus eliding quoted text as shown in FIG. 11E removes unneeded text from messages in the conversation thereby proving a more intuitive and user-friendly user interface.

Figure 11F:
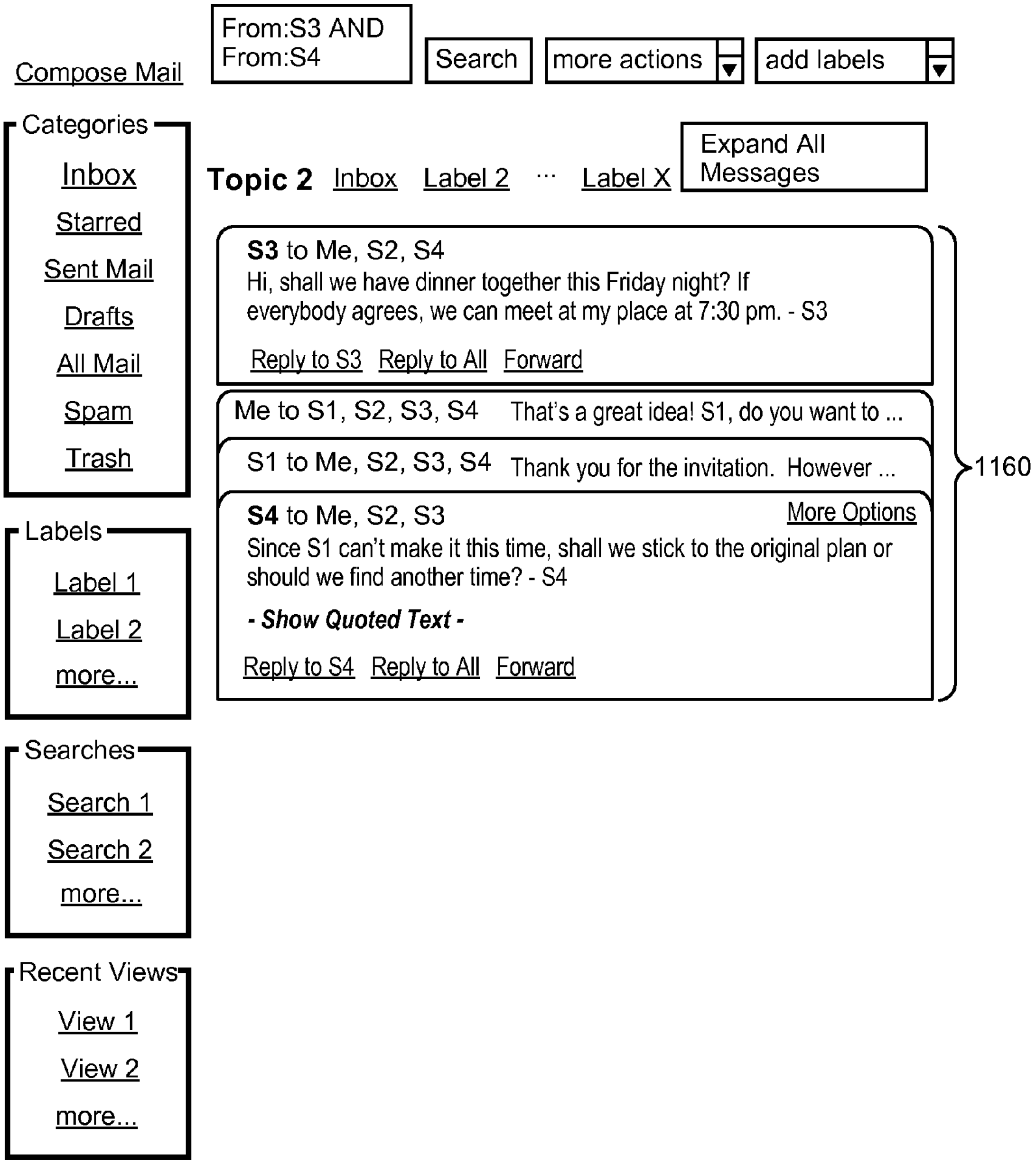

FIG. 11F illustrates an exemplary user interface including a conversation view of a conversation including a plurality of messages displayed in accordance with display information received from Server 106. The conversation has been retrieved in response to a search query (e.g., “From:S3 AND From:S4”) for conversations that include at least one message with a first sender (e.g., S3) and at least one message with a second sender (e.g., S4). For example, a list of conversations similar to the list of conversations shown in FIG. 11B may have been generated by Server 106 and displayed by Client 102 to the user, who selected the conversation displayed in FIG. 11F from the list of conversations. The top and left portions of the screenshot are identical to that of FIG. 11C. However, the conversation view 1130 from FIG. 11C has been replaced by a conversation view 1160 and different messages and different terms are highlighted because a different set of search terms was present in the search query (e.g., From:S3 AND From:S4" instead of "Tahoe AND dinner"). For example the identifier for sender S3 in the first message is highlighted, because S3 is the sender of the first message, and the identifier for sender S4 in the fourth message is highlighted, because S4 is the sender of the fourth message. Thus, FIG. 11F illustrates an embodiment where a conversation is returned in response to a search query for conversations including at least one message from a first sender and at least another message from a second sender.

FIGS. 12A-12B illustrate exemplary user interfaces for displaying message lists (FIG. 12A) and message views (FIG. 12B) formatted in accordance with display information generated by Server 106 in response to search queries received from a client in message view mode.

FIG. 12A illustrates an exemplary user interface including a list of representations of messages that correspond to messages identified at Server 106 in response to a search query "Tahoe OR dinner." Note that the query "Tahoe OR dinner" is used in this example, because the query "Tahoe AND dinner" would not return any of the messages for Topic 2, as none of the messages in Topic 2 include both the term "Tahoe" and the term "dinner." FIG. 12A includes many elements that are analogous to the elements in FIG. 11A. At the top left corner of the screenshot, there is a "Compose Mail" link 1202. The user clicks on this link to start writing a new message. Next to the link 1202, there are a textbox 1204 and a "Search" button 1206. Right below the "Compose Mail" link 1202, there are a series of group boxes enabling a user to instruct the Client 102 to send predefined queries to Server 106. For instance, the group box 1212 displays system-defined categories, including "Inbox", "Starred", "Sent Mail", "Drafts", "All Mail", "Spam" and "Trash", etc. Similarly the "Labels," "Searches" and "Recent Views" group boxes in FIG. 12A have analogous functions to those of FIG. 11A.

After the user submits one or more query terms through the textbox 1204 and then clicks on the "Search" button 1206, Client 102 sends a search query including query terms from the text box. The search query (e.g., "Tahoe OR dinner") is executed by Server 106 to identify matching messages, as described in greater detail above. In some embodiments, matches can occur by the presence of one or more synonyms of a respective query term. In some embodiments, matches can occur based on the root of the respective query term. For example, a search for "book" could be matched by the words "book", "books", and "booking". Next to "Search" button 1206 are two pull-down lists: the "more actions" list 1208 and the "add label" list 1209 which enable the user to request that user-defined and/or system-defined labels be added to selected messages.

After identifying search results, Server 106 sends display information to Client 102 for displaying the search results as a message list. The message list 1220 includes representations of messages matching the search query. Each representation of a message occupies one row in the form. Each row further includes a checkbox 1222, a message address information list 1224 (e.g., a list of the senders and recipients of the message), a message subject 1228 and a date/time value 1230. Note that, in the message view mode, conversations are divided into individual messages, each representation of a message occupying one line in the menu list. Thus, the conversation on "Topic 2" that was represented by a single row in FIG. 11B is represented as four rows in the message based view of the search results in FIG. 12A. Additionally it should be noted that messages that do not match the search query are not displayed even they are associated with conversations including messages that do match the search query. Furthermore, some conversations that, as a whole, match the search query may not be displayed if none of the messages associated with the conversation individually matches the search query. For example, if the search query was "Tahoe AND dinner," none of the Topic 2 messages would be displayed, because none of the Topic 2 messages includes both the terms "Tahoe" and "dinner."

FIG. 12B illustrates an exemplary user interface including a conversation view of a message that matches the search query (e.g., "Tahoe OR dinner") displayed in accordance with display information received from Server 106. The top and left portions of the screenshot are identical to that of FIG. 12B. However, the list of messages 1120 has been replaced by a message view 1140 that includes a representation of a message selected from the list of messages shown in FIG. 12B. Additionally, the message's subject line 1242 "RE: RE: Topic 2", any user-defined labels 1244 associated with the message are displayed in the message view. Since the message was sent by S4, one of the reply options is "Reply to S4", which alerts the user that a reply will be addressed to S4. In the embodiment shown in FIG. 12B, terms in the message that match query terms (e.g., "dinner") from the search query are highlighted in the message. However, in some embodiments terms in quoted text of the message are not highlighted even if they match query terms in the search query. Additionally, in some embodiments, quoted text is elided from the message. However, when messages are not displayed together with other messages in the same conversation, it may be advantageous to display quoted text and highlight matching search terms in the quoted text so as to provide helpful context to the user (e.g., showing matching text from earlier messages that were quoted by the displayed message).

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A method comprising:

at a computer having one or more processors and memory storing one or more programs for execution by the one or more processors so as to perform the method:

obtaining a plurality of index entries in an index, a respective index entry corresponding to a respective term in one or more messages, and having a plurality of index components, a respective index component of the respective index entry identifying a message that is associated with the respective term;

responsive to receiving a first message having a message body and a message header;

updating the index by:

associating the first message with a conversation having one or more other messages;

identifying text in the message body of the first message as quoted text based on text that occurs in one or more of the other messages of the conversation; and adding, to the index, a plurality of first-message index components that each includes an identifier of the first message, including:

one or more original text index components that correspond to terms that occur in original text of the message body of the first message; and one or more quoted text index components that correspond to terms in the message body of the first message that occur in the quoted text of the first message; and responding to a search query having one or more query terms by:

identifying messages including at least one query term in the one or more query terms by searching the index, wherein the searching distinguishes between (A) matches of a query term with original text index components and (B) matches of a query term with quoted text index components, and preparing a response to the search query that includes search results corresponding to the identified messages;

wherein the one or more quoted text index components include information indicating that the corresponding terms are terms in the quoted text of the first message.

2. The method of claim 1, wherein a respective index component for a particular term in the quoted text includes a mapped location that corresponds to an original location of the particular term in the quoted text.

3. The method of claim 2, wherein the mapped location of the particular term is in a predefined range of locations associated only with terms in the quoted text.

4. The method of claim 1, wherein identifying quoted text in the first message includes:

comparing text in the first message to text from a prior message in the conversation;

identifying matching text in the prior message; and identifying the matching text as quoted text.

5. The method of claim 1, further comprising:

after identifying quoted text in the first message:

receiving a second message that is a prior message in the conversation;

associating the second message with the conversation; and updating the quoted text in the first message based on the text that occurs in the second message.

6. The method of claim 1, further comprising:

deleting a respective message that is a prior message in the conversation; and updating the quoted text in the first message based on the text that occurred in the respective message.

7. The method of claim 1, further comprising:

receiving a request for the first message; and in response to the request, formatting for display a portion of the first message that excludes at least a portion of the quoted text.

8. The method of claim 1, further comprising:

receiving a request for the conversation including the first message; and in response to the request, formatting for display a portion of the first message that excludes the quoted text and at least a portion of a second message in the conversation that includes the quoted text.

9. The method of claim 1, wherein responding to the search query includes ignoring quoted text index components of the index while searching the index to identify messages including at least one query term in the one or more query terms of the search query.

10. The method of claim 1, wherein responding to the search query includes identifying a respective message as matching the search query, the respective message having original text and quoted text, identifying a first set of one or more terms in the original text of the respective message that match one or more of the query terms, and identifying a second set of one or more terms in the quoted text of the respective message that match one or more of the query terms; and wherein preparing the response to the search query includes:

highlighting, in the response, terms in the first set of terms; and forgoing highlighting, in the response, terms in the second set of terms.

11. The method of claim 10, further comprising:

identifying a third set of one or more terms in a second message that match one or more of the query terms; and highlighting, in the response, terms in the third set of terms.

12. The method of claim 1, wherein:

the address space for the first message is partitioned using a set of one or more high order address bits to specify partitions;

a mapped location of a term that occurs in original text of the first message in the address space for the first message is specified by an address having one or more high order address bits with a first value; and a mapped location of a term that occurs in quoted text of the first message in the address space for the first message is specified by an address having one or more high order address bits with a second value different from the first value.

13. The method of claim 1, wherein each original text index component includes a first indicator indicative of original text and mapped location information indicative of a location of a term within the first message, and each quoted text index component includes a second indicator indicative of quoted text and mapped location information indicative of a location of a term within the first message.

14. A conversation computer system, comprising:

one or more processors;

memory; and one or more programs, wherein the one or more programs are stored in the memory and configured to be executed by the one or more processors, the one or more programs including instructions for:

obtaining a plurality of index entries in an index, a respective index entry corresponding to a respective term in one or more messages, and having a plurality of index components, a respective index component of the respective index entry identifying a message that is associated with the respective term;

responsive to receiving a first message having a message body and a message header;

updating the index by:

associating the first message with a conversation having one or more other messages;

identifying text in the message body of the first message as quoted text based on text that occurs in one or more of the other messages of the conversation; and adding, to the index, a plurality of first-message index components that each includes an identifier of the first message, including:

one or more original text index components that correspond to terms that occur in original text of the message body of the first message; and one or more quoted text index components that correspond to terms in the message body of the first message that occur in the quoted text of the first message; and responding to a search query having one or more query terms by:

identifying messages including at least one query term in the one or more query terms by searching the index, wherein the searching distinguishes between (A) matches of a query term with original text index components and (B) matches of a query term with quoted text index components, and preparing a response to the search query that includes search results corresponding to the identified messages;

wherein the one or more quoted text index components include information indicating that the corresponding terms are terms in the quoted text of the first message.

15. The system of claim 14, wherein responding to the search query includes:

identifying a respective message as matching the search query, the respective message having original text and quoted text, identifying a first set of one or more terms in the original text of the respective message that match one or more of the query terms, and identifying a second set of one or more terms in the quoted text of the respective message that match one or more of the query terms; and wherein preparing the response to the search query includes:

highlighting, in the response, terms in the first set of terms; and foregoing highlighting, in the response, terms in the second set of terms.

16. The system of claim 14, wherein the one or more programs further comprise instructions to ignore quoted text index components of the index while searching the index to identify messages including at least one query term in the one or more query terms of the search query.

17. A non-transitory computer readable storage medium storing one or more programs, the one or more programs comprising instructions which, when executed by a conversation computer system with one or more processors, cause the conversation computer system to:

obtain a plurality of index entries in an index, a respective index entry corresponding to a respective term in one or more messages, and having a plurality of index components, a respective index component of the respective index entry identifying a message that is associated with the respective term;

responsive to receiving a first message having a message body and a message header;

update the index by:

associate the first message with a conversation having one or more other messages;

identify text in the message body of the first message as quoted text based on text that occurs in one or more of the other messages of the conversation; and add, to the index, a plurality of first-message index components that each includes an identifier of the first message, including:

one or more original text index components that correspond to terms that occur in original text of the message body of the first message; and one or more quoted text index components that correspond to terms in the message body of the first message that occur in the quoted text of the first message;

respond to a search query having one or more query terms by:

identifying messages including at least one query term in the one or more query terms by searching the index, wherein the searching distinguishes between (A) matches of a query term with original text index components and (B) matches of a query term with quoted text index components, and preparing a response to the search query that includes search results corresponding to the identified messages;

wherein the one or more quoted text index components include information indicating that the corresponding terms are terms in the quoted text of the first message.

18. The computer readable storage medium of claim 17, wherein the one or more programs further comprise instructions to ignore quoted text index components of the index while searching the index to identify messages including at least one query term in the one or more query terms of the search query.

19. The computer readable storage medium of claim 17, wherein responding to the search query includes identifying a respective message as matching the search query, the respective message having original text and quoted text, identifying a first set of one or more terms in the original text of the respective message that match one or more of the query terms, and identifying a second set of one or more terms in the quoted text of the respective message that match one or more of the query terms; and wherein preparing the response to the search query includes:

highlighting, in the response, terms in the first set of terms; and forgoing highlighting, in the response, terms in the second set of terms.

* * * * *